United States Patent
Ishii et al.

(10) Patent No.: US 6,427,916 B1
(45) Date of Patent: Aug. 6, 2002

(54) POLYGONAL MIRROR UNIT, OPTICAL SCANNING APPARATUS AND BAR CODE READER

(75) Inventors: Mitsuharu Ishii; Toshitaka Aoki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/258,267

(22) Filed: Feb. 26, 1999

(30) Foreign Application Priority Data

Mar. 2, 1998 (JP) .......................................... 10-049791

(51) Int. Cl.[7] .......................... G02B 26/12; G06K 7/10
(52) U.S. Cl. .................. 235/462.39; 235/462.4
(58) Field of Search ..................... 235/462.39, 472.01, 235/462.4, 462.38, 462.44

(56) References Cited

U.S. PATENT DOCUMENTS

| | | | |
|---|---|---|---|
| 4,691,998 A | | 9/1987 | Sakagaito et al. .......... 350/616 |
| 4,820,911 A | * | 4/1989 | Arackellian et al. ........ 235/467 |
| 4,967,076 A | * | 10/1990 | Schuhmacher et al. ..... 250/236 |
| 5,475,206 A | * | 12/1995 | Reddersen et al. .... 235/462.01 |
| 5,559,320 A | * | 9/1996 | Loya ........................... 235/467 |
| 5,565,671 A | | 10/1996 | Kirkeby et al. .............. 235/472 |
| 5,687,017 A | | 11/1997 | Katoh et al. ................. 359/216 |
| 5,992,747 A | | 11/1999 | Katoh et al. ........... 255/462.43 |

FOREIGN PATENT DOCUMENTS

| | | |
|---|---|---|
| DE | 555 545 | 10/1974 |
| DE | 31 06914 A1 | 9/1982 |
| DE | 0 431 831 A1 | 6/1991 |
| JP | 9-259213 | 10/1997 |

* cited by examiner

*Primary Examiner*—Karl D. Frech
(74) *Attorney, Agent, or Firm*—Armstrong, Westerman, & Hattori, LLP

(57) ABSTRACT

A polygonal mirror unit having a base with a plurality of reflection surfaces. The polygonal mirror unit further includes a plurality of mirrors which have upper ends and lower ends and forms the reflection surfaces, a first base part having first grooves which receive the lower ends of the mirrors and first stoppers which push the mirrors towards an outside of the first base part, and a second base part having second grooves which receive the upper ends of the mirrors and second stoppers which push the mirrors towards an outside of the second base part.

20 Claims, 54 Drawing Sheets

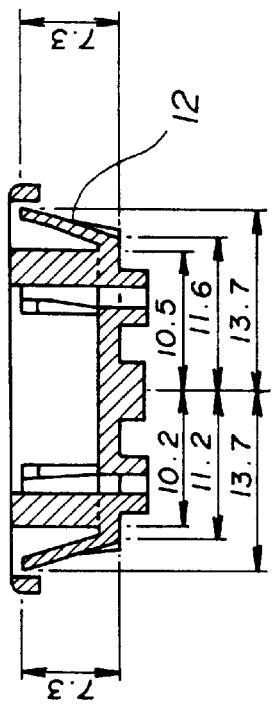
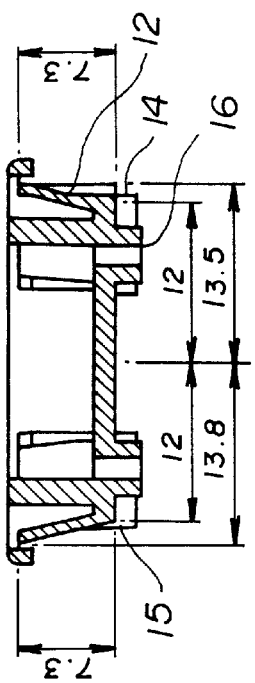
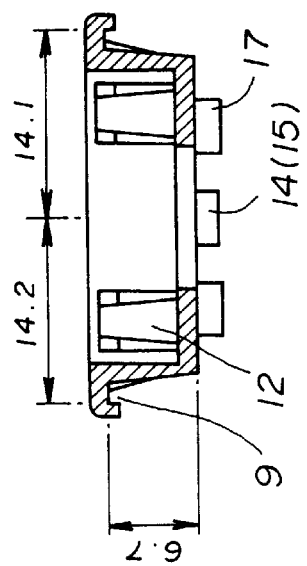
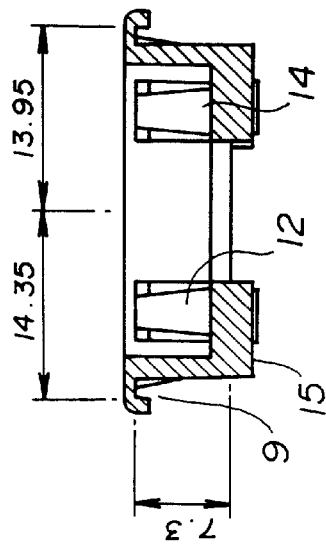

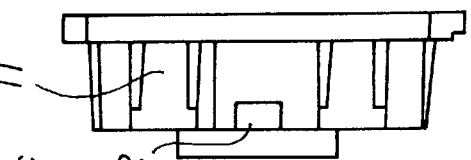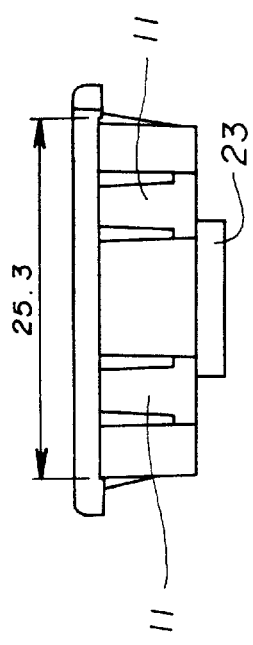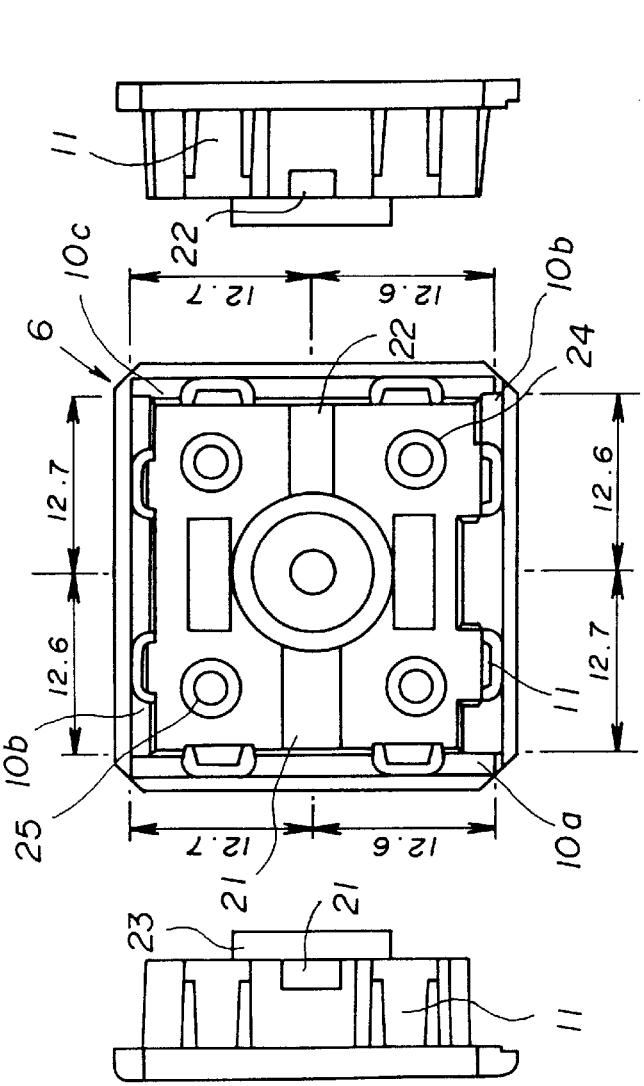

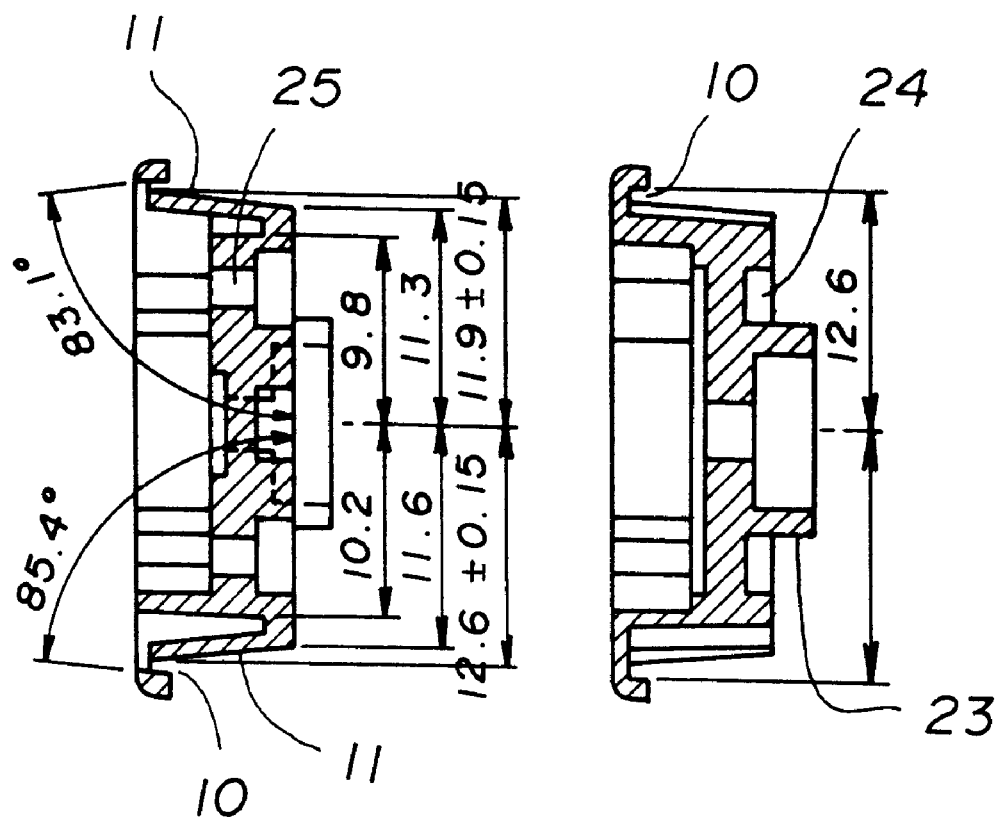

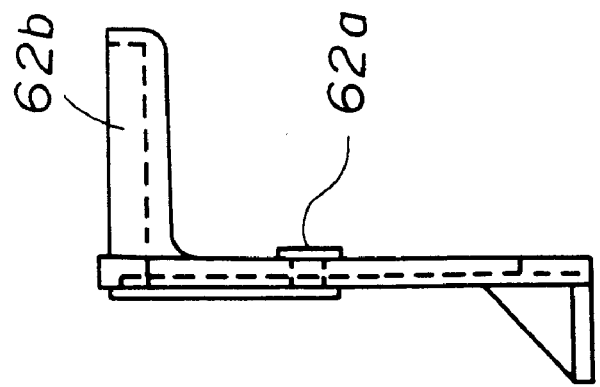
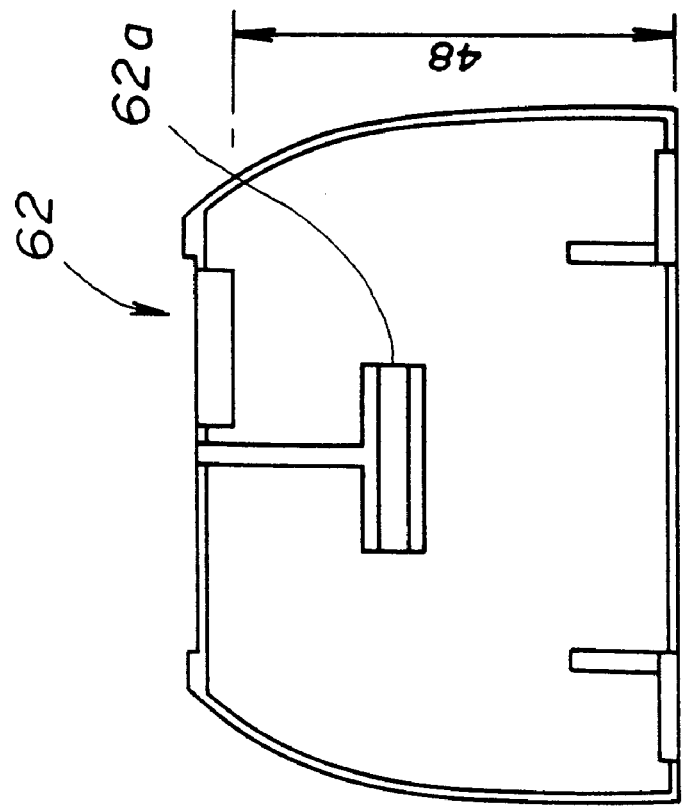

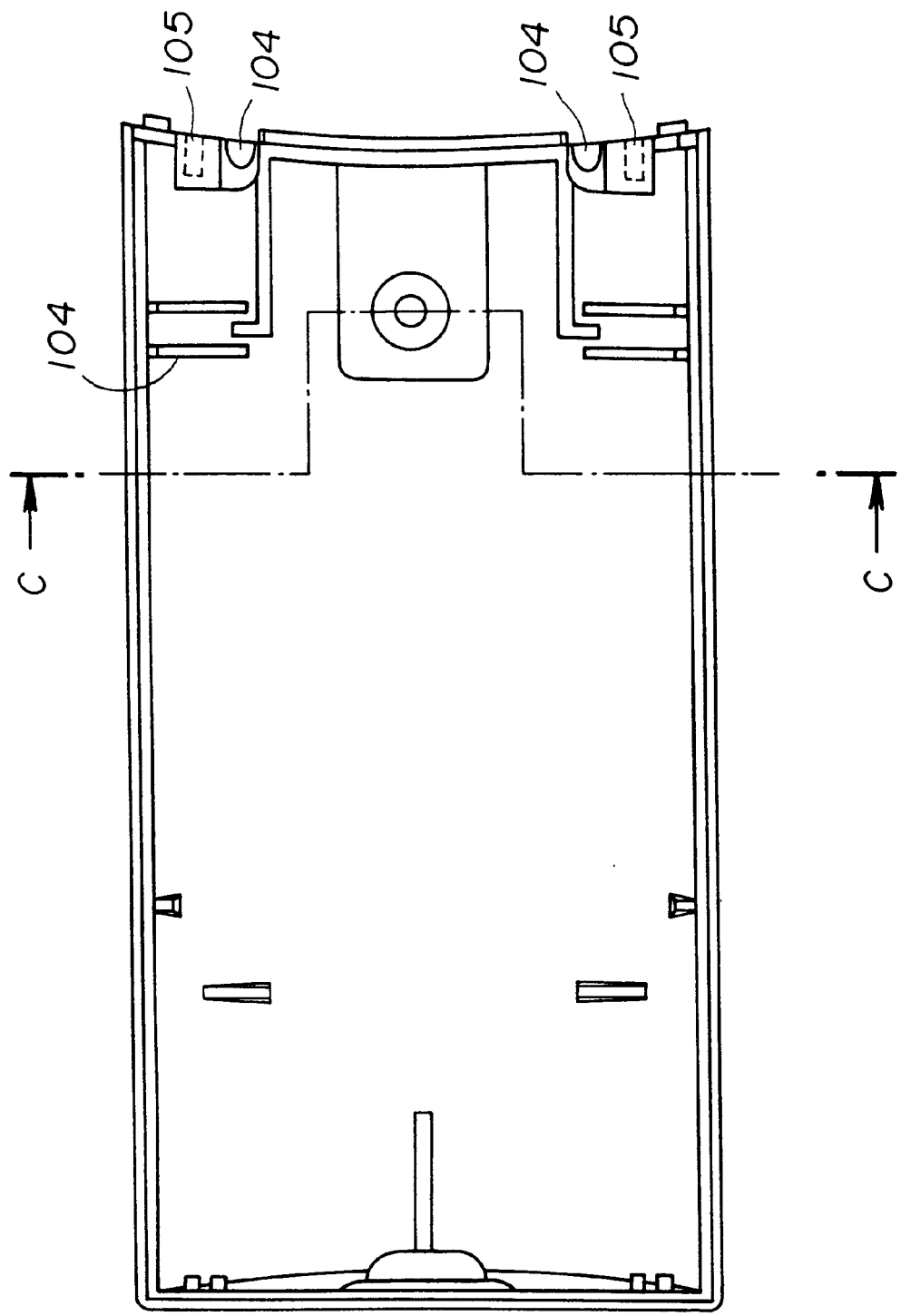

POLYGONAL MIRROR UNIT, OPTICAL SCANNING APPARATUS AND BAR CODE READER

BACKGROUND OF THE INVENTION

1. Field of the Invention

The present invention generally relates to polygonal mirror units, optical scanning apparatuses and bar code readers, and more particularly to a polygonal mirror unit having reflection surfaces arranged with a high accuracy, and an optical scanning apparatus and a bar code reader which use such a polygonal mirror unit.

2. Description of the Related Art

Optical apparatuses such as laser printers and laser scanners are provided with a scan mechanism which causes a light beam emitted from a light beam to scan. The scan mechanism in many cases includes a polygonal mirror unit which is rotated by a motor.

The polygonal mirror unit includes a plurality of reflection surfaces, that is, mirror surfaces. As the polygonal mirror unit undergoes one revolution by being rotated by the motor, it is possible to make a number of scans equal to the number of reflection surfaces of the polygonal mirror unit. For this reason, the polygonal mirror unit is often used in apparatuses which require high-speed scans to be made.

Generally, there are demands to reduce the size, weight and cost of apparatuses, including optical apparatuses such as laser printers and laser scanners. Consequently, there are strong demands to also reduce the size, weight and cost of the polygonal mirror unit.

Conventional polygonal mirror units are constructed as follows.

According to a first conventional polygonal mirror unit, a base has a plurality of surfaces, and a reflection mirror is adhered on each of the surfaces of the base by use of an adhesive agent or an adhesive tape. The base is molded from a resin or, is formed from a metal or the like.

On the other hand, according to a second conventional polygonal mirror unit, a base having a plurality of surfaces corresponding to reflection surfaces is molded from a resin, and the reflection surfaces are formed on the surfaces of the base by evaporation. For example, aluminum is used as the material forming the reflection surfaces. The evaporation of the aluminum to form the reflection surfaces can be carried out simultaneously with respect to a plurality of bases.

However, the following problems exist in the conventional polygonal mirror units.

According to the first conventional polygonal mirror unit, it is necessary to adhere the reflection mirrors one by one onto the corresponding surfaces of the base. As a result, there are problems in that a large number of steps are required to make the polygonal mirror unit, and the production cost of the polygonal mirror unit is high.

In addition, in optical scanning apparatuses, there are demands to improve the accuracy of the dimensions of various parts of a scan mechanism, because the dimensions of the various parts determine the performance of the optical scan apparatus. The polygonal mirror unit is no exception. But according to the first conventional polygonal mirror unit, there are problems in that it is difficult to secure a sufficiently high accuracy with which the reflection mirrors are adhered onto the corresponding surfaces of the base, and it requires a skilled person to adhere the reflection mirrors on the surfaces of the base.

On the other hand, the second conventional polygonal mirror unit is made by the steps of integrally molding the base from the resin, and forming the reflection surfaces by evaporation. Hence, the number of steps required to make the second conventional polygonal mirror unit is smaller than that required to make the first conventional polygonal mirror unit. However, the following problems are introduced when molding the base from the resin.

That is, as a general problem introduced upon resin molding, deforming or warping of the molded resin part after being cooled is inevitable due to contraction of the resin. In the case of the polygonal mirror unit, the scan of the light beam is generated by the reflection of the light beam by the reflection surface, and the planar accuracy of each of the reflection surfaces greatly affects the performance of the optical scan. However, when the planar accuracy of the reflection surfaces deteriorates due to the distortion or warp of the molded resin base particularly at the reflection surfaces, there is a problem in that a desired performance cannot be obtained by the optical scan unit which uses such a polygonal mirror unit.

Therefore, the conventional polygonal mirror units have problems from the point of view of the high production cost and poor performance.

SUMMARY OF THE INVENTION

Accordingly, it is a general object of the present invention to provide a novel and useful polygonal mirror unit, optical scanning apparatus and bar code reader, in which the problems described above are eliminated.

Another and more specific object of the present invention is to provide a polygonal mirror unit, optical scanning apparatus and bar code reader, which can be produced at a relatively low cost and can realize a high planar accuracy of reflection surfaces as compared to the conventional polygonal mirror unit, optical scanning apparatus and bar code reader which use a molded resin base having reflection surfaces formed thereon by evaporation.

Still another object of the present invention is to provide a polygonal mirror unit having a base with a plurality of reflection surfaces, comprising a plurality of mirrors which have upper ends and lower ends and forms the reflection surfaces, a first base part having first grooves which receive the lower ends of the mirrors, and first stoppers which push the mirrors towards an outside of the first base part, and a second base part having second grooves which receive the upper ends of the mirrors, and second stoppers which push the mirrors towards an outside of the second base part, where the first and second base parts are connected to form the base. According to the polygonal mirror unit of the present invention, the polygonal mirror unit can be produced at a relatively low cost and it is possible to realize a high planar accuracy of the reflection surfaces as compared to the conventional polygonal mirror unit which uses a molded resin base having reflection surfaces formed thereon by evaporation.

A further object of the present invention is to provide an optical scanning apparatus comprising a light source which emits a light beam, and a polygonal mirror unit which rotates and has a base with a plurality of reflection surfaces which reflect the light beam from the light source to generate a scanning line beam, where the polygonal mirror unit comprises a plurality of mirrors which have upper ends and lower ends and forms the reflection surfaces, a first base part having first grooves which receive the lower ends of the mirrors, and first stoppers which push the mirrors towards an outside of the first base part, and a second base part having second grooves which receive the upper ends of the mirrors, and second stoppers which push the mirrors towards an outside of the second base part, and the first and second base parts are connected to form the base. According to the optical scanning apparatus of the present invention, the polygonal mirror unit can be produced at a relatively low cost and it is possible to realize a high planar accuracy of the reflection surfaces as compared to the conventional polygonal mirror unit which uses a molded resin base having reflection surfaces formed thereon by evaporation.

Another object of the present invention is to provide a bar code reader comprising a housing having a columnar shape with a generally flat front face, a generally semicircular rear face, and top and bottom surfaces, a pair of bearing parts respectively provided on the top and bottom surfaces of the housing, an optical unit which emits a scanning light beam, a reading window provided in the front face of the housing and transmitting the scanning light beam outside the housing, a display part, and a switch integrally formed on the display part. According to the bar code reader of the present invention, it is possible to cope with various kinds of bar code reading operations, because the bar code reader can be easily be set up at different orientations to suit the needs.

Other objects and further features of the present invention will be apparent from the following detailed description when read in conjunction with the accompanying drawings.

BRIEF DESCRIPTION OF THE DRAWINGS

FIGS. 6A through 6D respectively are cross sectional views of the lower base part along four in directions;

FIG. 8A is a top view showing the upper base part:

FIGS. 8B through 8D respectively are side views showing the upper base part shown in FIG. 8A viewed from three directions;

FIGS. 10A and 10B respectively are cross sectional views showing the upper base part;

FIGS. 46A and 46B respectively are a bottom view and a side view showing the partitioning wall;

FIG. 49 is a bottom view showing the lower cover part;

DESCRIPTION OF THE PREFERRED EMBODIMENTS

A description will be given of an embodiment of a polygonal mirror unit according to the present invention.

Figure 1A:
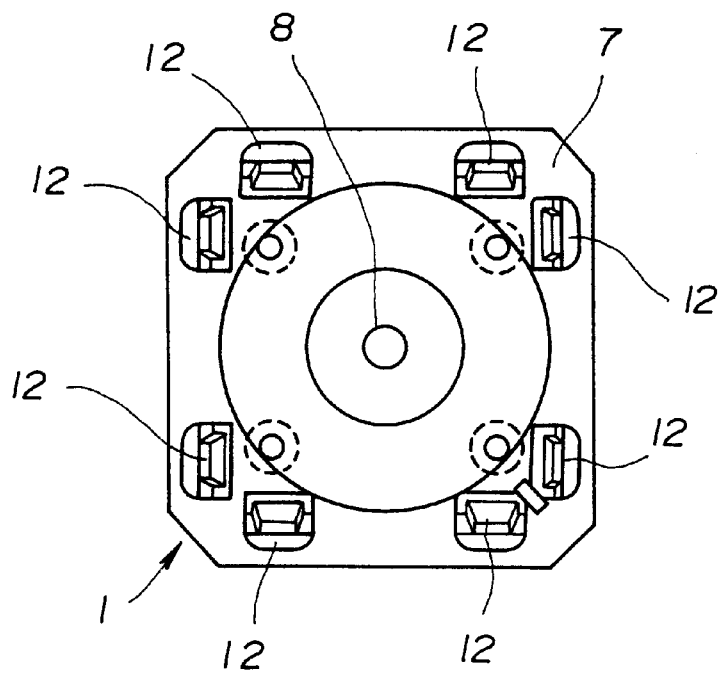
FIGS. 1A and 1B respectively are a bottom view and a side view showing an embodiment of a polygonal mirror unit according to the present invention.
Figure 1B:
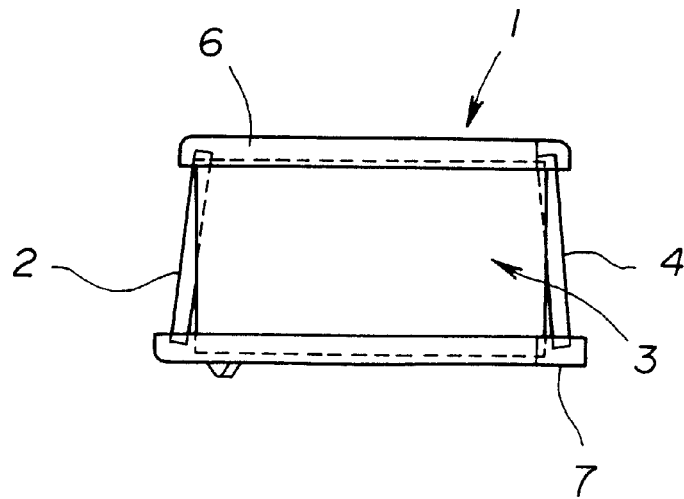

FIGS. 1A and 1B respectively are a bottom view and a side view showing this embodiment of the polygonal mirror unit. In addition, FIGS. 2A and 2B respectively are a top view and a cross sectional view showing this embodiment of the polygonal mirror unit. FIG. 2B is a cross sectional view taken along a line A—A in FIG. 2A.

In FIGS. 1A through 2B, a polygonal mirror unit 1 is mounted with reflection mirrors 2 through 5. These reflection mirrors 2 through 5 are planar mirrors having the same rectangular shape and size. The following advantages are obtainable by use of such reflection mirrors 2 through 5 having the same shape and size.

Generally, reflection surfaces of a polygonal mirror unit are slightly inclined with respect to a rotary axis of the polygonal mirror unit. Hence, the planar shape of each reflection surface becomes a trapezoidal shape since a base of the polygonal mirror unit has a polygon shape.

In addition, in the case of a polygonal mirror unit used in a bar code reader or the like, the polygonal mirror unit must generate parallel scanning light beams at predetermined intervals. Hence, in such a case, the inclinations of the reflection surfaces are set to different values with respect to the rotary axis of the polygonal mirror unit. As a result, the planar shapes of the reflection surfaces naturally become different.

Conventionally, the reflection mirrors forming the reflection surfaces of the polygonal mirror unit are cut from a large rectangular mirror. For this reason, wasted parts are introduced when trapezoidal reflection mirrors are cut from the large rectangular mirror.

Furthermore, since the shape of the reflection mirrors of the polygonal mirror unit which is used in the bar code reader or the like are different. Hence, the correct reflection mirror must be selected from among a plurality of reflection mirrors having similar shapes, and then adhered onto the corresponding surface of the base. In addition, the orientation, that is, the top and bottom, of the selected reflection mirror must also be correct when adhering this mirror on the corresponding surface of the base. Such selection and orientation of the mirrors put considerable load on the production or assembling process.

On the other hand, when the rectangular reflection mirrors 2 through 5 having the same shape and size are used as in this embodiment, the rectangular reflection mirrors 2 through 5 can be cut efficiently from a large rectangular mirror without introducing wasted parts. Moreover, since the rectangular reflection mirrors 2 through 5 have the same shape, it is unnecessary to make the selection and orientation of the rectangular reflection mirrors 2 through 5, thereby considerably simplifying the production or assembling process.

For these advantageous reasons, this embodiment mounts on the reflection surfaces the reflection mirrors having the same shape and size.

A base of the polygonal mirror unit 1 is made up of an upper base part 6 and a lower base part 7 which are made of a resin such as a polycarbonate resin. The kind of resin used for the upper and lower base parts 6 and 7 is not limited to the polycarbonate resin, but it is desirable to use a kind of resin which is relatively hard when the durability of the base is take into consideration. Of course, the upper and lower base parts 6 and 7 need not be made of a resin, and it is possible to use other materials such as metals and metal alloys. The base of the polygonal mirror unit 1 is formed by connecting the upper and lower base parts 6 and 7. A rotary shaft hole 8 is formed at the central parts of the upper and lower base parts 6 and 7, and a motor shaft is inserted into this rotary shaft hole 8.

The width of the upper base part 6 along the horizontal direction in FIGS. 1B and 2B and the width of the lower base part 7 along the horizontal direction in FIGS. 1B and 2B are mutually different. In addition, the height of the upper base part 6 along the vertical direction in FIGS. 1B and 2B and the height of the lower base part 7 along the vertical direction in FIGS. 1B and 2B are mutually different. Furthermore, the upper and lower base parts 6 and 7 respectively are non-symmetrical to the right and left with respect to a vertical straight line which passes through the rotary shaft hole 8. The reasons for the non-symmetrical shape of the base will be described later.

Figure 2A:
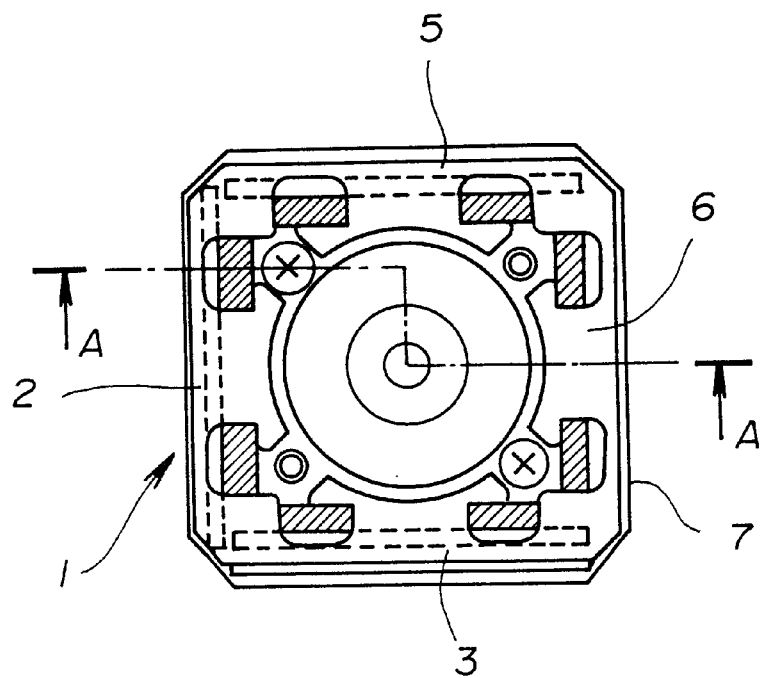
FIGS. 2A and 2B respectively are a top view and a cross sectional view showing the embodiment of the polygonal mirror unit.
Figure 2B:
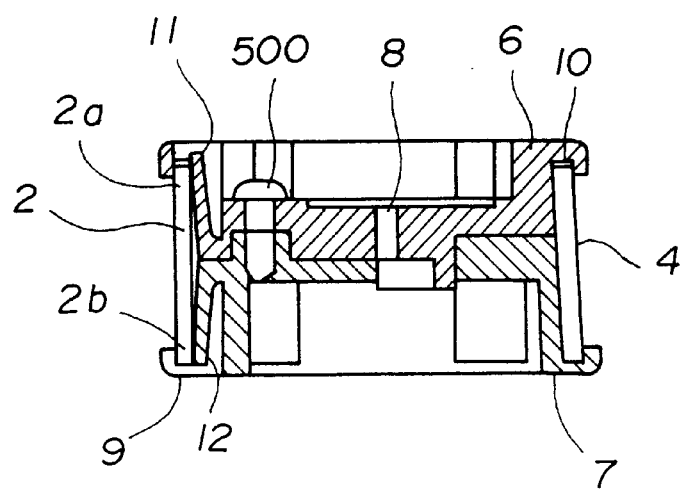

For the sake of convenience, FIG. 2A shows end parts of only the three reflection mirrors 2, 3 and 5 mounted on the upper and lower base parts 6 and 7. As may be seen from FIG. 1B, the reflection mirrors 2 through 5 mounted on the base are slightly inclined with respect to the rotary shaft hole 8. Inclination angles of the reflection mirrors 2 and 4 are different, and inclination angles of the reflection mirrors 3 and 5 are different. In other words, the inclination angles of the reflection mirrors 2 through 5 are mutually different.

As may be seen from the cross section shown in FIG. 2B, grooves 10 and 9 are formed in the upper and lower base parts 6 and 7 for receiving the end parts of the reflection mirrors 2 and 4. In addition, an upper end 2a and a lower end 2b of the reflection mirror 2 are urged towards the left in FIG. 2B by corresponding stoppers 11 and 12 which are formed on the upper and lower base parts 6 and 7. The inclination angle of the reflection mirror 2 is determined by the grooves 10 and 9 and the stoppers 11 and 12. The inclination angle of each of the other reflection mirrors 3 through 5 are similarly determined by the corresponding grooves 10 and 9 and stoppers 11 and 12.

Figure 3:
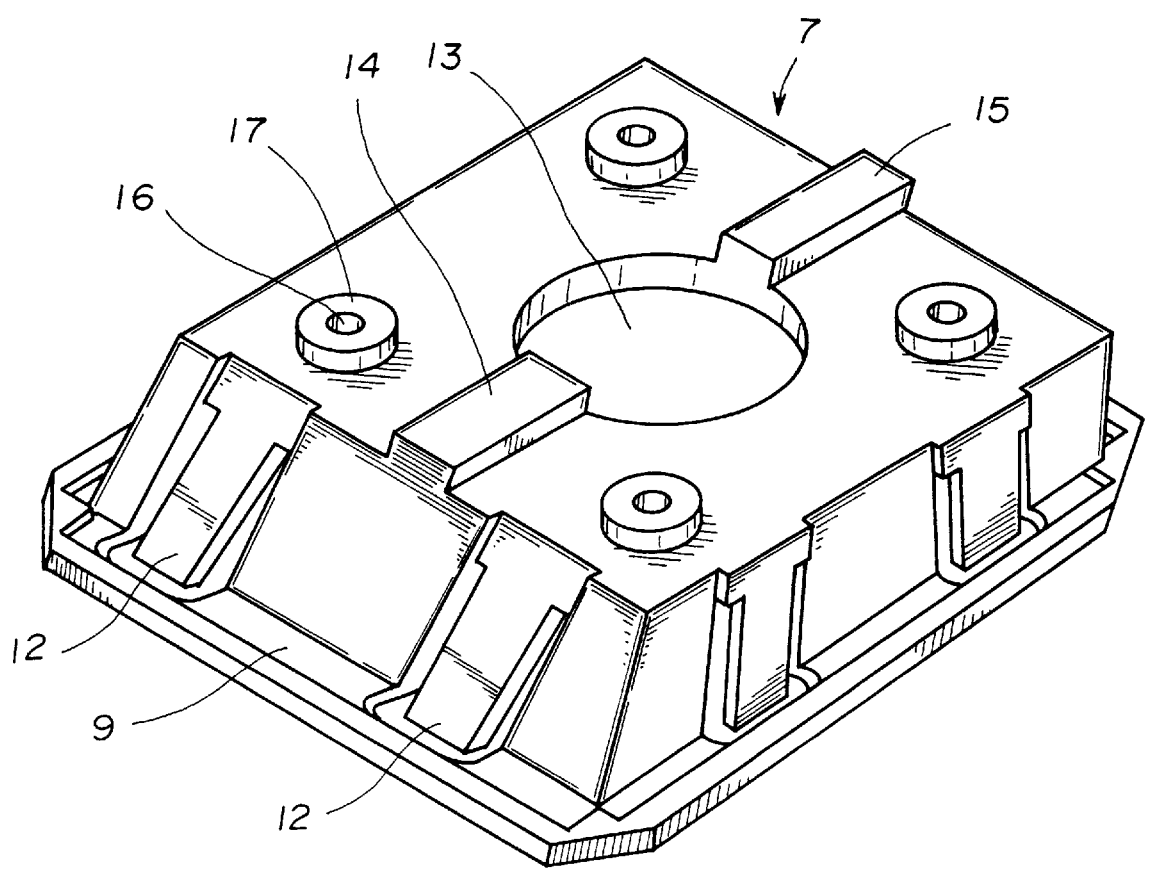
FIG. 3 is a perspective view showing a lower base part.
Figure 4A:
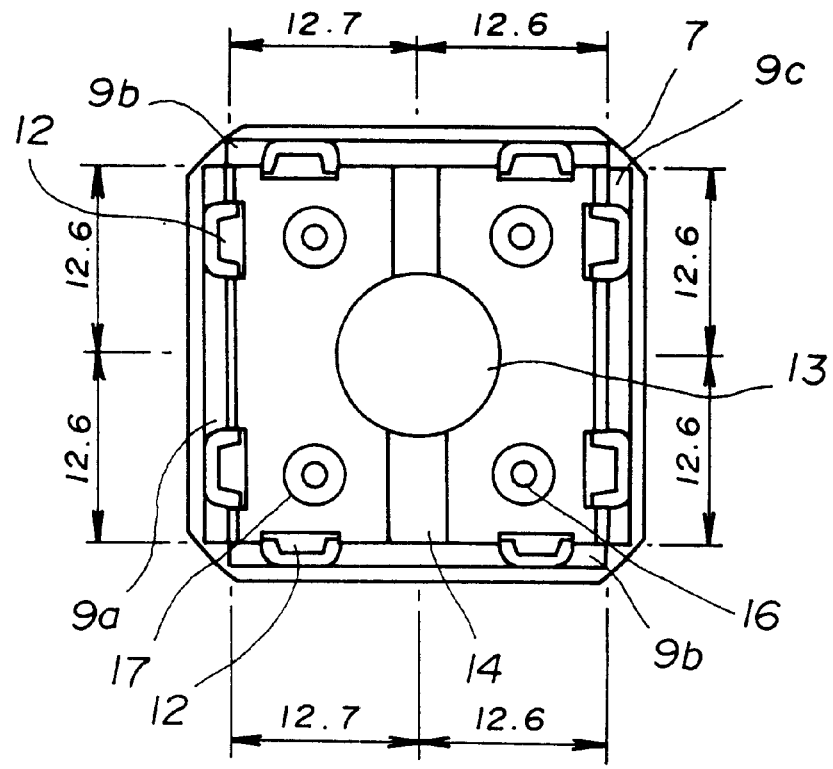
FIGS. 4A and 4B respectively are a top view and a side view showing the lower base part.
Figure 4B:
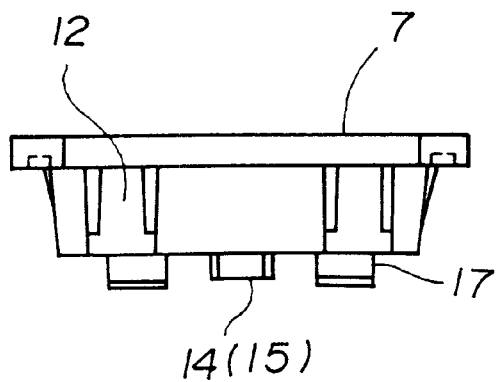
Figure 5:
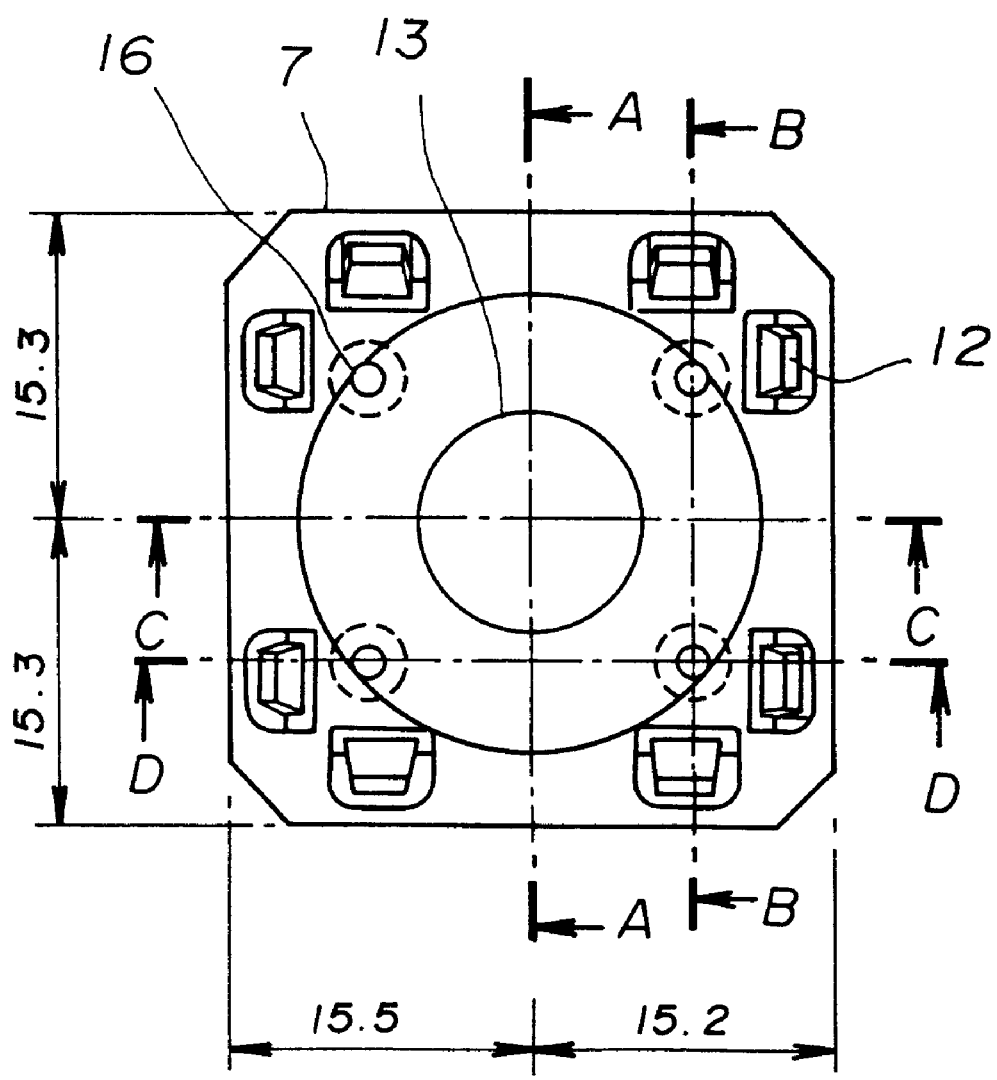
FIG. 5 is a bottom view showing the lower base part in a state rotated 90 degrees with respect to the top view shown in FIG. 3A.

FIG. 3 is a perspective view showing the lower base part 7. FIGS. 4A and 4B respectively are a top view and a side view showing the lower base part 7. FIG. 5 is a bottom view showing the lower base part 7 in a state rotated 90 degrees with respect to the top view shown in FIG. 3A.

In addition, FIGS. 6A through 6D respectively are cross sectional views of the lower base part 7 along four directions. More particularly, FIG. 6A is a cross sectional view taken along a line A—A in FIG. 5. FIG. 6B is a cross sectional view taken along a line B—B in FIG. 5. In addition, FIG. 6C is a cross sectional view taken along a line C—C in FIG. 5. Further, FIG. 6D is a cross sectional view taken along a line D—D in FIG. 5.

A circular opening 13 is formed at the center of the lower base part 7. As will be described later, a projection formed on the upper base part 6 is inserted into this circular opening 13. Ribs 14 and 15 are formed on the same extension line on a top part of the lower base part 7 making contact with the upper base part 6. The ribs 14 and 15 have mutually different widths. In this embodiment, the width of the rib 14 is wider than that of the rib 15. The ribs 14 and 15 are formed on the lower base part 7 at positions corresponding to a pair of grooves which are formed in the upper base part 6, as will be described later. Hence, the ribs 14 and 15 on the lower base part 7 fit into the corresponding grooves of the upper base part 6 when the upper and lower base parts 6 and 7 are connected to form the base, so that the upper and lower base parts 6 and 7 are connected in their correct orientations.

The grooves 9 are formed along the four sides of the lower base part 7 as described above, and in FIG. 4A, the four grooves 9 are labeled 9a through 9d. The lower ends of the reflection mirrors 2 through 5 fit into the corresponding grooves 9a through 9d. A pair of stoppers 12 is provided with respect to each of the grooves 9a through 9d. Each pair of stoppers 12 pushes the reflection mirror having the lower end fitted into the corresponding groove 9 in a direction towards the outside of the lower base part 7. For this reason, each reflection mirror is positively fixed to a predetermined position on the base.

Four screw holes 16 for receiving screws are formed around the periphery of the circular opening 13. The screw holes 16 are used when securing the upper and lower base parts 6 and 7 together, as will be described later. A cylindrical projection 17 is formed around the periphery of each screw hole 16. Each cylindrical projection 17 fixed into a corresponding recess formed in the upper base part 6, as will be described later.

Figure 7:
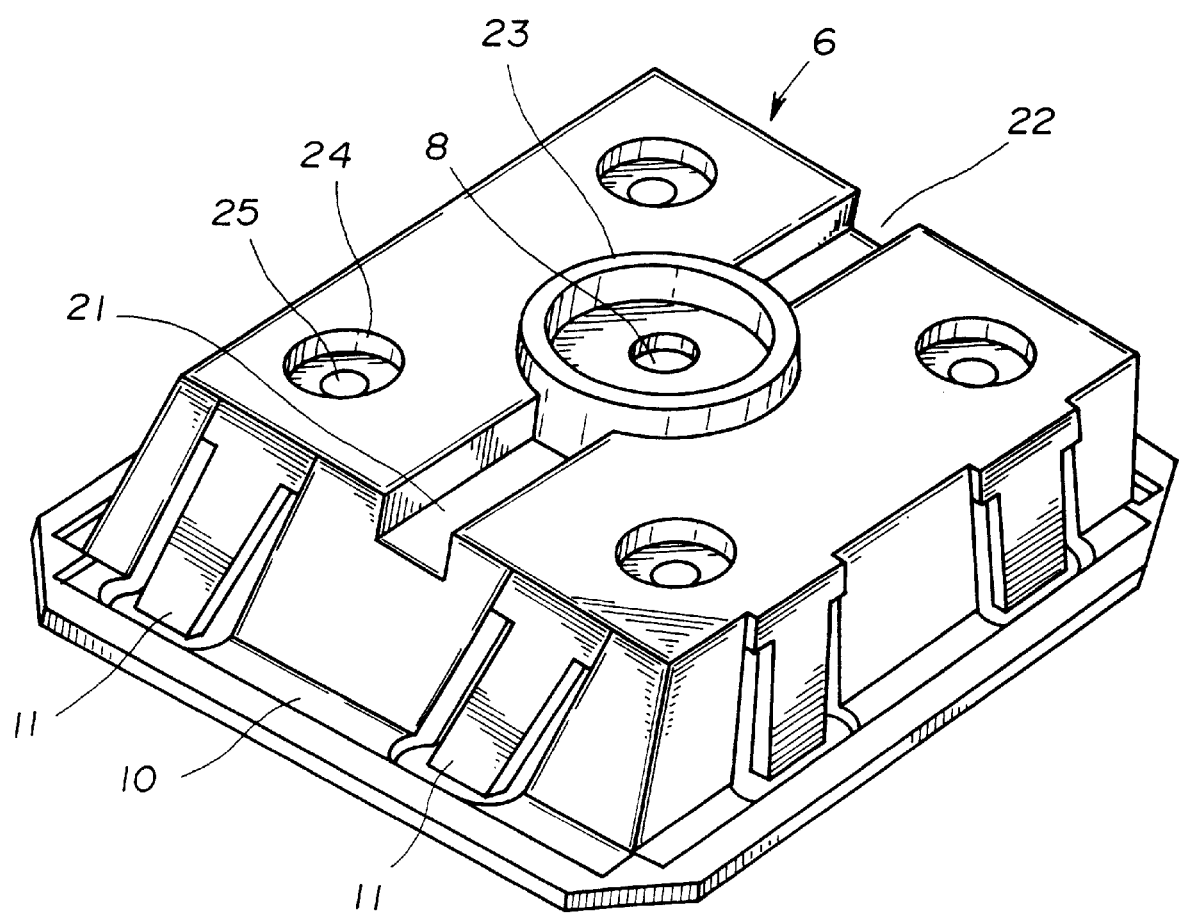
FIG. 7 is a perspective view showing an upper base part.

FIG. 7 is a perspective view showing the upper base part 6. FIG. 8A is a top view showing the upper base part 6, FIGS. 8B through 8D respectively are side views showing the upper base part 6 shown in FIG. 8A viewed from three directions.

Figure 9A:
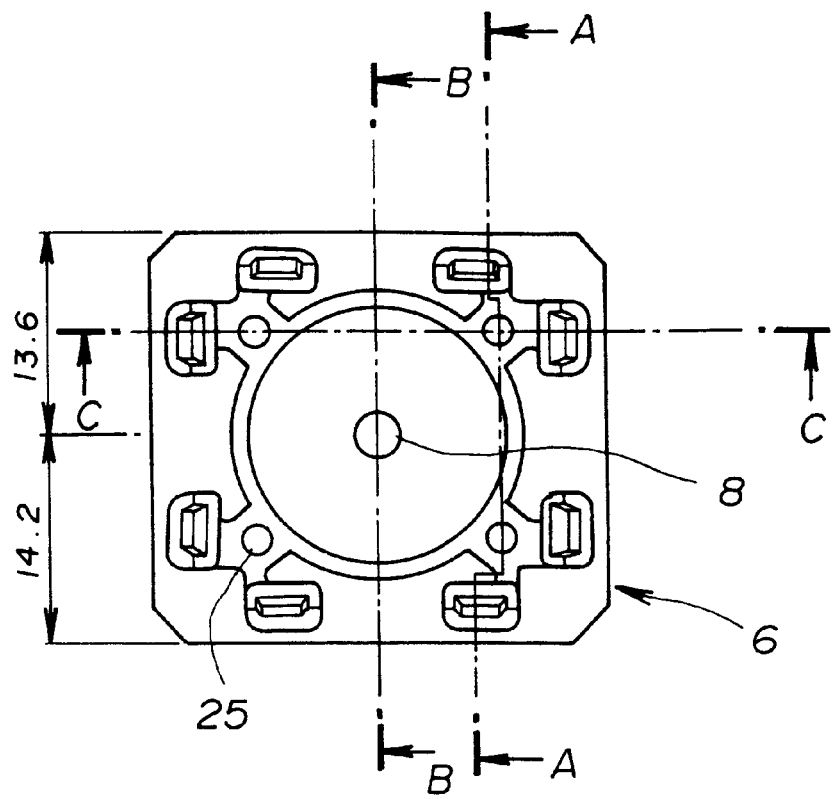
FIGS. 9A and 9B respectively are a bottom view and a cross sectional view showing the upper base part.
Figure 9B:
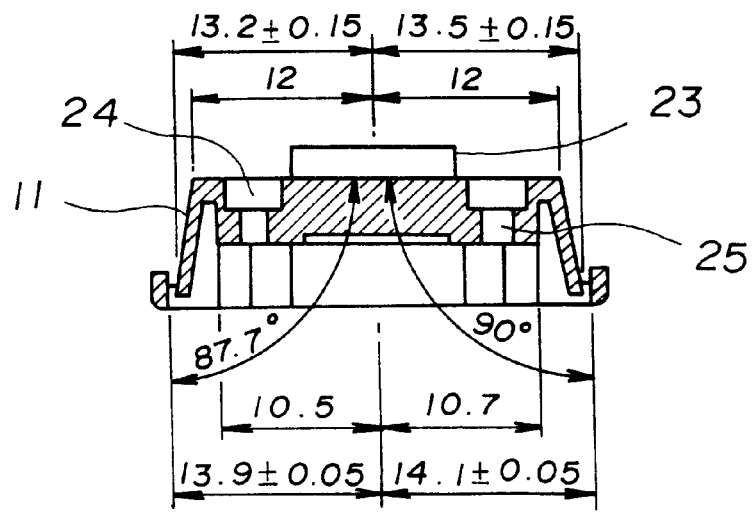

FIGS. 9A and 9B respectively are a bottom view and a cross sectional view showing the upper base part 6. FIGS. 10A and 10B respectively are cross sectional views showing the upper base part 6. More particularly, FIG. 9B is a cross sectional view taken along a line C—C in FIG. 9A. In addition, FIG. 10A is a cross sectional view taken along a line A—A in FIG. 9A, and FIG. 10B is a cross sectional view taken along a line B—B in FIG. 9A.

Grooves 21 and 22 are formed on the same extension line in a bottom part of the upper base part 6 making contact with the lower base part 7. The grooves 21 and 22 have mutually different widths. In this embodiment, the width of the groove 21 is wider than that of the groove 22. The grooves 21 and 22 are formed in the upper base part 6 at positions corresponding to ribs 14 and 15 which are formed on the lower base part 7. Hence, the ribs 14 and 15 on the lower base part 7 fit into the corresponding grooves 21 and 22 of the upper base part 6 when the upper and lower base parts 6 and 7 are connected to form the base. The orientations with which the upper and lower base parts 6 and 7 can be connected are determined by the ribs 14 and 15 and the corresponding grooves 21 and 22.

The rotary shaft hole 8 is formed at the central part of the upper base part 6. A cylindrical projection 23 is formed around the periphery of the rotary shaft hole 8. This cylindrical projection 23 fits into the circular opening 13 in the lower base part 7 when the upper and lower base parts 6 and 7 are connected.

In addition, four recesses 24 are formed around the periphery of the cylindrical projection 23, and a screw hole 25 is formed at the center of each of the recesses 24. Each recess 24 receives a corresponding one of the cylindrical projections 17 formed on the lower base part 7 when the upper and lower base parts 6 and 7 are connected.

The grooves 10 are formed along the four sides of the upper base part 6 as described above, and in FIG. 8A, the four grooves 10 are labeled 10a through 10d. The upper ends of the reflection mirrors 2 through 5 fit into the corresponding grooves 10a through 10d. A pair of stoppers 11 is provided with respect to each of the grooves 10a through 10d. Each pair of stoppers 11 pushes the reflection mirror having the upper end fitted into the corresponding groove 10 in a direction towards the outside of the upper base part 6. For this reason, each reflection mirror is positively fixed to a predetermined position on the base.

In the lower base part 7, the grooves 9a through 9d are formed so that ends of the grooves 9a through 9d do not overlap with each other. On the other hand, in the upper base part 6, the two ends of the groove 10b are arranged on the inside of one end of the groove 10a and one end of the groove 10c, while the two ends of the groove 10d are arranged on the inside of the other end of the groove 10a and the other end of the groove 10c, as shown in FIG. 8A.

As described above, in the case of the bar code reader and the like, the inclination angles of the reflection mirrors of the polygonal mirror unit are mutually different. But by arranging the grooves 10a through 10d of the upper base part 6 as described above, it is possible to easily and accurately restrict the inclination angles of the reflection mirrors 2 through 5 independently of each other.

After the corresponding parts of the upper and lower base parts 6 and 7 are matched, such as by inserting the cylindrical projections 23 of the upper base part 6 into the recesses 24 of the lower base part 7, the upper and lower base parts 6 and 7 are fixed together by a plurality of screws 500 as shown in FIG. 2B. The screws 500 are disposed concentrically to the rotary shaft hole 8, so as to eliminate the unbalance of mass or the like when the base rotates.

In FIGS. 4A, 5, 6A through 6D, 8A and 8B, 9A and 9B, and 10A and 10B, the dimensions are shown particularly about the rotary shaft hole 8, in arbitrary units. As shown in these figures, the upper and lower base parts 6 and 7 have structures which are non-symmetrical to the right and left about the vertical straight line passing through the rotary shaft hole 8, so as to independently restrict the inclination angles of the reflection mirrors 2 through 5.

It is possible to form the grooves 10 and 9 of the upper and lower base parts 6 and 7 so that the side ends of the reflection mirrors 2 through 5 do not partially overlap as in this embodiment. However, if the side ends of the reflection mirrors 2 through 5 do not partially overlap and the reflection mirrors 2 through 5 are arranged at mutually different inclination angles, a gap is formed between the side ends of two mutually adjacent reflection mirrors. Such a gap cannot reflect the light from the light source, and no scanning light beam can be generated during an interval corresponding to this gap. But according to this embodiment, it is possible to minimize the interval in which the scanning light beam cannot be generated, by forming the grooves 10 and 9 in the upper and lower base parts 6 and 7 so that the side ends of two mutually adjacent reflection mirrors partially overlap.

Next, a description will be given of the step of making this embodiment of the polygonal mirror unit, by referring to FIGS. 11 through 13.

Figure 11:
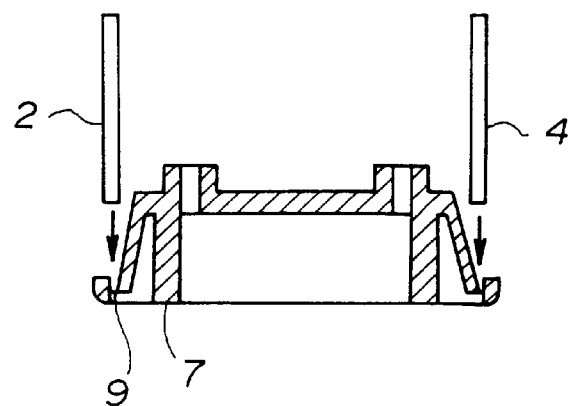
FIG. 11 is a cross sectional view for explaining a step of making the polygonal mirror unit.

When assembling the polygonal mirror unit 1, the lower ends of the reflection mirrors 2 through 5 are inserted into the grooves 9a through 9d of the lower base part 7, as shown in FIG. 11. Since the reflection mirrors 2 through 5 have the same size and shape, it does not matter which one of the reflection mirrors 2 through 5 is inserted into which one of the grooves 9a through 9d.

When the lower ends of the reflection mirrors 2 through 5 are inserted into the grooves 9a through 9d of the lower base part 7, the stoppers 12 urge the reflection mirrors 2 through 5 in directions towards the outside of the polygonal mirror unit 1. Hence, the reflection mirrors 2 through 5 are held by the grooves 9a through 9d, and the inclination angles of the reflection mirrors 2 through 5 are maintained approximately to the respective desired inclination angles.

Figure 12:
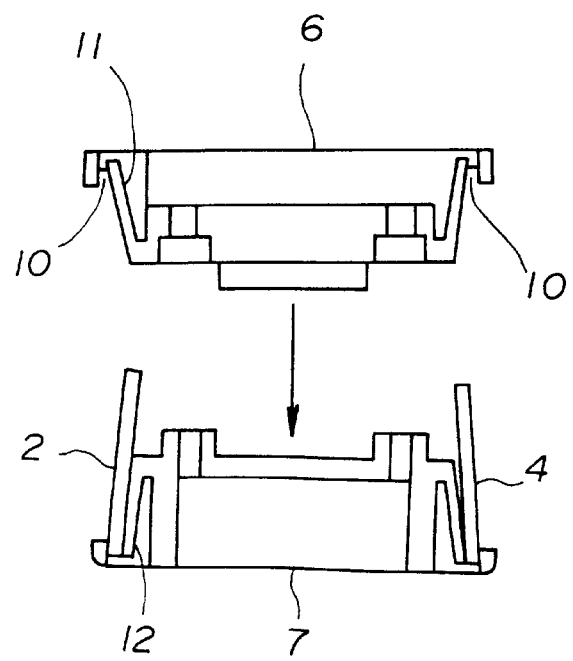
FIG. 12 is a cross sectional view for explaining a step of making the polygonal mirror unit.

Next, the upper base part 6 is fit onto the lower base part 7 which holds the reflection mirrors 2 through 5, as shown in FIG. 12. When the upper base part 6 is fit onto the lower base part 7, the mere fitting of the upper base part 6 onto the lower base part 7 naturally guide the upper ends of the reflection mirrors 2 through 5 into the grooves 10a through 10d of the upper base part 6, because the inclination angles of the reflection mirrors 2 through 5 are maintained approximately to the respective desired inclination angles by the functions of the grooves 9a through 9d and the stoppers 12. Particularly since the stoppers 11 project slightly towards the outside of the polygonal mirror unit 1, the upper ends of the reflection mirrors 2 through 5 are guided by the stoppers 1 and inserted into the grooves 10a through 10d.

Figure 13:
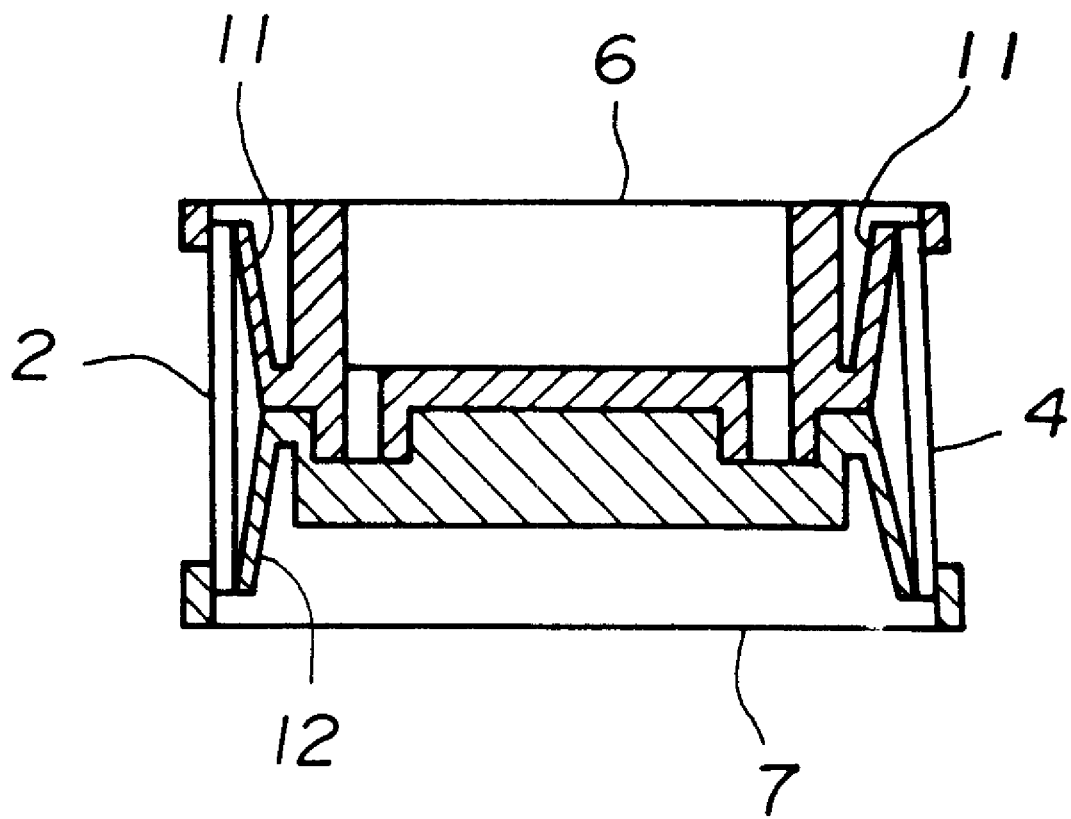
FIG. 13 is a cross sectional view for explaining a step of making the polygonal mirror unit.

Thereafter, the connected upper and lower base parts 6 and 7 shown in FIG. 13 are fixed together by the screws 500 described above.

Accordingly, in this embodiment, there i no need to use an adhesive agent or an adhesive tape to mount the reflection mirrors on the base. Further, no step is required to position each of the reflection mirrors. For this reason, the assembling efficiency of this embodiment of the polygonal mirror unit 1 is extremely high.

Because the stoppers 11 and 12 are located in the vicinities of the four corners of each of the reflection mirrors 2 through 5, it is possible to make the diameter of the polygonal mirror unit 1 relatively small. If the stoppers were located in the vicinity of the center of rotation of the polygonal mirror unit 1, there is a possibility of increasing the diameter of the polygonal mirror unit 1 due to the provision of the stoppers. Hence, in a case where it is desirable to minimize the diameter of the polygonal mirror unit 1, it is preferable not to locate the stoppers in the vicinity of the center of rotation of the polygonal mirror unit 1.

In addition, the four corners of the upper base part 6 and the four corners of the lower base part 7 are cut or rounded as shown in FIGS. 8A and 4A, for example. Thus, it is possible to further minimize the radius of the polygonal mirror unit 1.

Figure 14A:
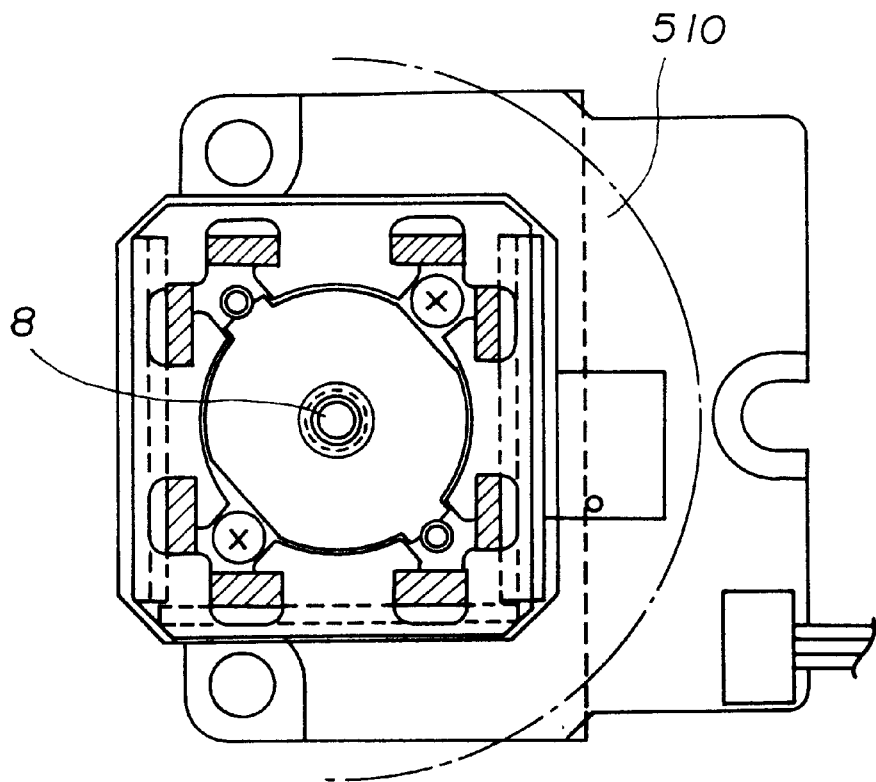
FIGS. 14A and 14B respectively are a top view and a side view showing the polygonal mirror unit mounted on a motor.
Figure 14B:
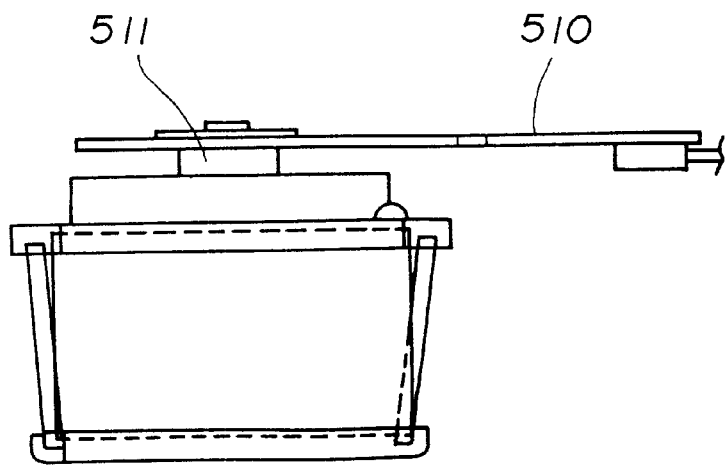

FIGS. 14A and 14B respectively are a top view and a side view showing the polygonal mirror unit 1 mounted on a motor 511. In FIGS. 14A and 14B, the motor 511 is provided on a printed circuit board 510, and a motor shaft of this motor 511 is fixedly inserted into the rotary shaft hole 8 of the polygonal mirror unit 1, so that the polygonal mirror unit 1 is rotated by the motor 511.

Next, a description will be given of an embodiment of a bar code reader according to the present invention. This embodiment of the bar code reader uses the embodiment of the polygonal mirror unit described above.

Figure 15:
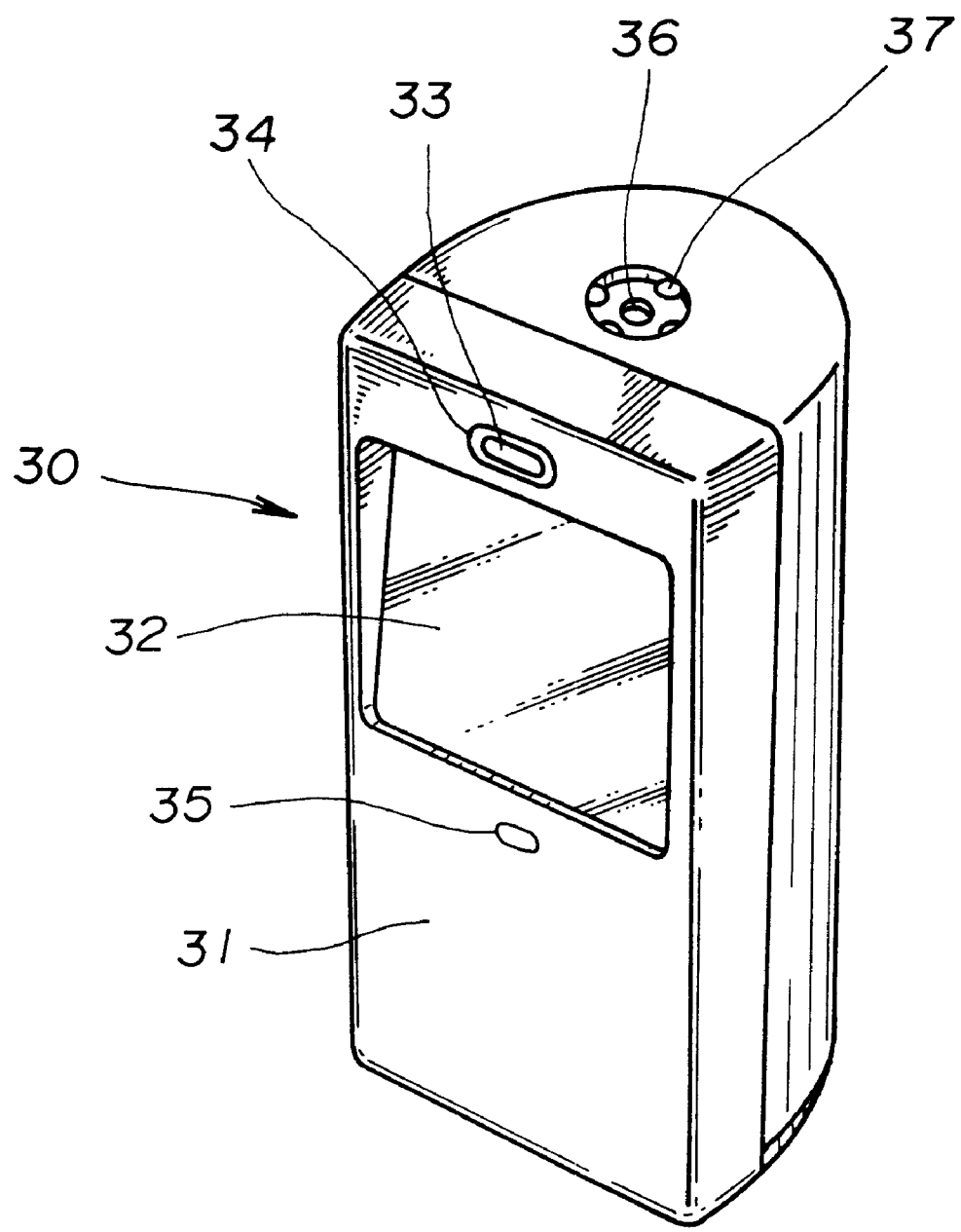
FIG. 15 is a perspective view showing an embodiment of a bar code reader according to the present invention.

FIG. 15 is a perspective view showing this embodiment of the bar code reader. As shown in FIG. 15, a bar code reader 30 has a shape generally corresponding to a cylinder which is cut along a plane parallel to a center axis of the cylinder so that a horizontal cross section is approximately a U-shape. A front face 31 of the bar code reader 30 includes a reading window 32 through which the scanning line beam is emitted, a LED display part 33 which is used in common with a switch 34, and an opening 35 through which a buzzer sound is output. Bearing parts 36 are provided at the top and bottom parts of the bar code reader 30, although only the bearing part 36 provided at the top part is visible in FIG. 15. Ribs 37 are provided radially within the bearing part 36, and four ribs 37 are provided in this embodiment. The reading window 32 is inclined by a predetermined angle with respect to the front face 31.

Figure 16:
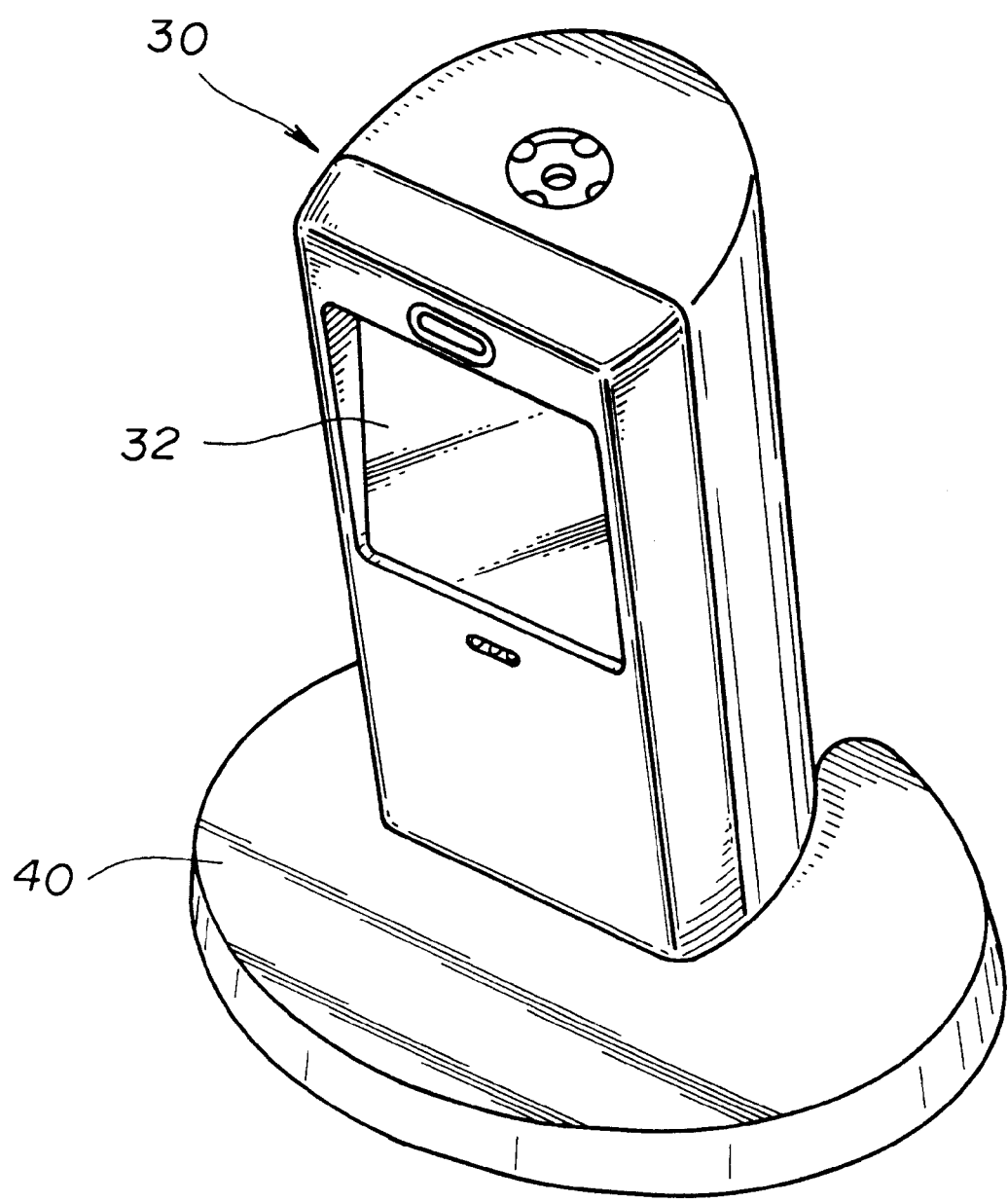
FIG. 16 is a perspective view showing the bar code reader shown in FIG. 15 in a state placed on a vertical holder.

FIG. 16 is a perspective view showing the bar code reader 30 shown in FIG. 15 in a state placed on a vertical holder 40. As shown in FIG. 16, the vertical holder 40 supports the bar code reader 30 in a generally vertical position where the bar code reader 30 is inclined forward. In this position of the bar code reader 30, the scanning light beam emitted through the reading window 32 is directed downwards, thereby improving the operation efficiency of an operator who operates the bar code reader 30.

Figure 17:
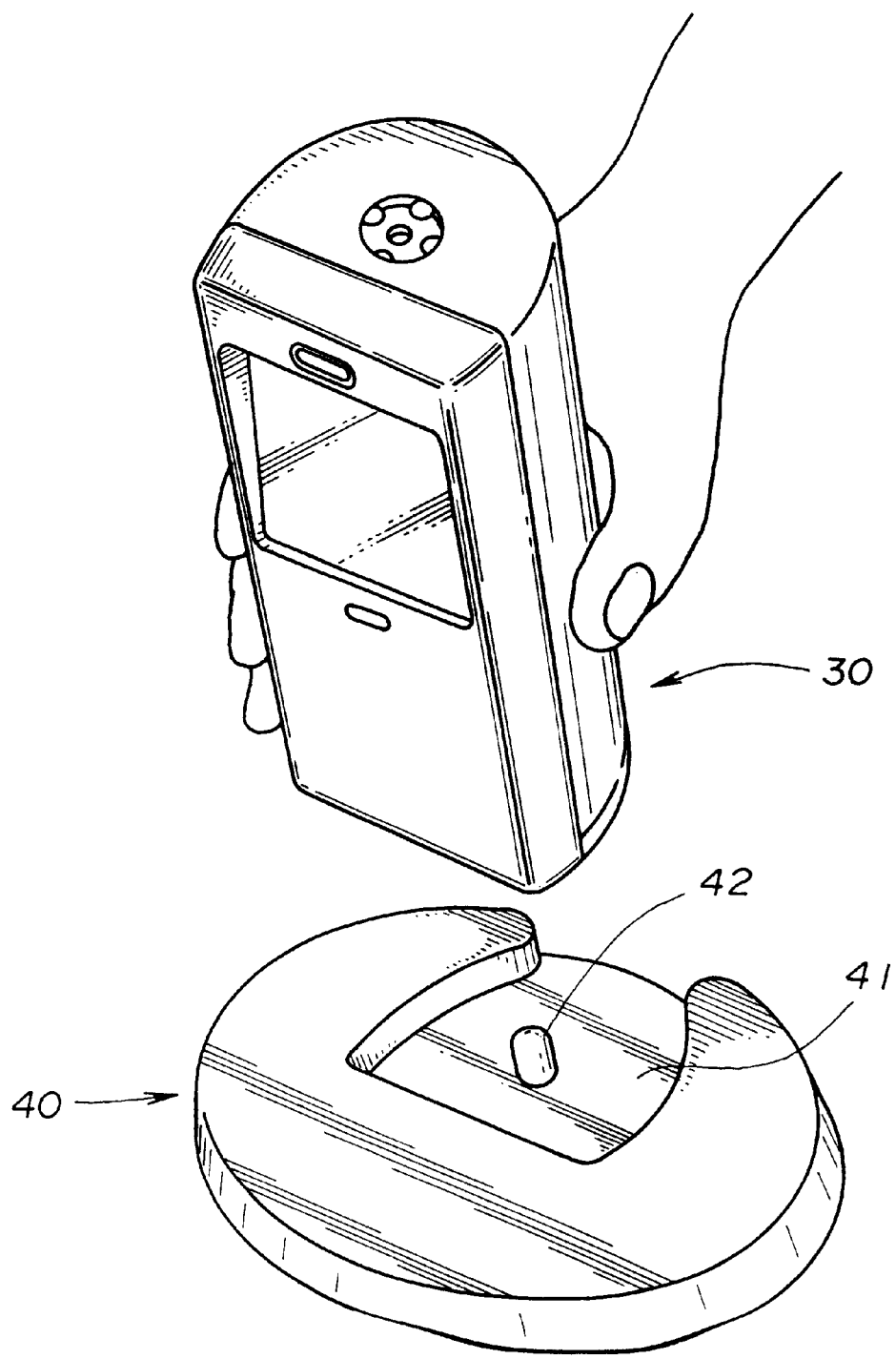
FIG. 17 is a perspective view showing the bar code reader shown in FIG. 15 in a state of being removed from the vertical holder to make a manual scan.

FIG. 17 is a perspective view showing the bar code reader 30 shown in FIG. 15 in a state of being removed from the vertical holder 40 to make a manual scan in which the operator moves the bar code reader 30 by hand to make the scan. As shown in FIG. 17, a recess 41 having the same shape as the bottom part of the bar code reader 30 is formed in the vertical holder 40. The bottom part of the bar code reader 30 is placed within this recess 41. In addition, a pin 42 is provided at a central part of the recess 41. This pin 42 is inserted into the bearing part 36 which is provided on the bottom part of the bar code reader 30 when the bar code reader 30 is placed in the recess 41, so as to position the bar code reader 30 on the vertical holder 40 and to prevent the positioned and inclined bar code reader 30 from falling down from the vertical holder 40.

Figure 18:
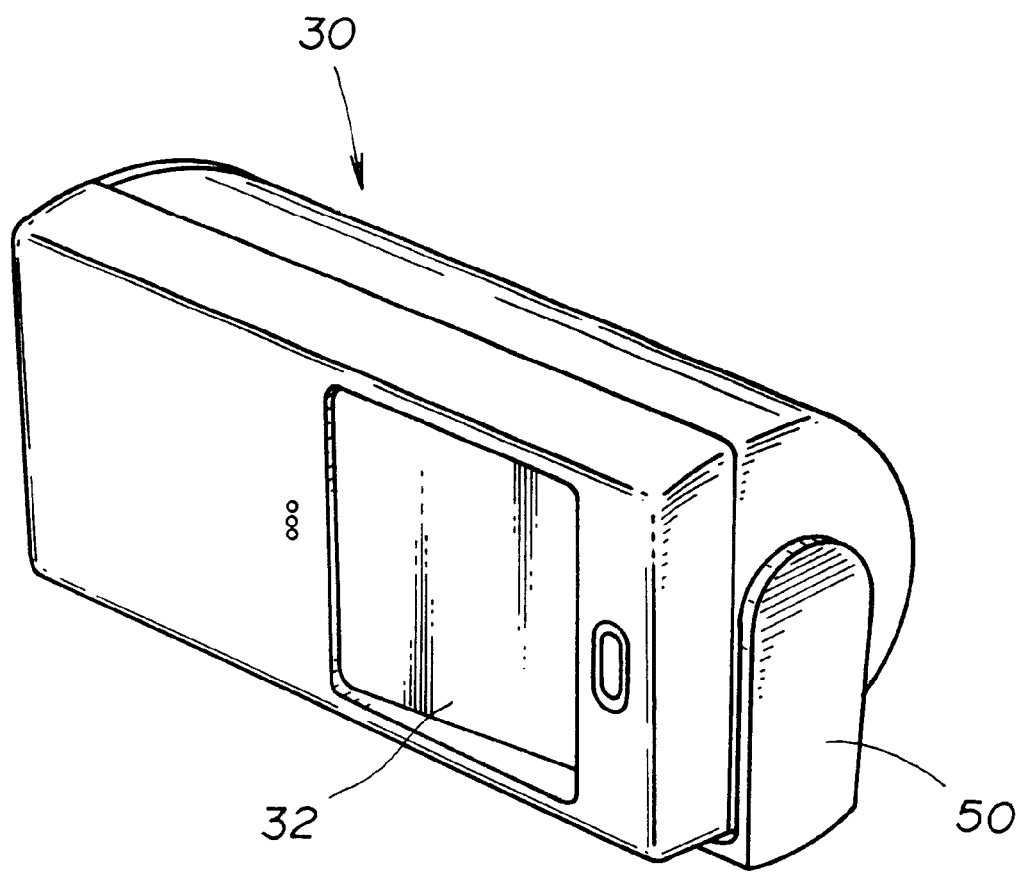
FIG. 18 is a perspective view showing the bar code reader shown in FIG. 15 in a state mounted on a horizontal holder.

FIG. 18 is a perspective view showing the bar code reader 30 shown in FIG. 15 in a state mounted on a horizontal holder 50. The horizontal holder 50 has a generally U-shape with a pair of pins provided on confronting ends of the U-shape. The pins are not visible in FIG. 18, and a more detailed description on the structure of the horizontal holder 50 will be given later. The pins of the horizontal holder 50 are inserted into the bearing parts 36 of the bar code reader 30, thereby supporting the bar code reader 30 in a horizontal position. The bar code reader 30 in this horizontal position can pivot about the pins of the horizontal holder 50, so that the direction in which the scanning light beam emitted from the reading window 32 is emitted can be adjusted upwards and downwards in FIG. 18.

Figure 19:
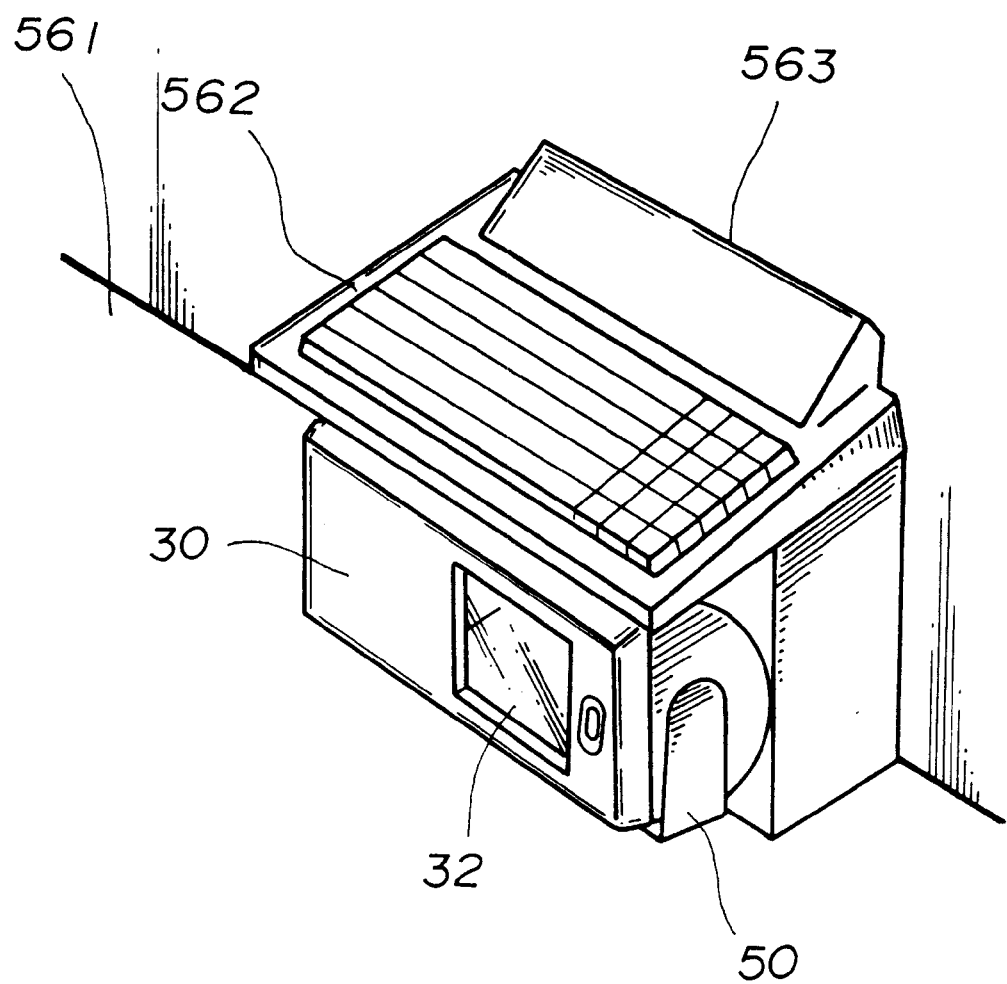
FIG. 19 is a perspective view for explaining the bar code reader shown in FIG. 18 in use in one application.

FIG. 19 is a perspective view for explaining the bar code reader 30 shown in FIG. 18 in use in one application where the bar code reader 30 is supported by the horizontal holder 50. A PLU keyboard 562 is provided on a cashier counter 561 of a supermarket or the like, and the horizontal holder 50 which supports the bar code reader 30 is provided in a space between the cashier counter 561 and the keyboard 562. Items are moved on this cashier counter 561 which is also referred to as a lane. A display 563 for displaying prices of items and the like with respect to a customer is provided on the rear part of the keyboard 562. The bar code reader 30 is arranged so that the reading window 32 faces towards the operator, that is, in a direction generally opposite to the direction in which the display 563 faces.

Figure 20:
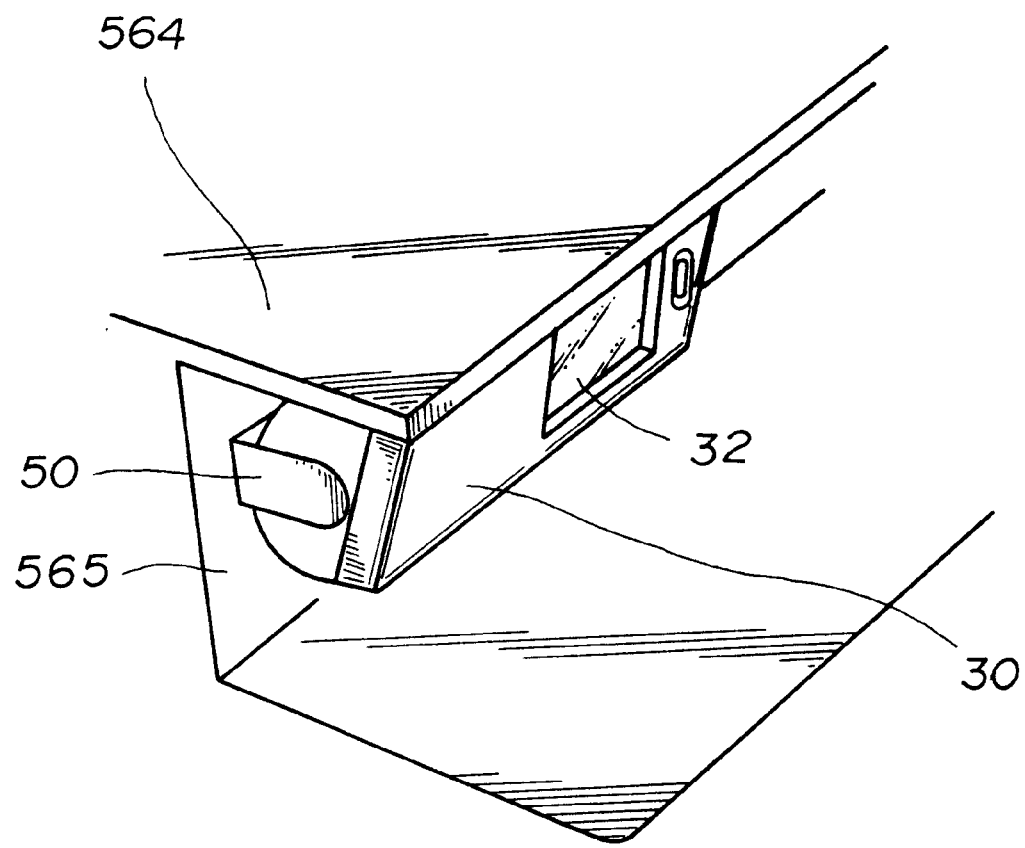
FIG. 20 is a perspective view for explaining the bar code reader shown in FIG. 18 in use in another application.

FIG. 20 is a perspective view for explaining the bar code reader 30 shown in FIG. 18 in use in another application. In FIG. 20, the customer stands on the left side of a so-called high counter 564, while the operator stands on the right side of the counter 564, and the items and money are exchanged over this counter 564. The horizontal holder 50 is provided on a wall 565 under the counter 564, and the horizontal holder 50 supports the bar code reader 30 in a position such that the reading window 32 faces towards the operator. The bar code reader 30 is not visible from the position of the customer.

In the applications shown in FIGS. 19 and 20, the bar code reader 30 is arranged within a small space which does not interfere with the work of the operator, and this small space is considerably small compared to a space required to set up the conventional bar code reader which is relatively large, particularly in the case of the conventional vertical type bar code reader.

Figure 21:
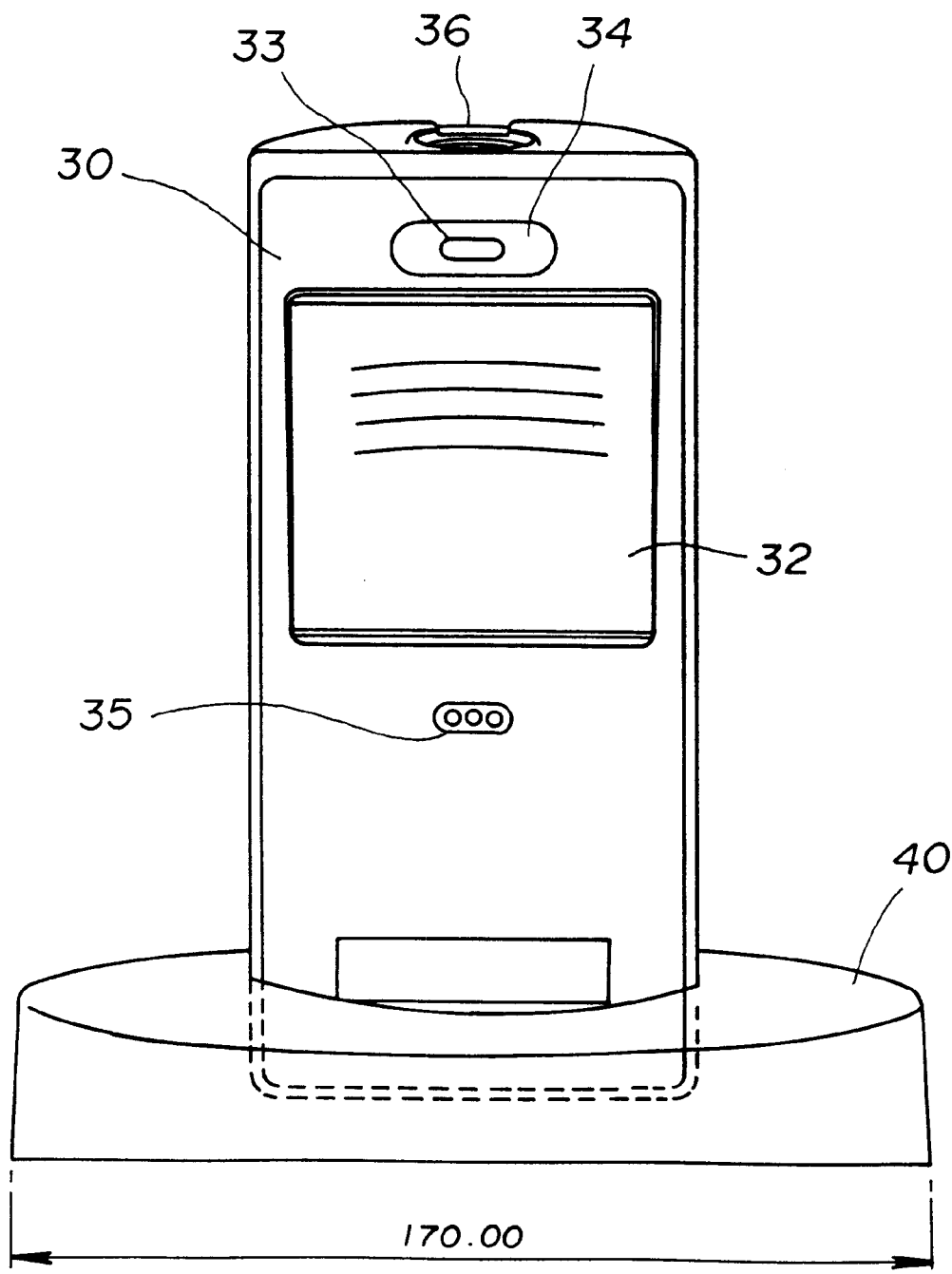
FIG. 21 is a front view showing the bar code reader.
Figure 22:
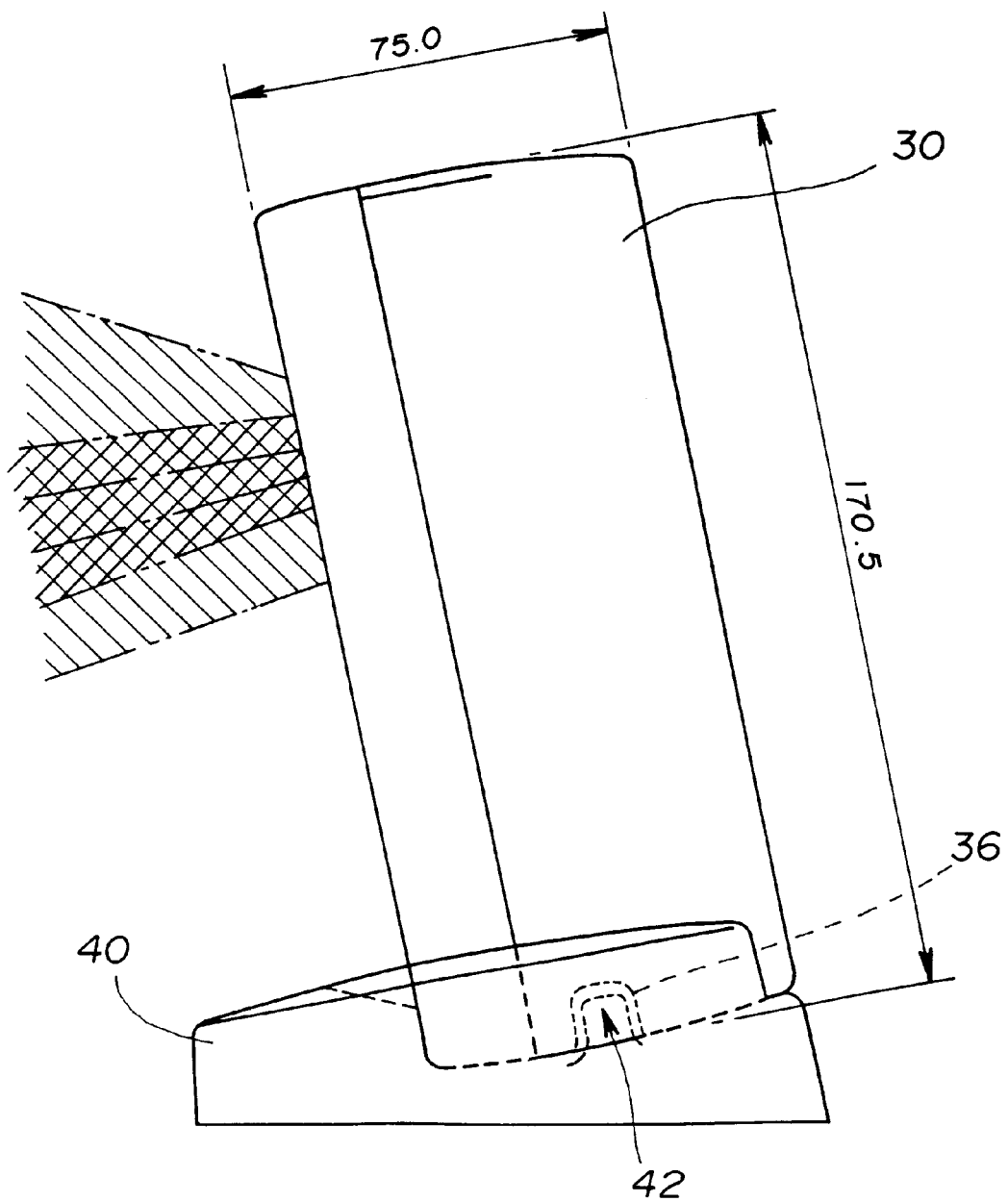
FIG. 22 is a side view showing the bar code reader.
Figure 23:
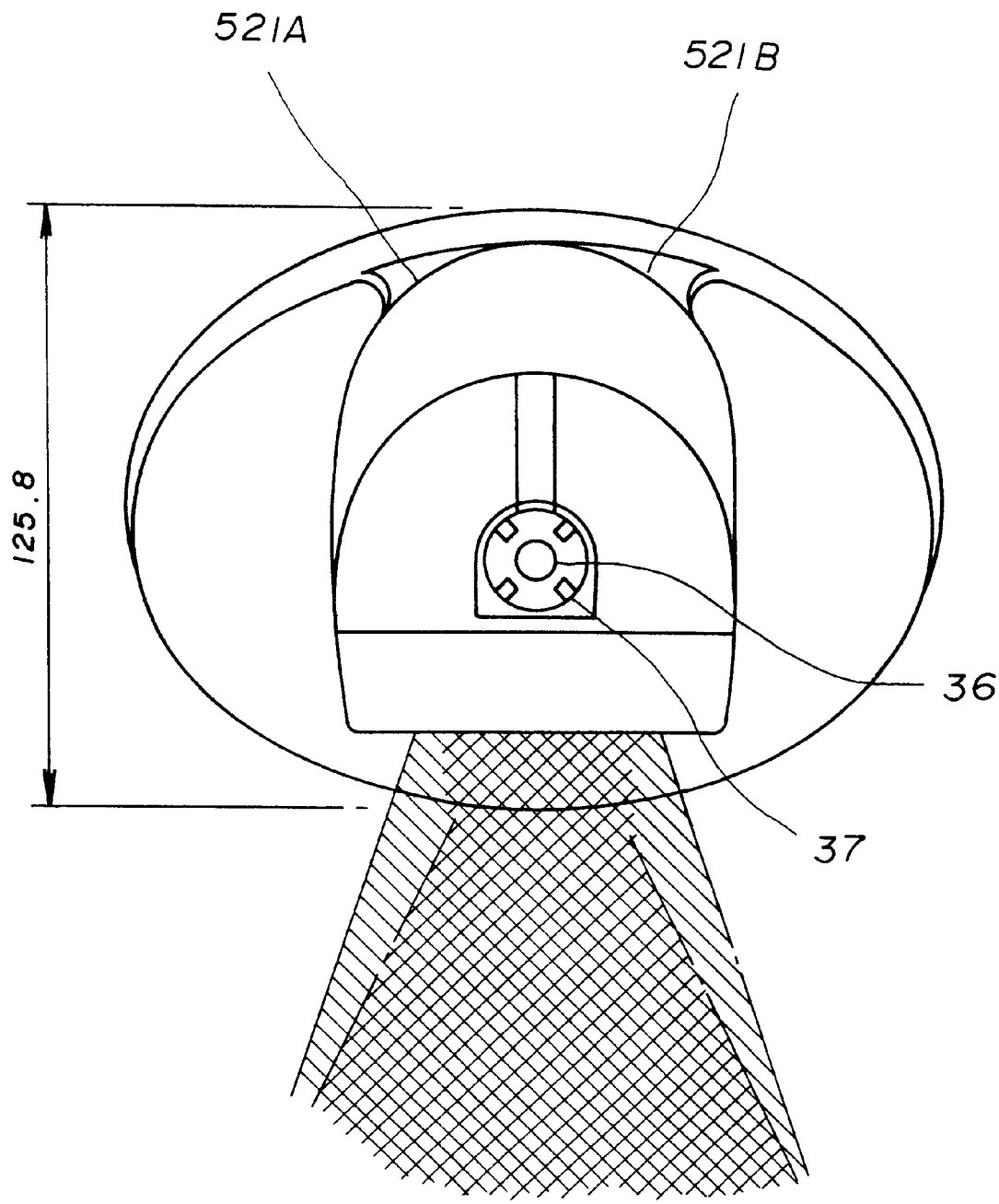
FIG. 23 is a top view showing the bar code reader.

FIG. 21 is a front view showing the bar code reader 30. FIG. 22 is a side view showing the bar code reader 30. In addition, FIG. 23 is a top view showing the bar code reader 30. FIGS. 21, 22 and 23 show the bar code reader 30 supported on the vertical holder 40, in more detail.

As shown in FIG. 21, the reading window 32 is provided at a position deviated from the center of the bar code reader 30. The LED display part 33 and the switch 34 are integrally provided above the reading window 32. The LED display part 33 is provided at the central part of the switch 34. In addition, the opening 35 through which the buzzer sound is output is provided under the reading window 32. For example, the buzzer sound is output to indicate whether the reading of a bar code is successful or unsuccessful by a known means.

As described above, the bearing part 36 is provided on each of the top and bottom parts of the bar code reader 30. The two bearing parts 36 have approximately the same structure with the four ribs 37 provided radially on the periphery of a bearing hole.

The top surface of the vertical holder 40 is inclined forwards with respect to the bottom surface, that is, towards the left in FIG. 22. The inclined top surface of the vertical holder 40 supports the bar code reader 30 in the inclined position, so that the scanning light beam emitted through the reading window 32 is directed downwards.

Normally, in the vertical type bar code reader, the scanning light beam is emitted generally downwards so as to facilitate the operation of the operator and to avoid erroneous readings caused by external light. As indicated by rightwardly declining hatchings in FIG. 22, the scanning light beam would be emitted upwardly and downwardly within a large range if the bar code reader were in an exactly vertical position. But when the bar code reader 30 is in the inclined position on the vertical holder 40, the scanning light beam emitted upwardly is reduced as indicated by leftwardly inclined hatchings in FIG. 22.

On the other hand, even though the bar code reader 30 is in the inclined position on the vertical holder 40, the pin 42 which is inserted into the bearing part 36 at the bottom part of the bar code reader 30 prevents the inclined bar code reader 30 from falling, as may be seen from FIG. 22. Further, cutouts 521A and 521B are provided at the rear part of the vertical holder 40 for guiding cables (not shown) which are drawn out from the bar code reader 30.

Figure 24:
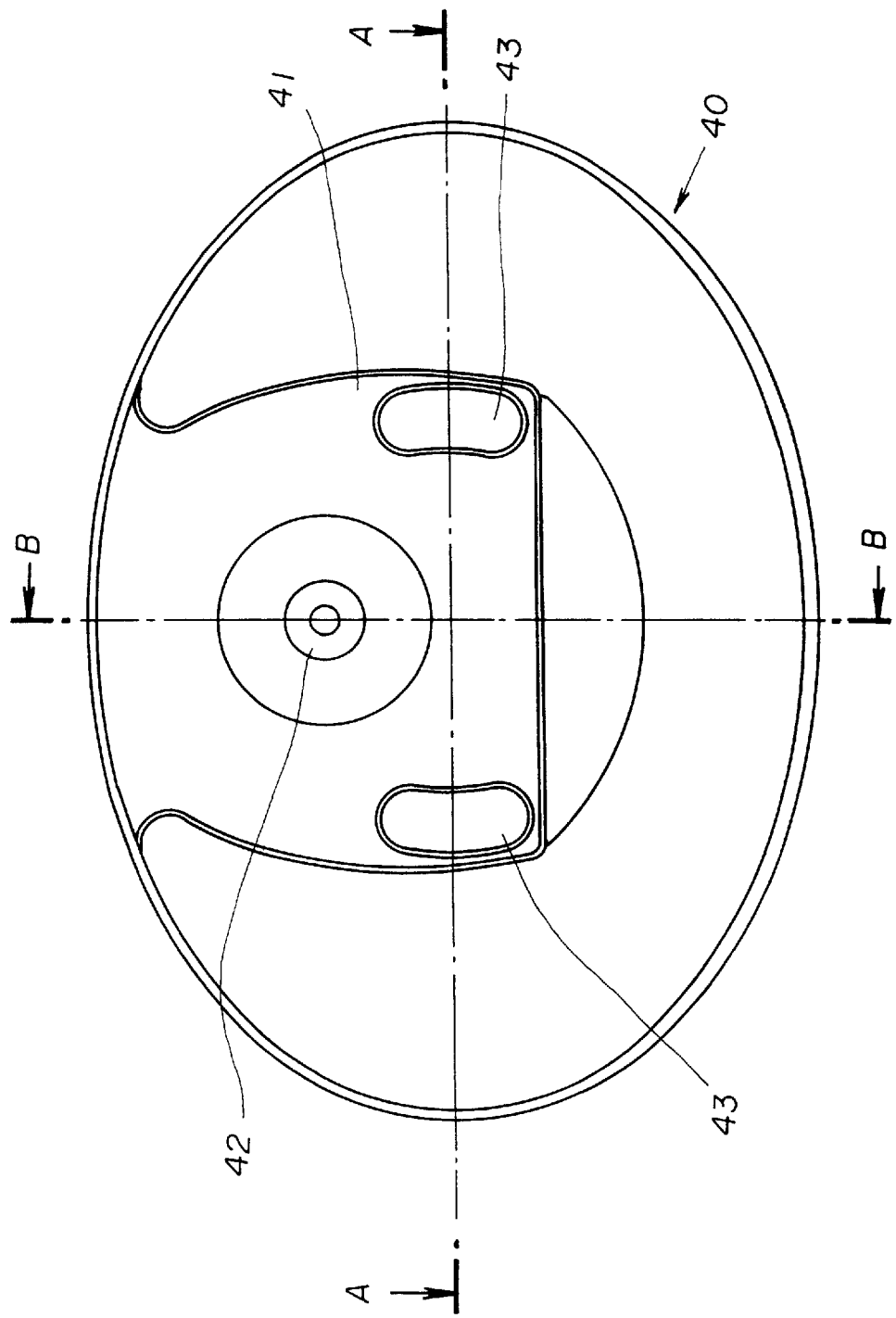
FIG. 24 is a top view showing the vertical holder.
Figure 25:
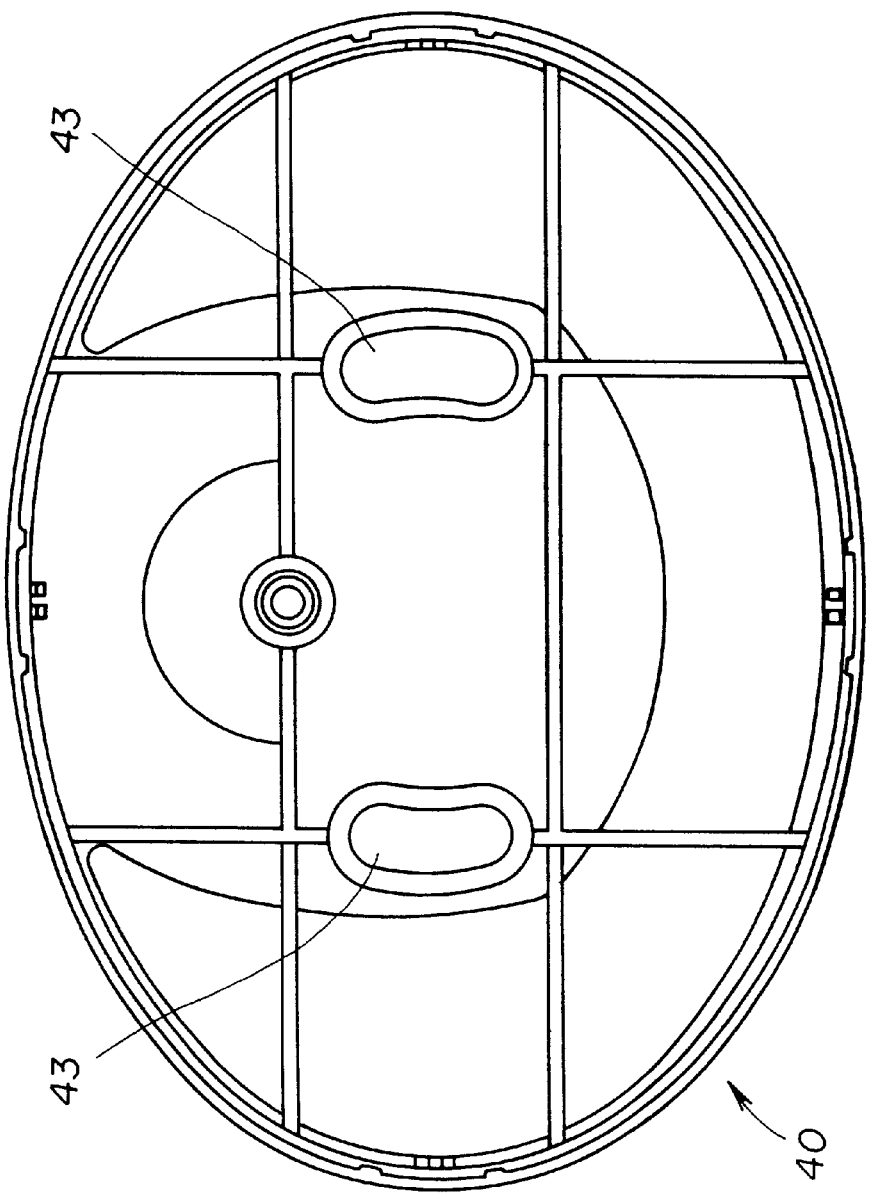
FIG. 25 is a bottom view showing the vertical holder.
Figure 26:
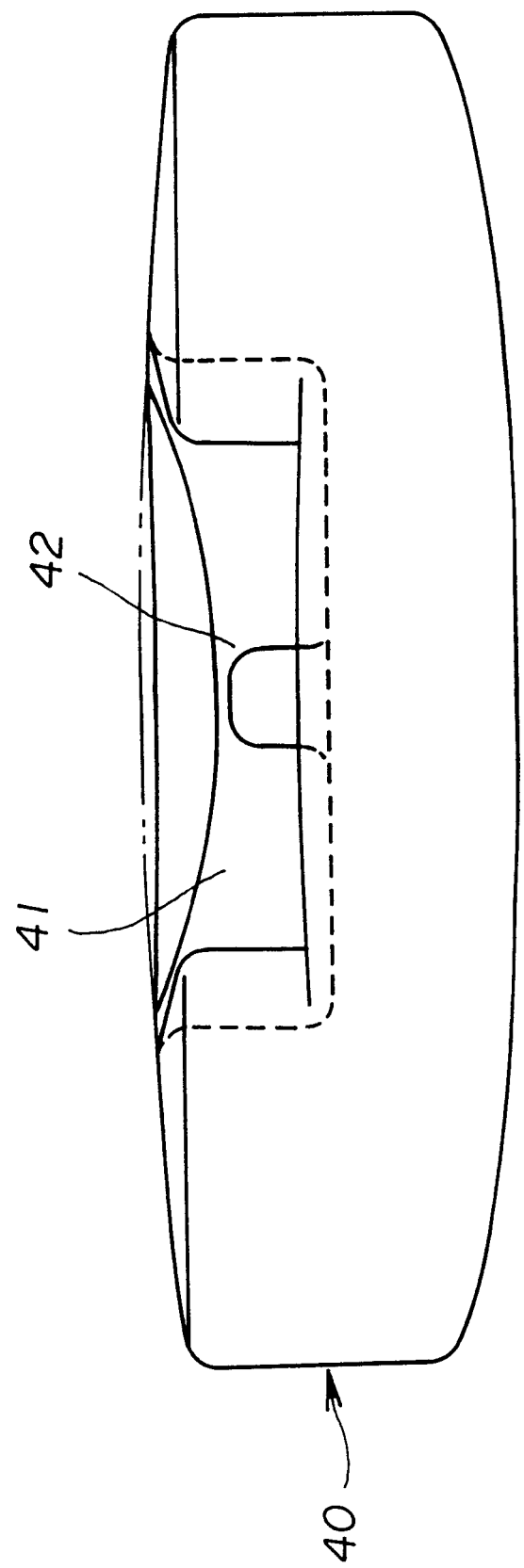
FIG. 26 is a front view showing the vertical holder.
Figure 27:
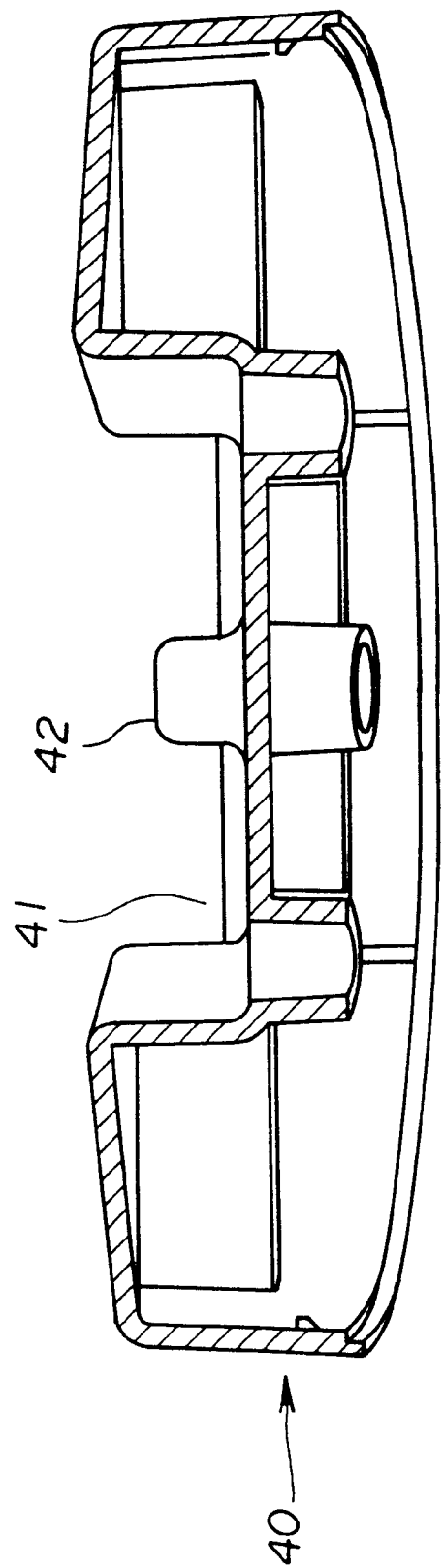
FIG. 27 is a cross sectional view showing the vertical holder.
Figure 28:
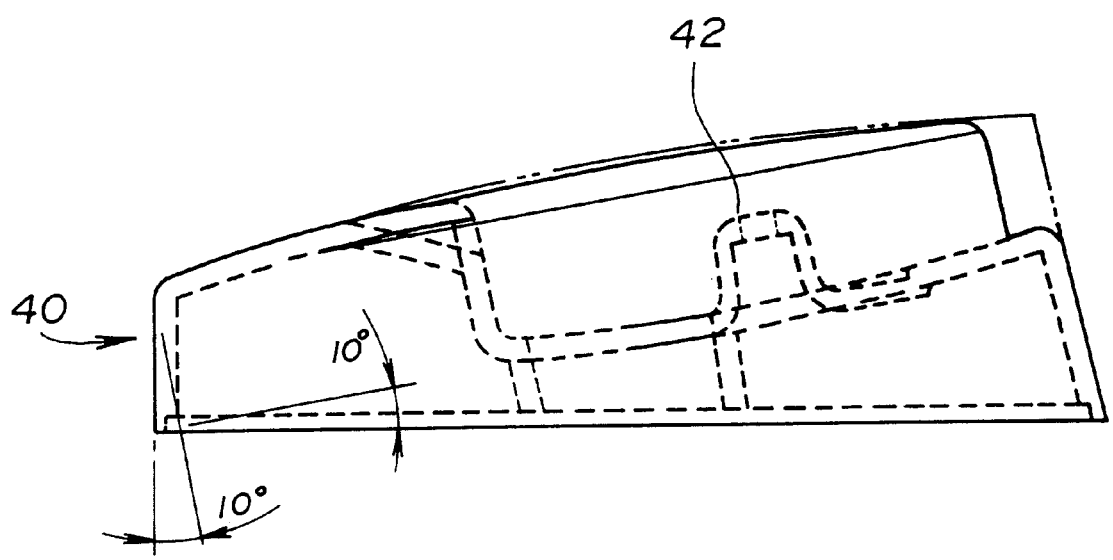
FIG. 28 is a side view showing the vertical holder.
Figure 29:
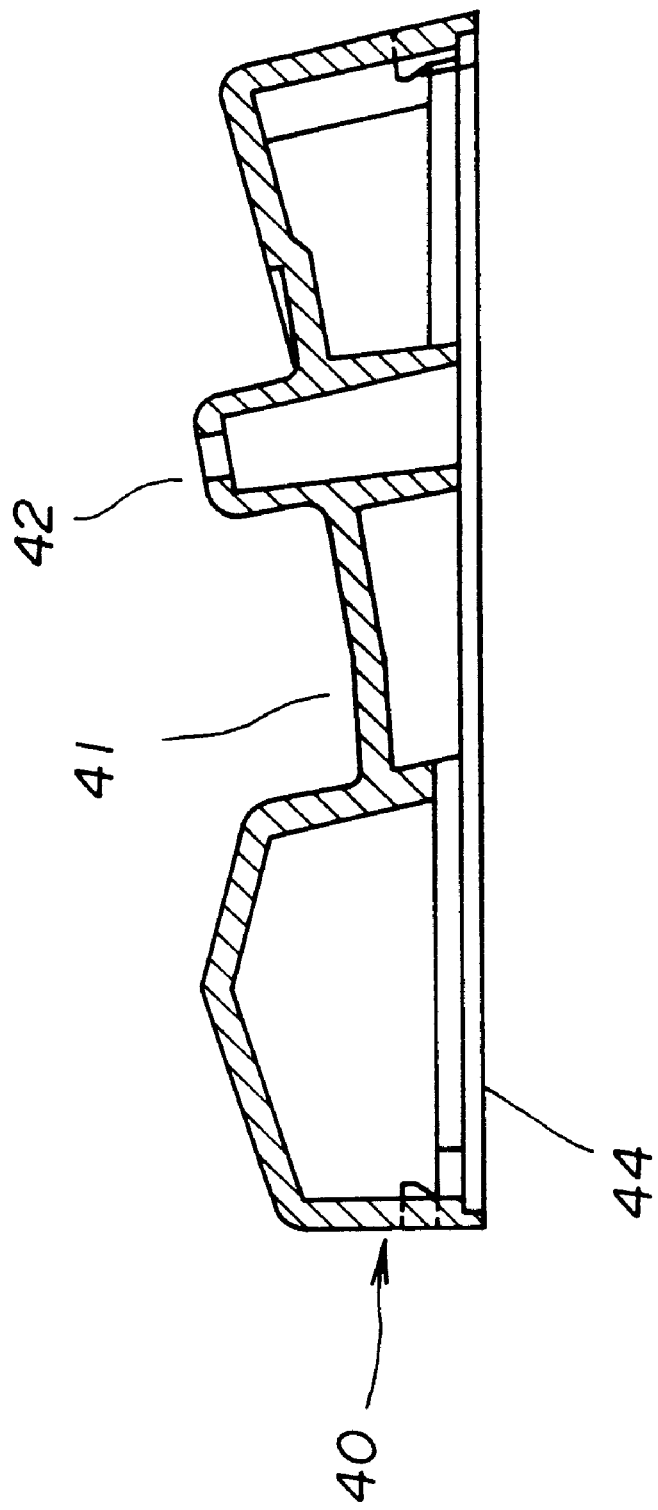
FIG. 29 is a cross sectional view showing the vertical holder.

FIGS. 24 through 29 are diagrams showing the vertical holder 40 in more detail. FIG. 24 is a top view showing the vertical holder 40, and FIG. 25 is a bottom view showing the vertical holder 40. FIG. 26 is a front view showing the vertical holder 40. FIG. 27 is a cross sectional view showing the vertical holder 40 taken along a line A—A in FIG. 24. FIG. 28 is a side view showing the vertical holder 40. Further, FIG. 29 is a cross sectional view showing the vertical holder 40 taken along a line B—B in FIG. 24.

As shown in FIG. 28, the top surface of the vertical holder 40 on which the bar code reader 30 is held is inclined by approximately 10degrees with respect to the bottom surface of the vertical holder 40. In addition, as shown in FIGS. 24 and 25, two oval openings 43 are formed in the vertical holder 40 concentrically about the center (or center of gravity) of the vertical holder 40. These oval openings 43 function as screw holes through which screws are screwed to secure the vertical holder 40 on a surface such as a counter surface.

As shown in FIG. 29, a metal plate 44 is mounted on the bottom surface of the vertical holder 40. The metal plate 44 functions as a weight, and prevents the bar code reader 30 from falling together with the vertical holder 40 in the state where the bar code reader 30 is held by the vertical holder 40.

Figure 30:
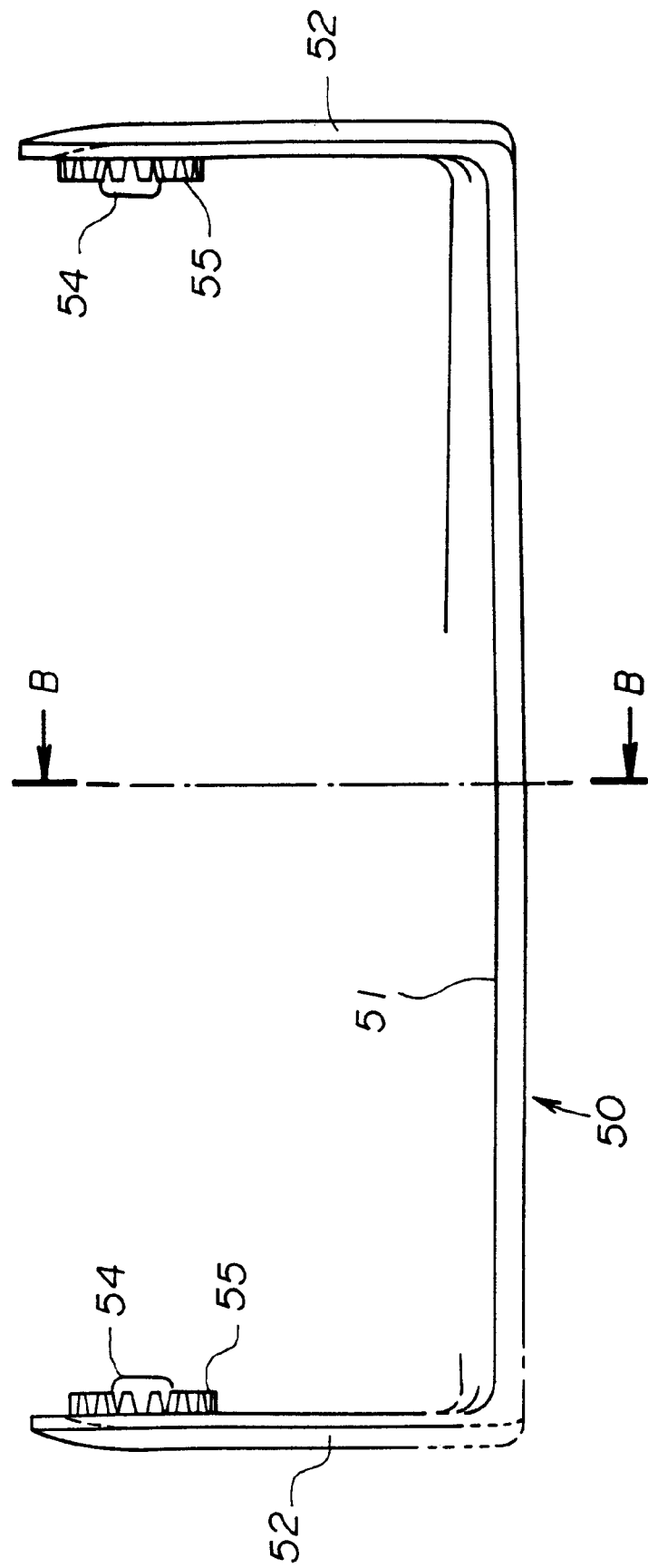
FIG. 30 is a top view showing the horizontal holder.
Figure 31:
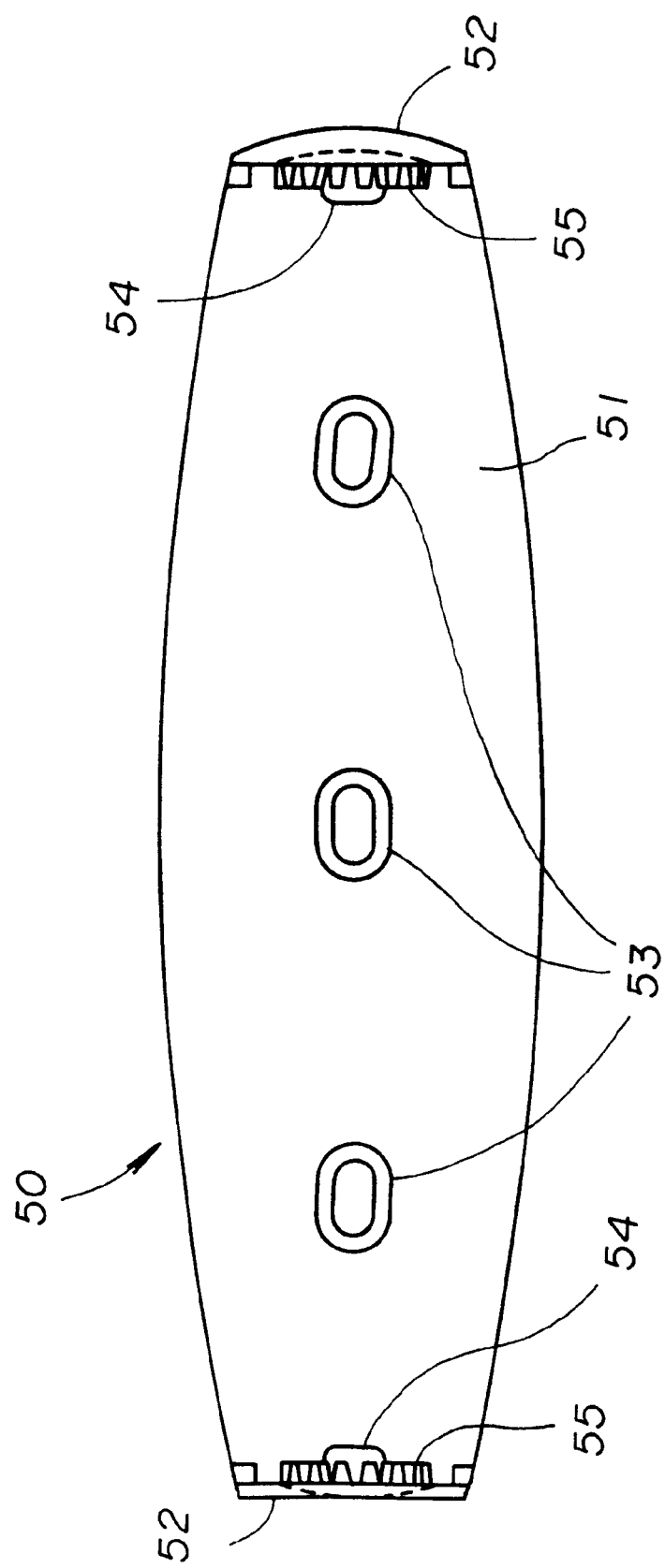
FIG. 31 is a front view showing the horizontal holder.
Figure 32:
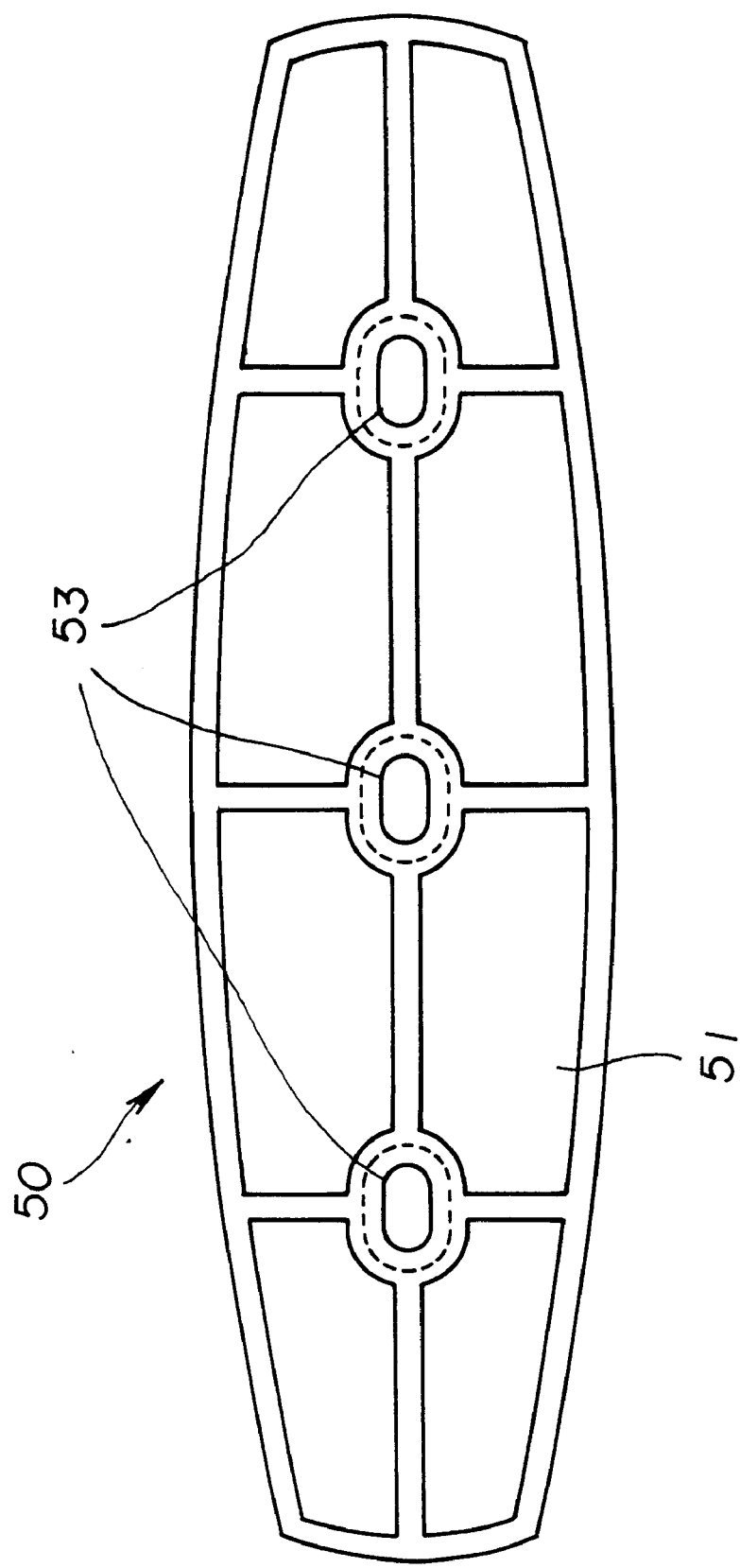
FIG. 32 is a bottom view showing the horizontal holder.
Figure 33:
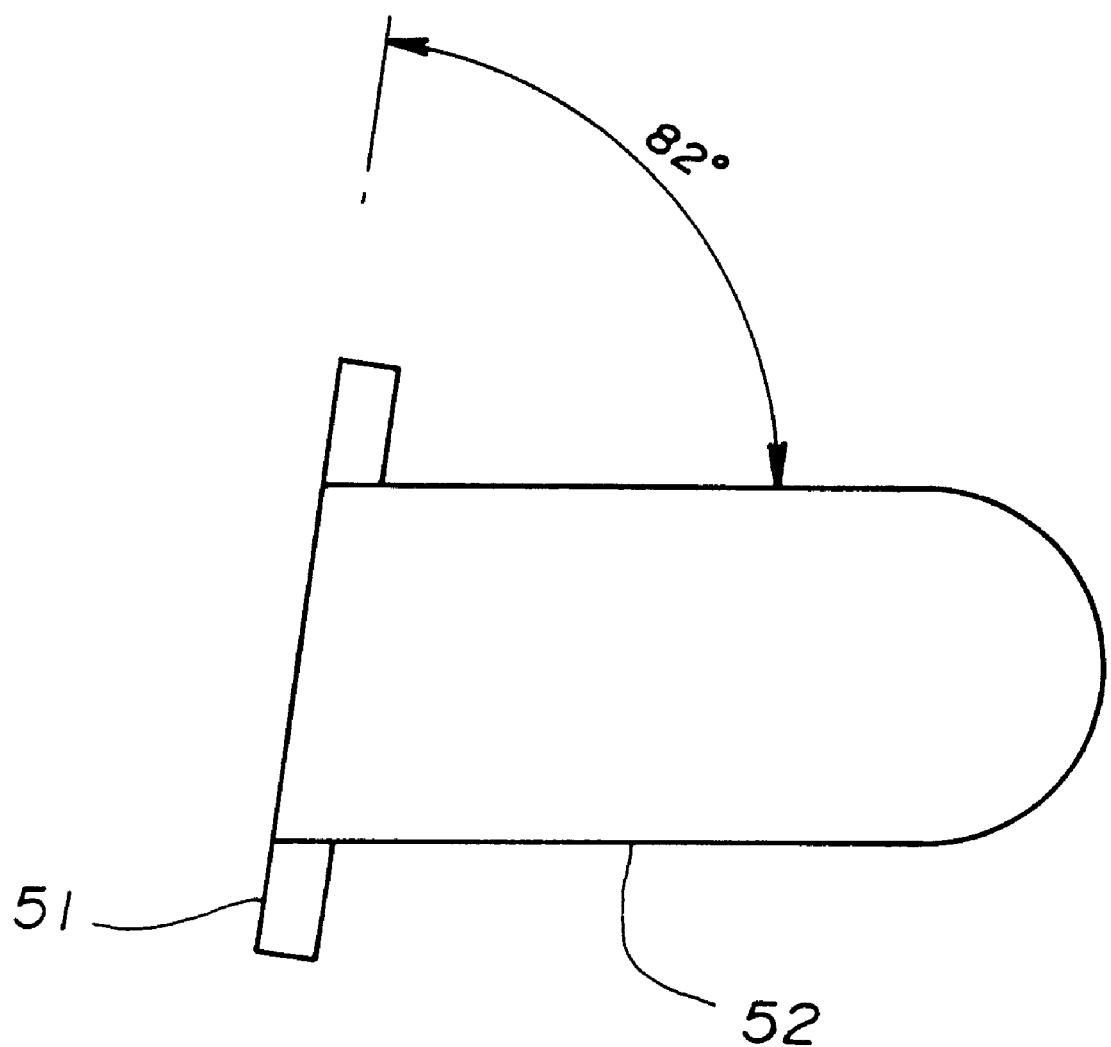
FIG. 33 is a side view showing the horizontal holder.
Figure 34:
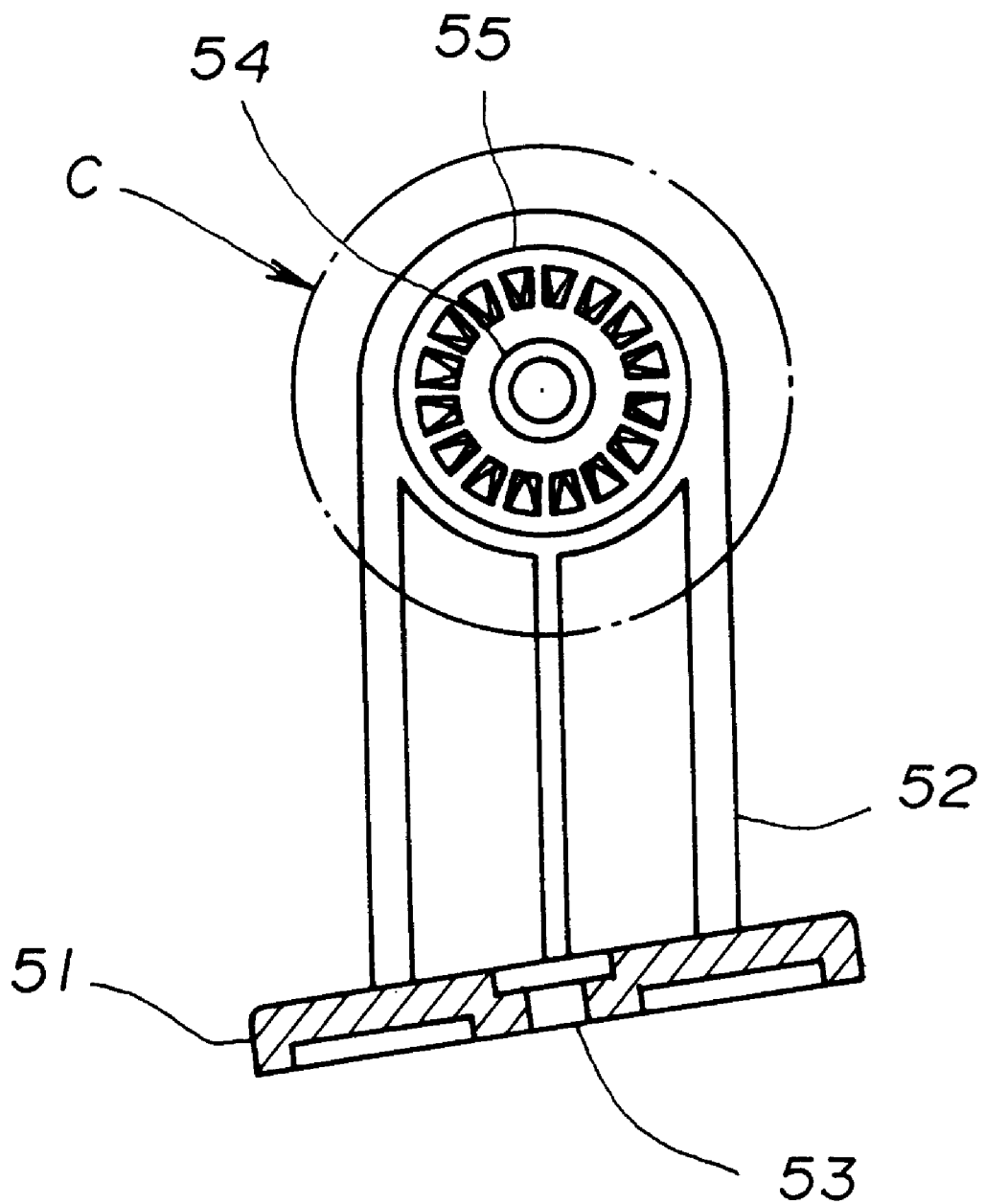
FIG. 34 is a cross sectional view showing the horizontal holder.
Figure 35A:
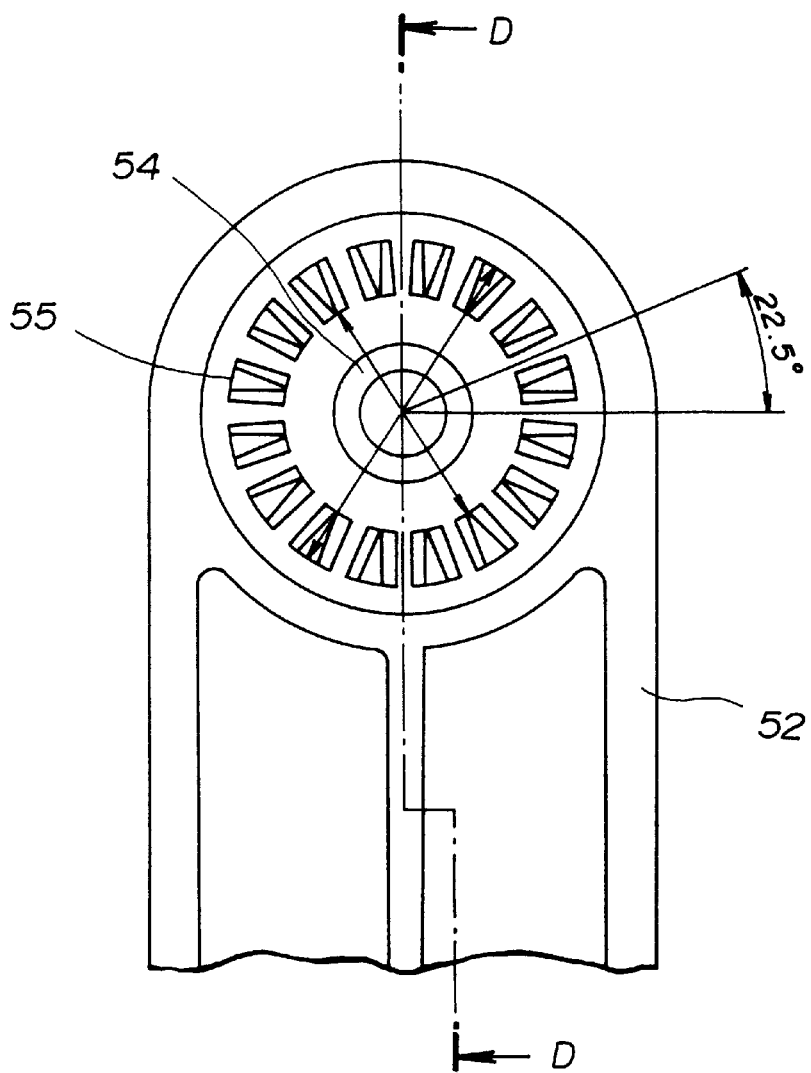
FIGS. 35A and 35B respectively are a front view and a side view showing an important part of the horizontal holder.
Figure 35B:
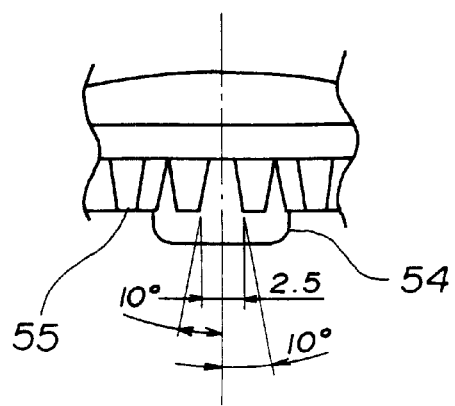
Figure 36:
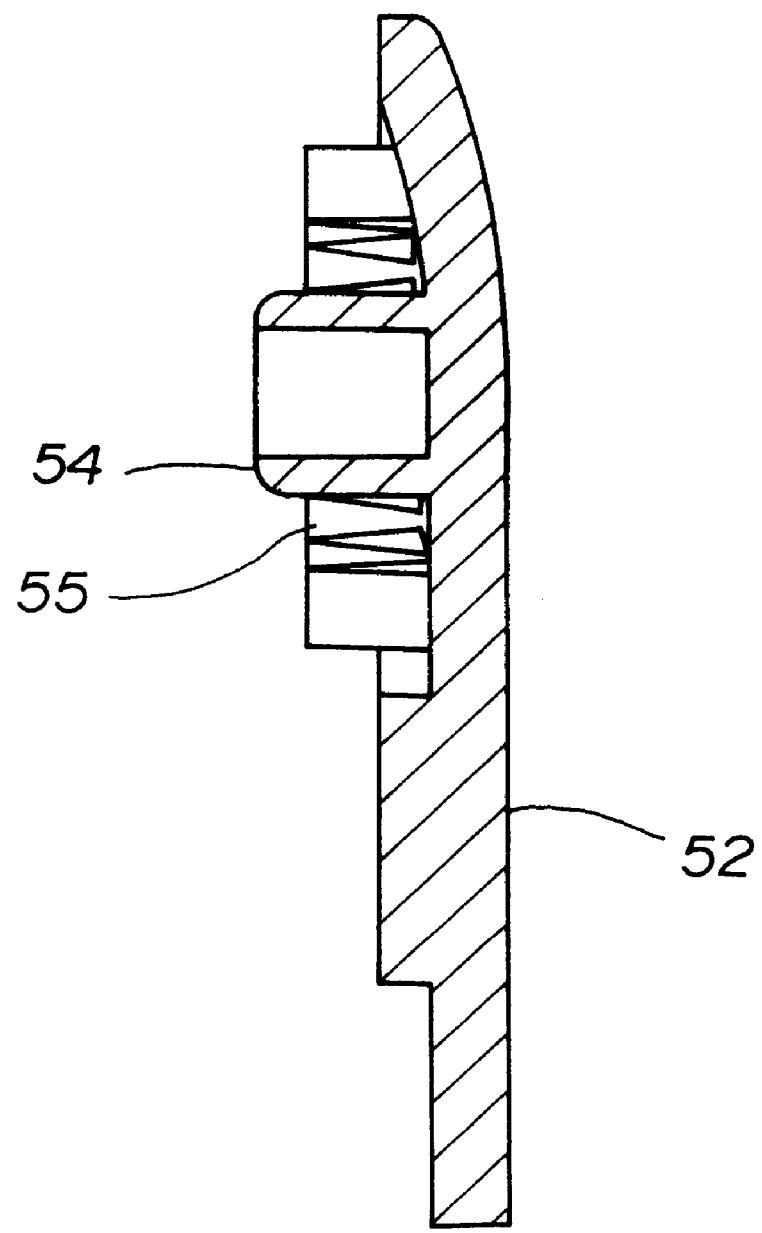
FIG. 36 is a cross sectional view showing the important part of the horizontal holder.

FIGS. 30 through 36 are diagrams showing the horizontal holder 50 in more detail. FIG. 30 is a top view showing the horizontal holder 50. FIG. 31 is a front view showing the horizontal holder 50. FIG. 32 is a bottom view showing the horizontal holder 50. FIG. 33 is a side view showing the horizontal holder 50. FIG. 34 is a cross sectional view showing the horizontal holder 50 taken along a line B—B in FIG. 30. FIGS. 35A and 35B respectively are a front view and a side view showing an important part of the horizontal holder 50 generally indicated by C in FIG. 34. Further, FIG. 36 is a cross sectional view showing the important part of the horizontal holder 50 taken along a line D—D in FIG. 35A.

The horizontal holder 50 includes a base plate 51 and a pair of arms 52 provided on the right and left of the base plate 51. Three oval screw holes 53 are formed in the base plate 51 for use in securing the horizontal holder 50 on a wall surface or the like by screws. A pin 54, and projections 55 having an approximately trapezoidal cross section and provided radially about the pin 54, are provided at the tip end part of each arm 52. The pin 54 is inserted into the bearing part 36 of the bar code reader 30 in a state where the bar code reader 30 is held by the horizontal holder 50. In this embodiment, sixteen projections 55 are formed about each pin 54 at equi-angular intervals of approximately 22.5 degrees.

When the bar code reader 30 is held by the horizontal holder 50, each rib 37 of the bearing part 36 is inserted between two arbitrary adjacent projections 55 and held between the projections 33. Hence, the horizontal holder 50 can hold the bar code reader 30 in a state where the bar code reader 30 is pivoted about the bearing parts 36 by a desired angle.

As shown in FIG. 33, an angle formed between the base plate 51 and an extension of the arm 52 is approximately 82 degrees.

FIG.35A is an enlarged front view of the important part indicated by C in FIG. 34, that is, the part including the pin 54 and the projections 55. FIG. 35B is an enlarged side view showing the projection 55. Further, FIG. 36 is an enlarged cross sectional view taken along the line D—D in FIG. 35A.

As shown in FIG. 35A, the projection 55 has a trapezoidal shape, and the width of the trapezoidal shape gradually increases towards the tip end of the projection 55. In other words, the projection 55 has a generally trapezoidal column shape having a cross sectional area which gradually decreases towards the tip end of the projection 55. In addition, as may be seen from FIG. 35B, a gap between two adjacent projections 55 also has a generally trapezoidal shape.

In this embodiment, a housing of the bar code reader 30 is made up of upper and lower cover parts. A description will now be given of the upper cover part by referring to FIGS. 37 through 41B.

Figure 37:
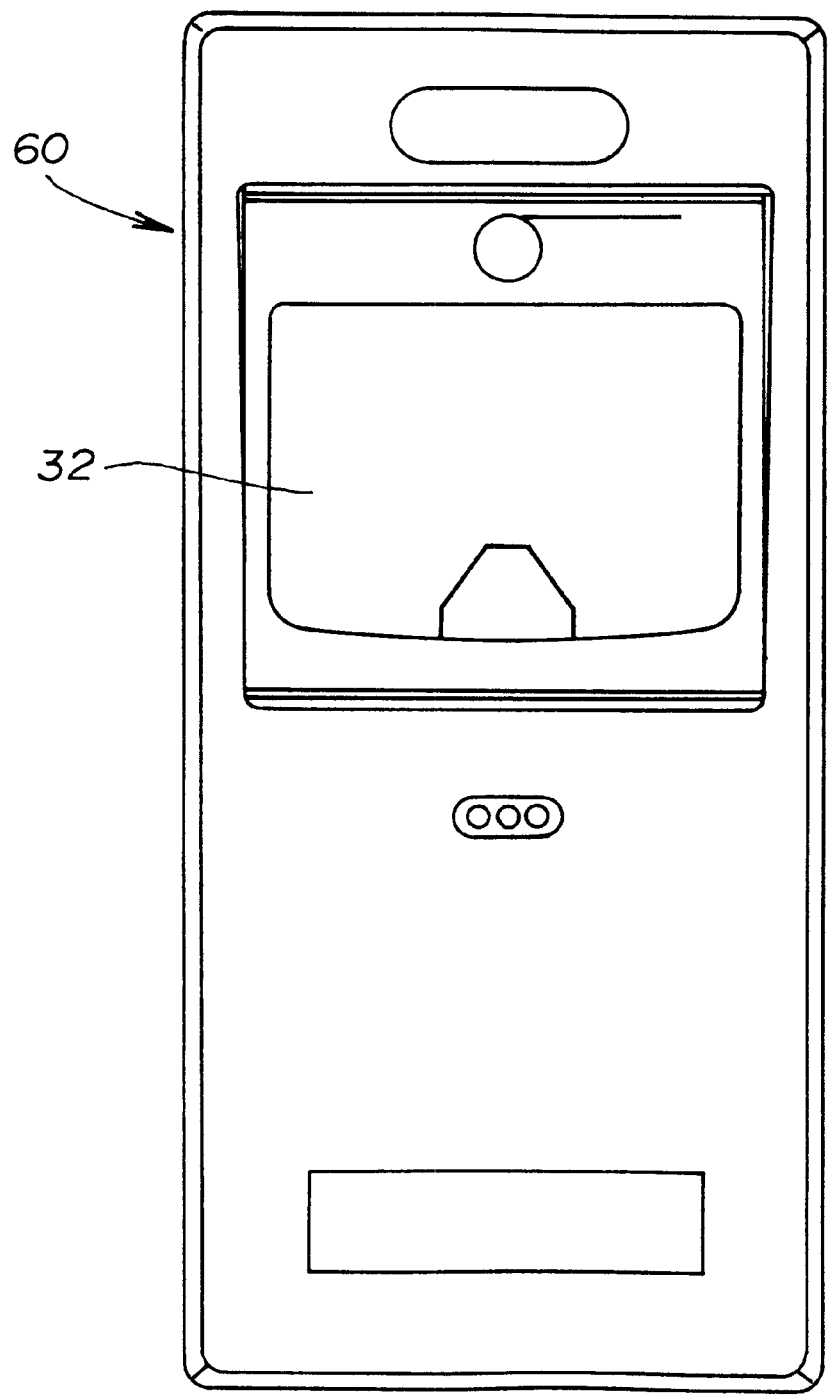
FIG. 37 is a front view showing an upper cover part.
Figure 38:
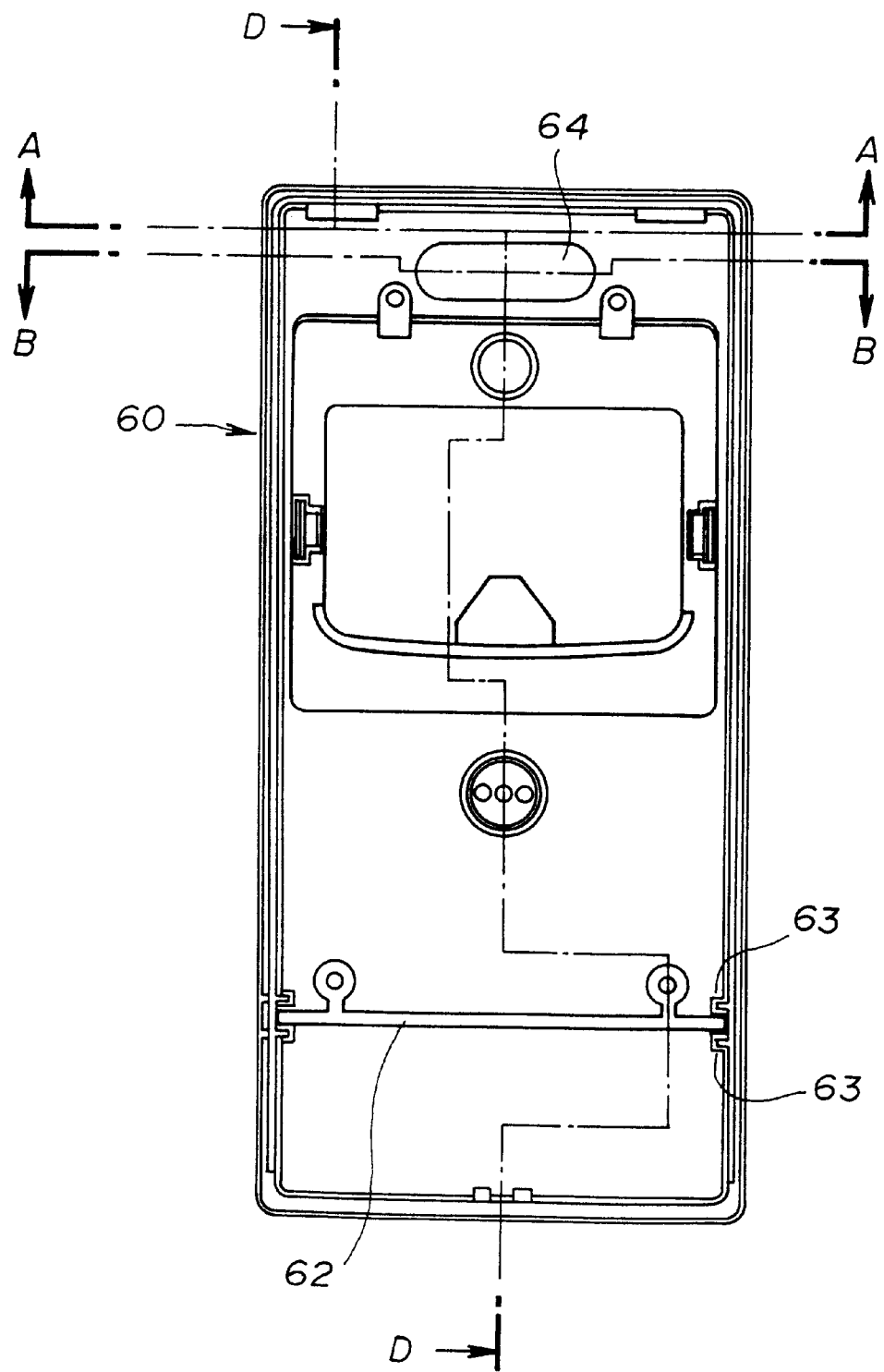
FIG. 38 is a bottom view showing the upper cover part.
Figure 39:
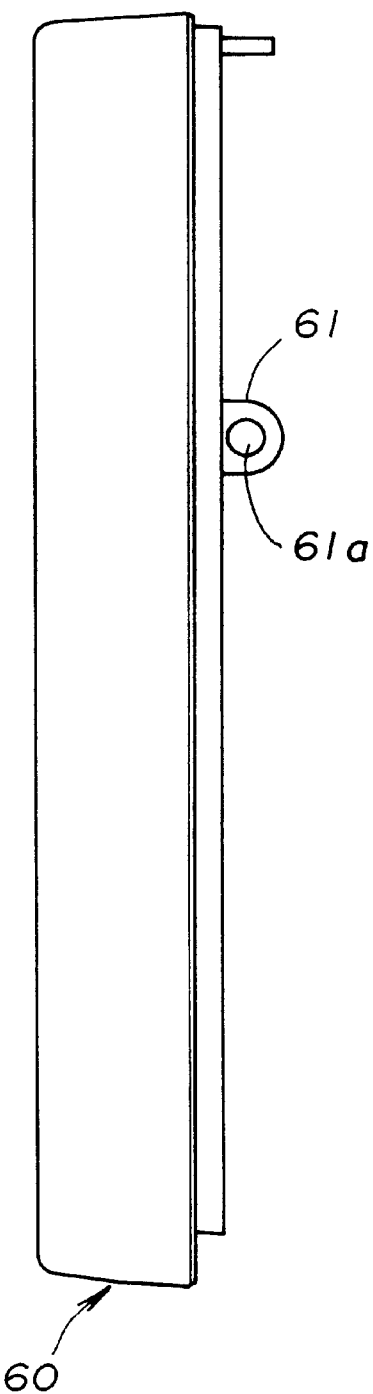
FIG. 39 is a side view showing the upper cover part.
Figure 40:
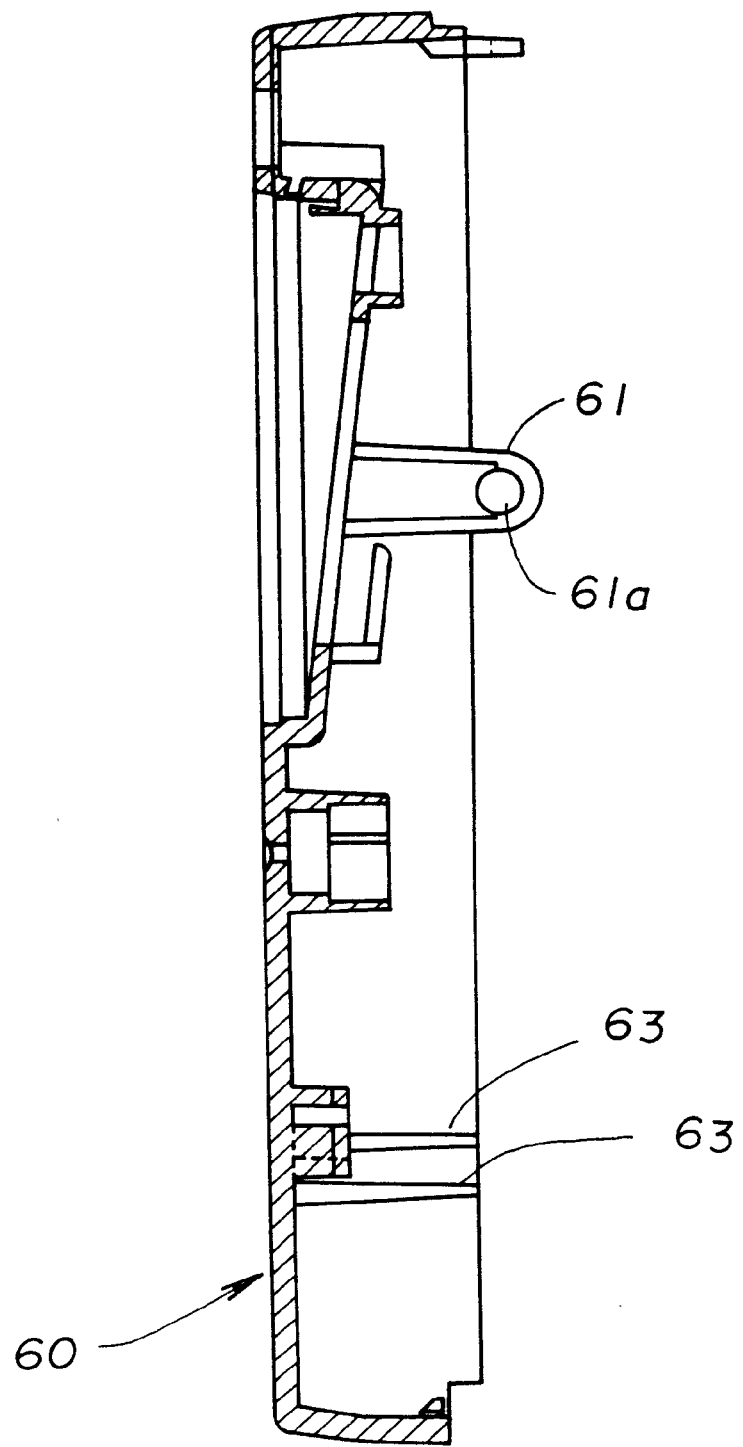
FIG. 40 is a cross sectional view showing the upper cover part.

FIG. 37 is a front view showing an upper cover part 60. FIG. 38 is a bottom view showing the upper cover part 60. FIG. 39 is a side view showing the upper cover part 60. FIG. 40 is a cross sectional view showing the upper cover part 60 taken along a line D—D in FIG. 38. Further, FIGS. 41A and 41B respectively are top view of the upper cover part 60 and a cross sectional view showing the upper cover part 60 taken along a line A—A in FIG. 38.

As shown particularly in FIG. 40, the reading window 32 is inclined by an angle with respect to the front face of the upper cover part 60. If the emission direction of the scanning light beam were perpendicular to the reading window 32, the scanning light beam would generate a total reflection at the surface of the reading window 32, thereby deteriorating the bar code reading characteristic. Accordingly, the reading window 32 is inclined with respect to the front face of the upper cover part 60 in order to prevent such a deterioration of the bar code reading characteristic.

As shown in FIGS. 39 and 40, a pair of projecting parts 61 are formed in the vicinity of the reading window 32. A hole 61a is formed at the upper end of each projecting part 61. An optical unit of the bar code reader 30 is mounted on the projecting parts 61.

Figure 42:
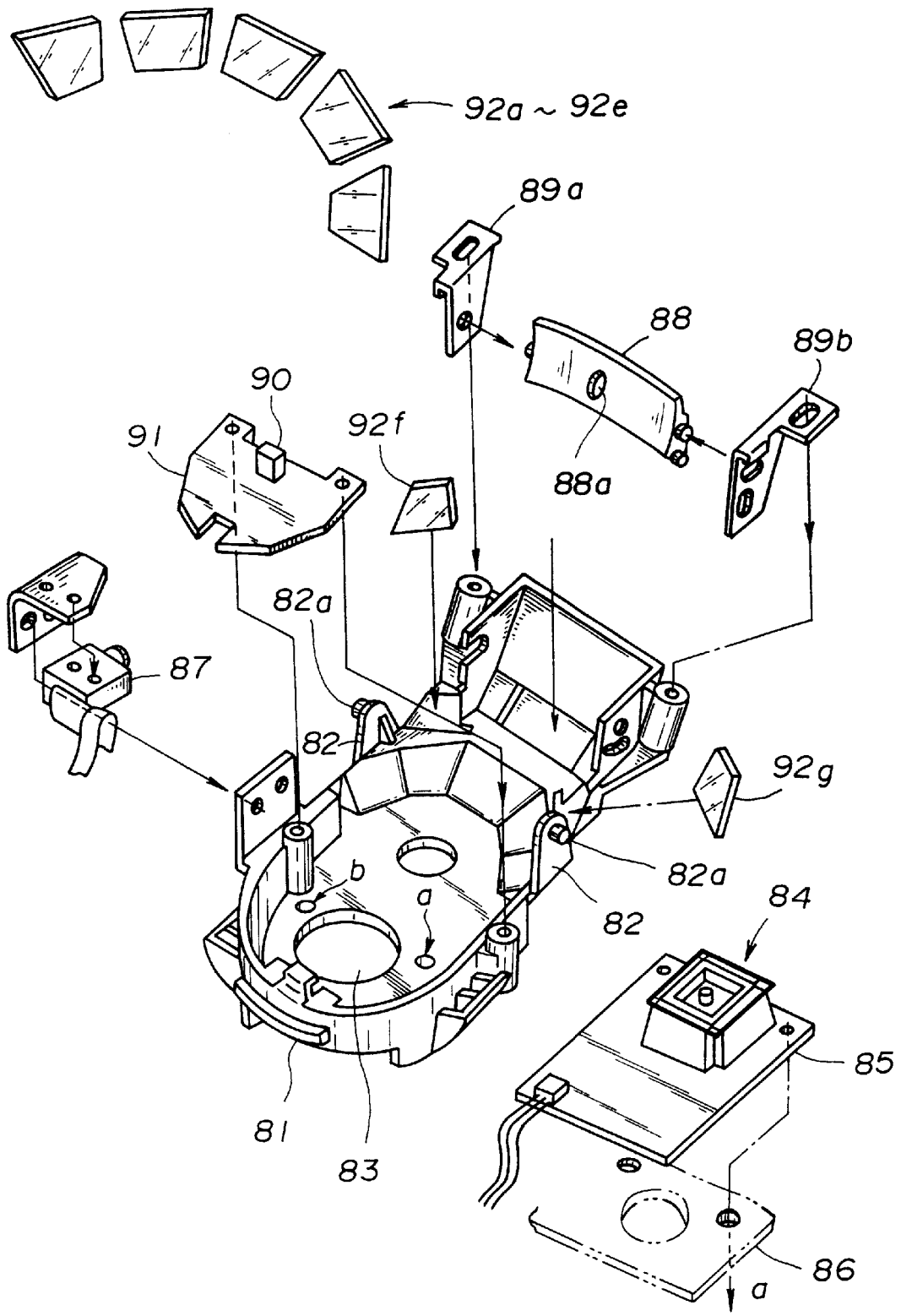
FIG. 42 is a disassembled perspective view showing an optical unit and various parts forming the bar code reader.
Figure 43:
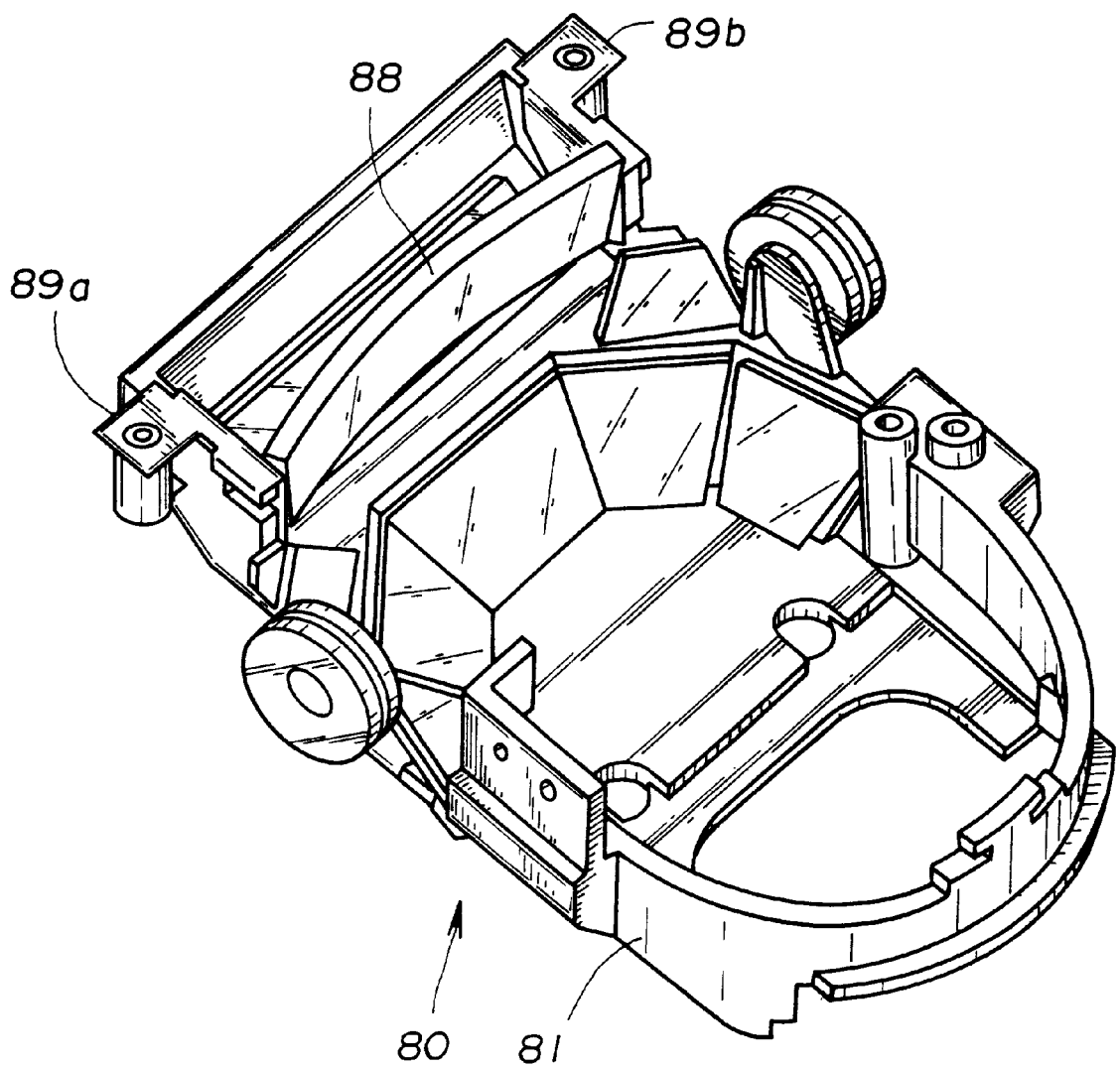
FIG. 43 is a perspective view showing the optical unit having mirrors arranged thereon.
Figure 44:
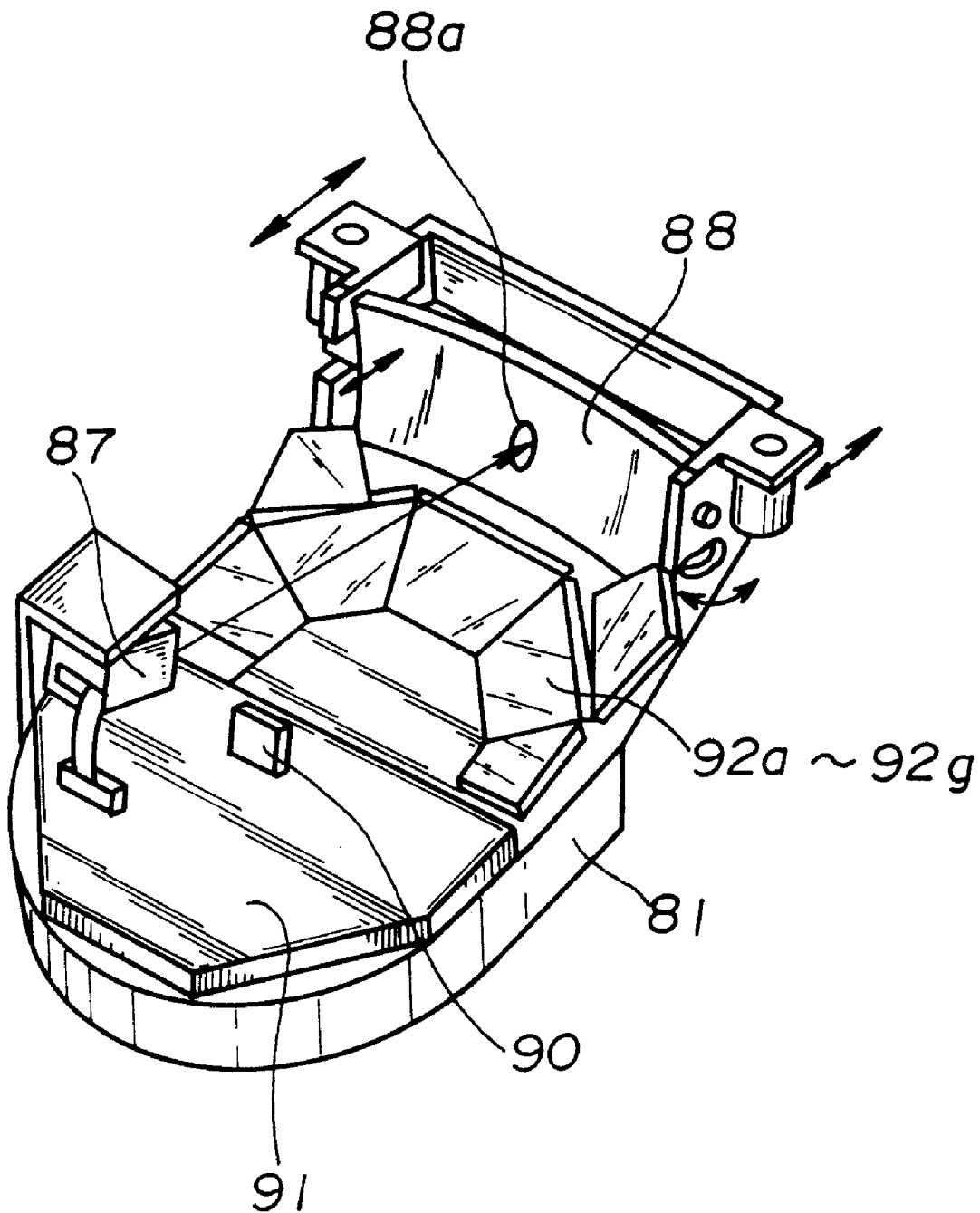
FIG. 44 is a perspective view showing the optical unit in a state where a light source and a light receiving element are mounted thereon.

FIGS. 42 through 44 are diagrams for explaining various parts of an optical unit 80 of this embodiment. FIG. 42 is a disassembled perspective view showing the optical unit 80 and various parts forming the bar code reader 30. FIG. 43 is a perspective view showing the optical unit 80 having mirrors arranged thereon. In addition, FIG. 44 is a perspective view showing the optical unit 80 in a state where a light source and a light receiving element are mounted thereon.

As shown in FIG. 42, the optical unit 80 has a base part 81 made of a resin, and an arm 82 having a pin 82a is provided on both sides of the base part 81. The pin 82a is inserted into the hole 61a which is formed in the projecting part 61 of the upper cover part 60 described above. Hence, the base part 81, that is, the optical unit 80, is pivotable with respect to the upper cover part 60 about the pins 82a. By making the optical unit 80 pivotable, it is possible to adjust the emission direction of the scanning light beam emitted from the bar code reader 30, and the emission direction of the scanning light beam through the reading window 32 can be adjusted upwardly and downwardly in FIG. 22 described above.

A circular opening 83 is provided in the bottom surface of the base part 81, and a polygonal mirror unit 84 is mounted at this circular opening 83. The polygonal mirror unit 84 is mounted on the rotary shaft of the motor which is mounted on a printed circuit board 85. In this embodiment, the polygonal mirror unit 1 described above is used as the polygonal mirror unit 84. A shock absorbing member 86 is provided on the bottom surface of the printed circuit board 85, and the printed circuit board 85 is secured on the base part 81 by screws inserted through screw holes as indicated by a in FIG. 42.

A laser diode 87 is mounted on the base part 81 as a light source of the scanning light beam. In addition, a concave mirror 88 is mounted on the base part 81 via a pair of support members 89a and 89b. A small planar mirror 88a is mounted at the central part of the concave mirror 88. A total of three pins are formed on the ends of the concave mirror 88. These pins fit into holes formed in the support members 89a and 89b. The support members 89a and 89b are movable back and forth with respect to the base part 81.

A circular hole is formed in the left support member 89a, and the pin on the left side of the concave mirror 88 fits into this circular hole. On the other hand, two oval holes are formed in the right support member 89b, and the pins on the right side of the concave mirror 88 fit into these oval holes. The lower one of the oval holes in the right support member 89b extends generally in the vertical direction in an arcuate manner, while the other upper one of the oval holes extends generally in the horizontal direction in an arcuate manner.

The angular position of the concave mirror 88 with respect to the base part 81 can be adjusted by moving the support members 89a and 89b back and forth. The mechanisms related to the adjustment of the concave mirror 88 are further disclosed in a U.S. patent application Ser. No. 677,187 filed Jul. 9, 1996, the disclosure of which is hereby incorporated by reference.

A light receiving element 90 is mounted on a substrate 91, and this substrate is secured on the base part 81 by screws. In addition, a total of seven no mirrors 92a through 92g are adhered on the base part 81. FIG. 43 is a perspective view showing a state where the mirrors 92a through 92g are adhered on the base part 81. In FIG. 43, the illustration of the polygonal mirror unit 84, the laser diode 87, the light receiving element 90 and the like are omitted so that the arrangement of the mirrors 92a through 92g are more easily visible.

Next, a description will be given of the operation of the optical unit 80. FIG. 44 is a perspective view showing the base part 81 in a state where the substrate 91 mounted with the laser diode 87 and the light receiving element 90 is mounted on the base part 81. In FIG. 44, the polygonal mirror unit 84 is located under the substrate 91 and is therefore not visible.

A laser beam from the laser diode 87 is emitted towards the planar mirror 88a provided at the central part of the concave mirror 88. The laser beam reflected by the planar mirror 88a reaches the polygonal mirror unit 84. The polygonal mirror unit 84 is rotated by the motor, and the laser beam reflected by each of the reflection mirrors of the polygonal mirror unit 84 successively scans the mirrors 92a through 92g depending on the rotation of the polygonal mirror unit 84. The mirrors 92a through 92g function as pattern mirrors which generate a scan pattern.

The scanning light beam reflected by the mirrors 92a through 92g are directed upwardly in FIG. 44, and forms the scan pattern. This scan pattern is formed by a plurality of intersecting scan lines.

When a bar code or the like is scanned by the scan pattern, the light reflected by the bar code surface enters the bar code reader 30 via the reading window 32 through the same path as the light beam output from the bar code reader 30 via the reading window 32. This reflected light reaches the concave mirror 88 via one of the mirrors 92a through 92g and the polygonal mirror unit 84. The concave mirror 88 has a radius of curvature such that the reflected light is focused on the light receiving surface of the light receiving element 90. Hence, the reflected light from the bar code is received by the light receiving element 90 via the concave mirror 88.

The optical unit 80 having the construction described above is provided within the bar code reader 30 of this embodiment.

In order to change the emission direction in which the scanning light beam is emitted, it is possible to change the inclination of some optical parts of the optical unit, such as the mirrors. However, in this case, the positional relationship and the like of the optical parts would become different from the initial design, thereby possibly affecting the bar code reading performance.

On the other hand, according to this embodiment, the entire printed circuit board 85 is pivoted, and the positional relationships of the optical parts are always maintained. As a result, the pivoting of the printed circuit board 85 virtually does not affect the bar code reading performance.

Returning now to the description of the upper cover part 60, a partitioning wall 62 which is provided at the lower part of the upper cover 60 partitions the inside of the bar code reader 30 into two parts, as shown in FIG. 38. Each end of the partitioning wall 62 is supported by a pair of ribs 63 formed on the inner wall of the upper cover part 60. The lower part of the bar code reader 30 is opened and closed when changing the connection of the cable, for example, but the optical parts are provided in the upper part of the bar code reader 30 and it is desirable that the upper part is sealed so as to prevent dust from entering the upper part and contaminating the optical parts. The partitioning wall 62 is provided to realize such a seal, and prevents the dust which enters the lower part of the bar code reader 30 from entering the upper part of the bar code reader 30.

Figure 45A:
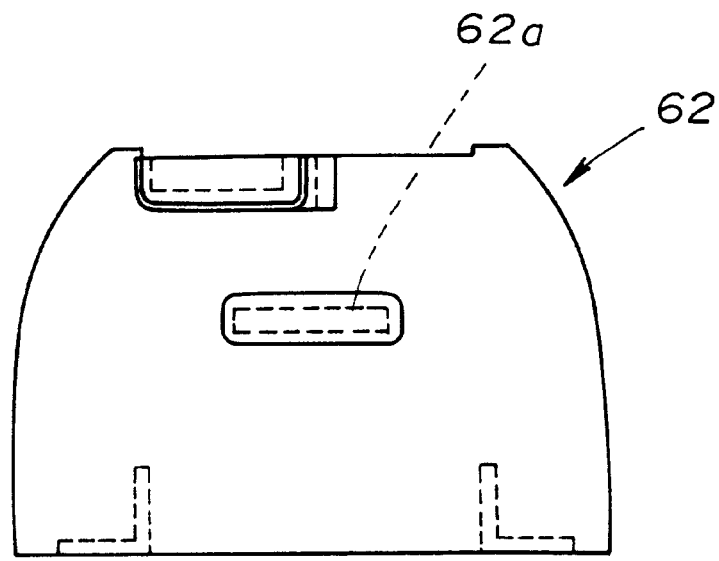
FIGS. 45A and 45B respectively are a front view and a top view showing a partitioning wall arranged within the bar code reader.
Figure 45B:
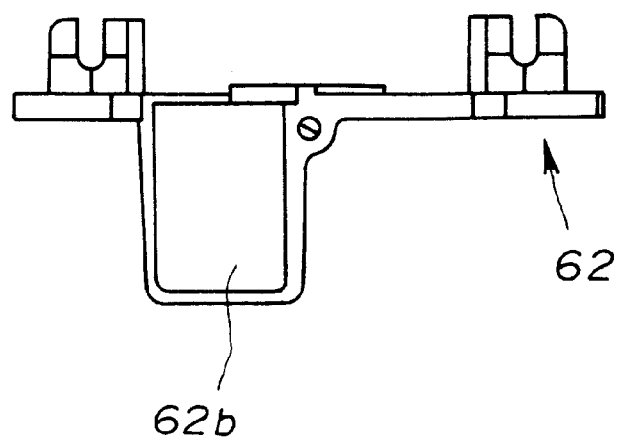

FIGS. 45A and 45B respectively are a front view and a top view showing the partitioning wall 62 arranged within the bar code reader 30. FIGS. 46A and 46B respectively are a bottom view and a side view showing the partitioning wall 62. The partitioning wall 62 has a cross sectional shape corresponding to the shape of the housing the bar code reader 30.

In FIGS. 45A through 46B, an opening 62*a* is formed at the central part of the partitioning wall 62. One end of the optical unit 80 fits into this opening 62*a*. Accordingly, the optical unit 80 is supported at three points, that is, the projecting parts 61 and the opening 62*a*. In this particular embodiment, only one opening 62*a* is provided, but it is of course possible to provide two or more openings along the vertical direction in FIG. 45A, so that the inclination angle of the optical unit 80 can be adjusted to an arbitrary one of a plurality of possible inclination angles corresponding to the two or more openings in the partitioning wall 62.

A member 62*b* is provided on the upper part of the partitioning wall 62, and extends outwardly of the partitioning wall 62. A connector part of the printed circuit board 85 is placed on the member 62*b*. The housing of the bar code reader 30 must be opened when changing the connection of the cable with respect to the connector part, but by the provision of the member 62*b*, it becomes unnecessary to open the part of the housing provided with the optical unit 80, thereby positively preventing the dust from reaching the optical unit 80.

Figure 41A:
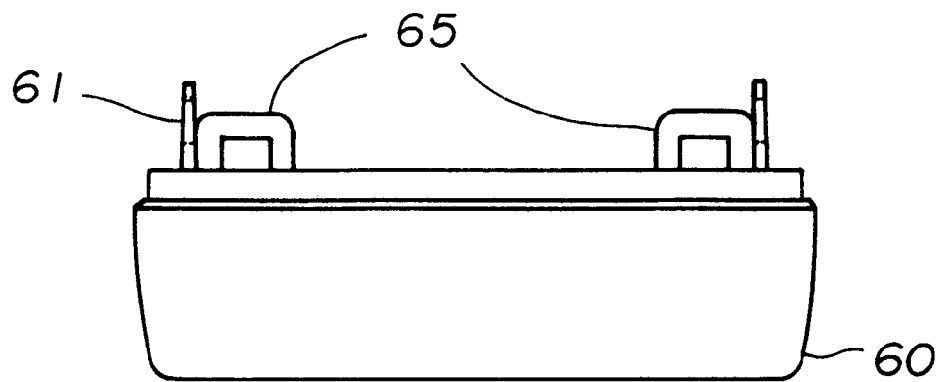
FIGS. 41A and 41B respectively are top view and a cross sectional view showing the upper cover part.
Figure 41B:
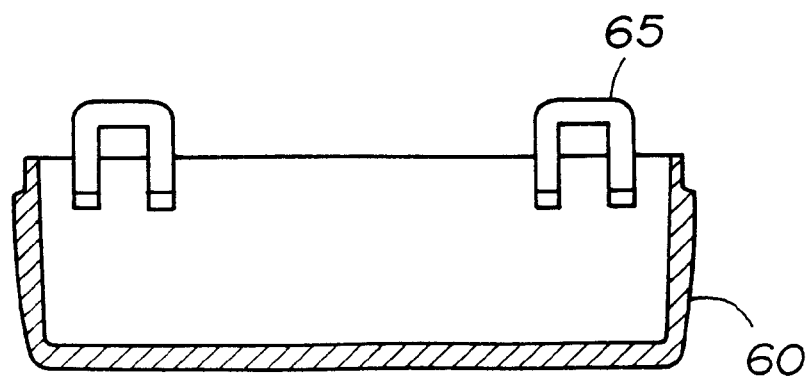

An oval opening 64 is provided on the upper part of the upper cover 60, as shown in FIG. 38. The oval opening 64 is provided for the LED display part 33 and the switch 34. In addition, as shown in FIGS. 41A and 41B, a locking member 65 which is used to lock the upper cover part 60 and the lower cover part together is provided at two positions in the upper part of the upper cover part 60. Claws provided on the lower cover part which will be described later engage the locking members 65 when the upper cover part 60 and the lower cover part are connected.

Figure 47:
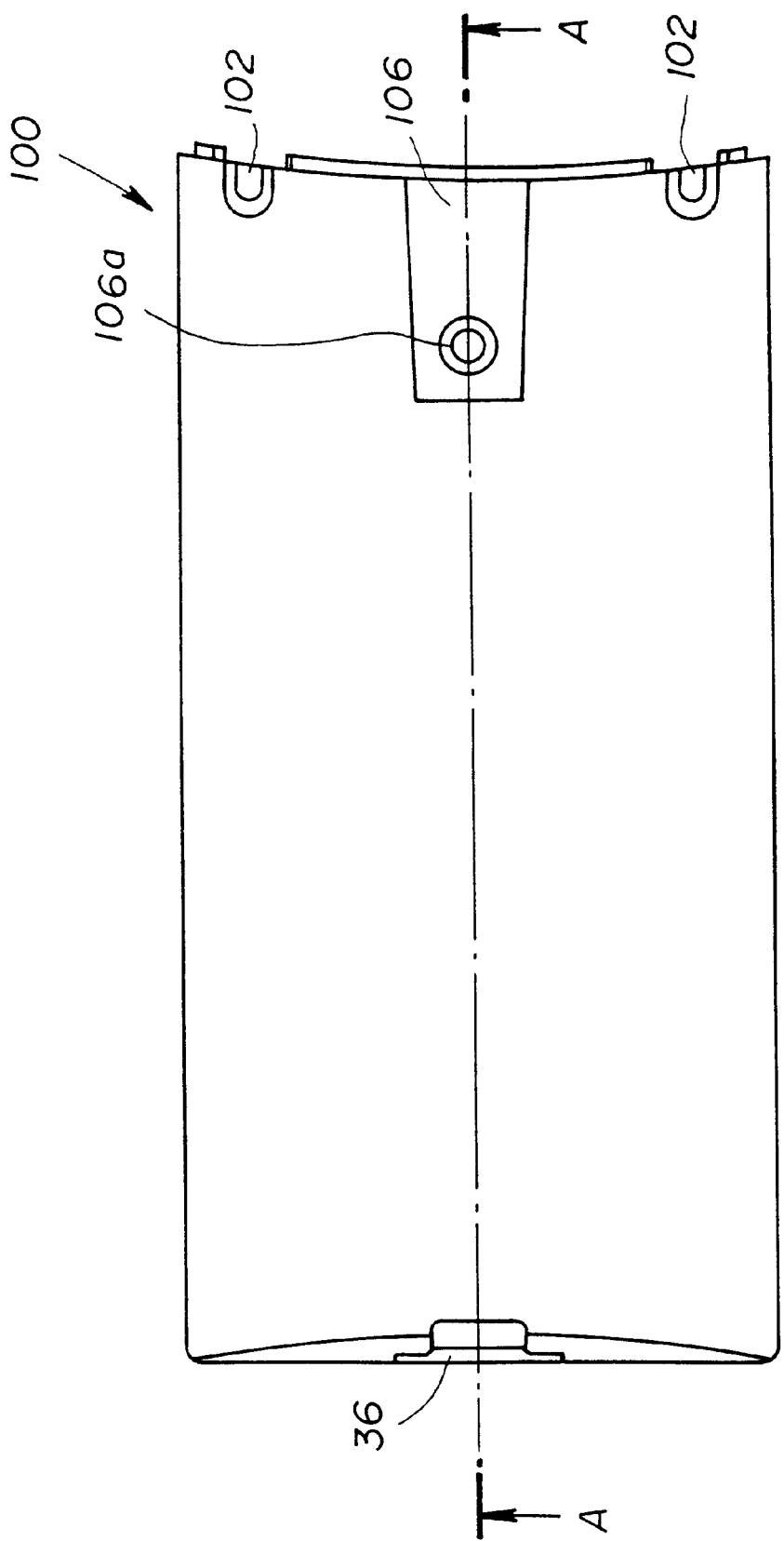
FIG. 47 is a front view showing a lower cover part of the bar code reader.
Figure 48:
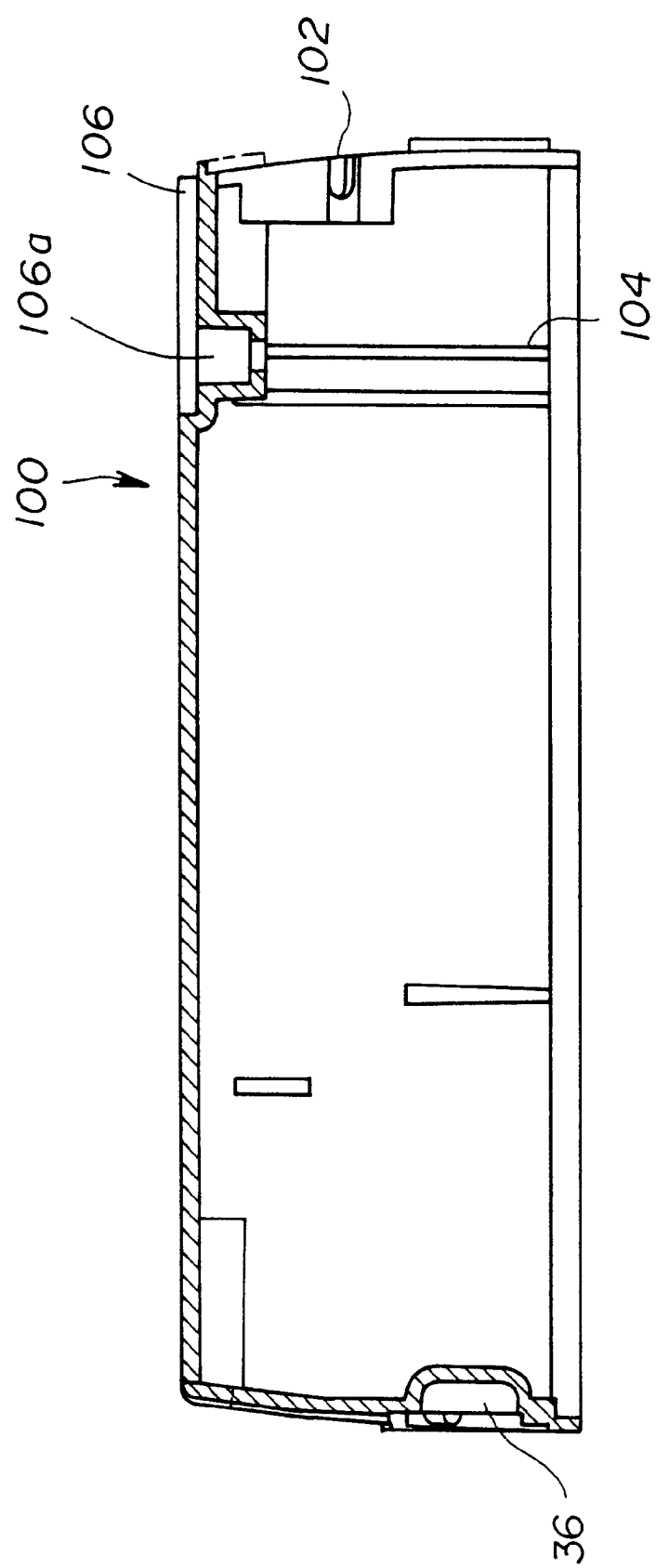
FIG. 48 is a cross sectional view showing the lower cover part.
Figure 50A:
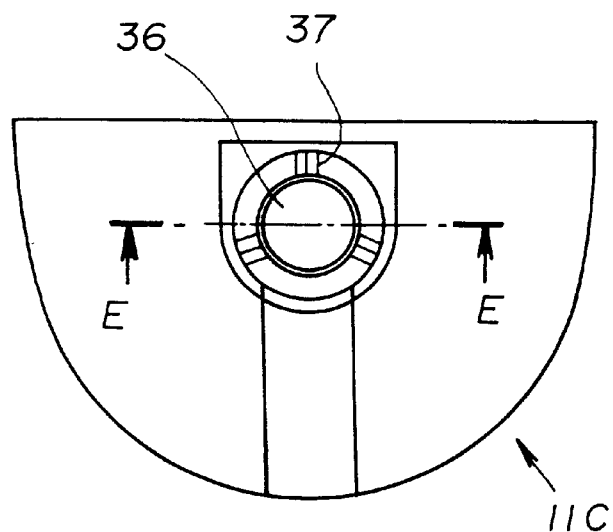
FIGS. 50A and 50B respectively are a top view showing the lower cover part and a cross sectional view showing a part of the lower cover part.
Figure 50B:
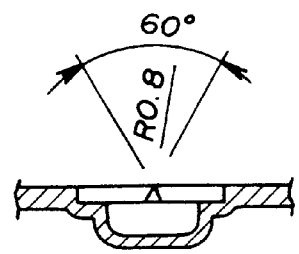
Figure 51A:
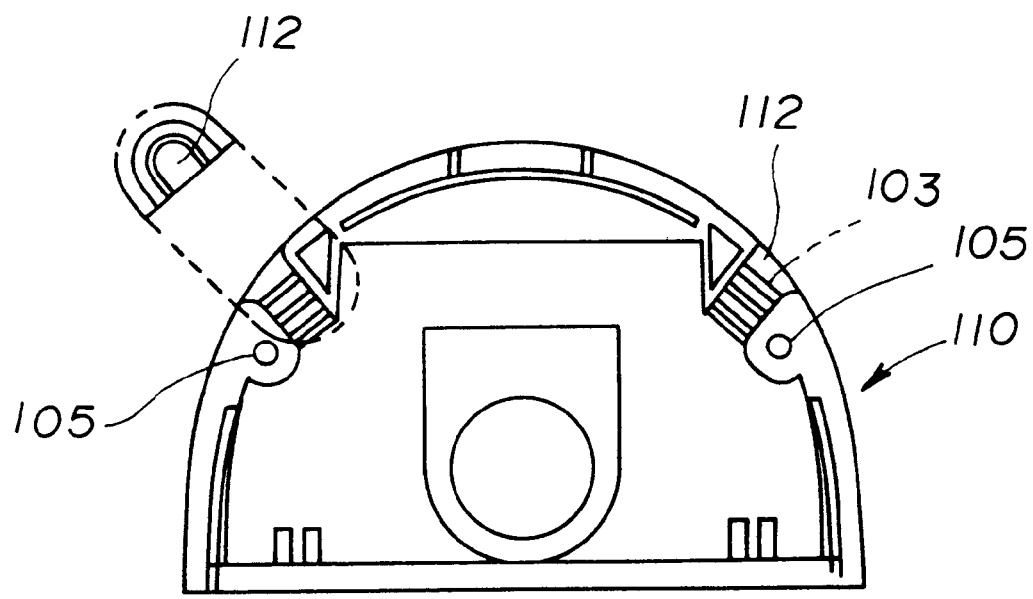
FIGS. 51A and 51B respectively are a bottom view and a cross sectional view showing the lower cover part.
Figure 51B:
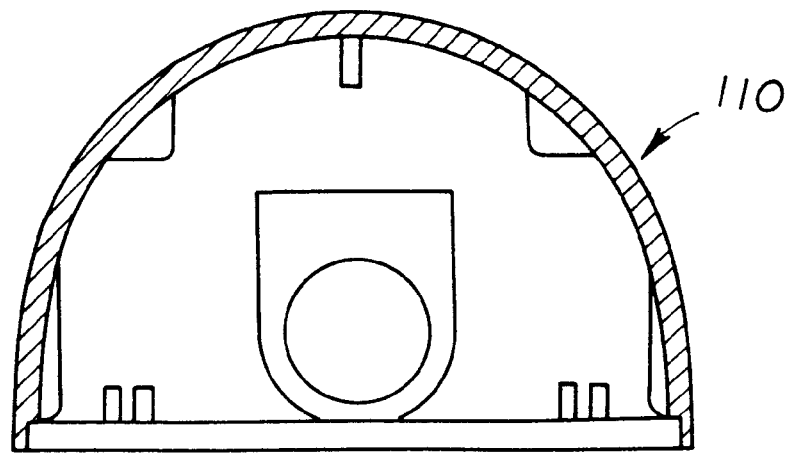

Next, a description will be given of a lower cover part 100. FIG. 47 is a front view showing the lower cover part 100 of the bar code reader 30. FIG. 48 is a cross sectional view showing the lower cover part 100 taken along a line A—A in FIG. 47. FIG. 49 is a bottom view showing the lower cover part 100. FIGS. 50A and 50B respectively are a top view showing the lower cover part 100 and a cross sectional view showing a part of the lower cover part 100 taken along a line E—E in FIG. 50A. FIGS. 51A and 51B respectively are a bottom view showing the lower cover part 100 and a cross sectional view showing the lower cover part 100 taken along a line C—C in FIG. 49. The lower cover part 100 is connected to the upper cover part 60 to form the housing of the bar code reader 30.

The lower cover part 100 has an approximately semicircular cross section, so that the bar code reader 30 can easily be turned when the bar code reader 30 is supported on the horizontal holder 50.

The bearing part 36 is provided on the top surface of the lower cover part 100. The ribs 37 are radially formed in the bearing part 36, and the ribs 37 engage the projections 55 which are formed around the pin 54 of the horizontal holder 50. In FIG. 50A, only three ribs 37 are shown for the sake of convenience.

An opening 102 which is used to draw out the cable which is connected to the printed circuit board 85 to the outside, is provided on the right and left ends at the lower part of the lower cover part 100. For example, three ribs 103 are formed within each opening 102. The ribs 103 have the function of holding the cable which is drawn out through the opening 102, and prevent an excessively large stress from being applied to the end of the cable and the connector part when the cable is pulled. A pair of screw holes 105 are formed at the lower part of the lower cover part 100.

A pair of ribs 104 for supporting the partitioning wall 62 are formed within the lower cover part 100.

Figure 52A:
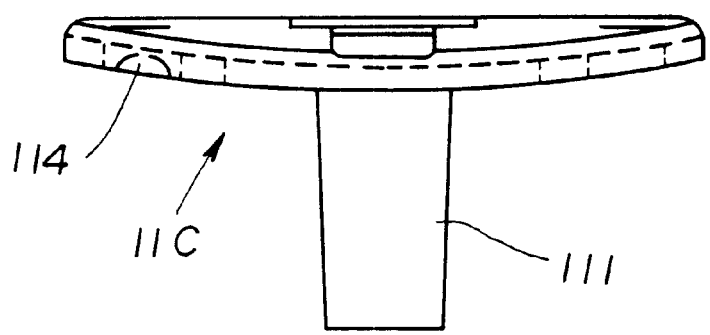
FIGS. 52A and 52B respectively are top view and a rear view showing a connector cover.
Figure 52B:
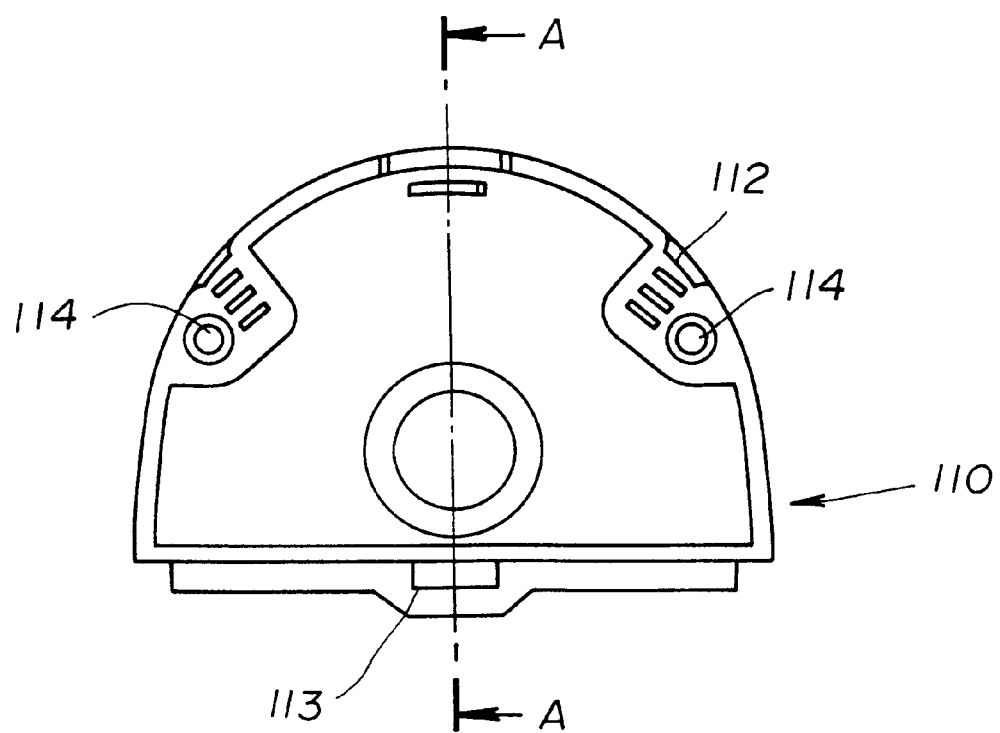
Figure 53A:
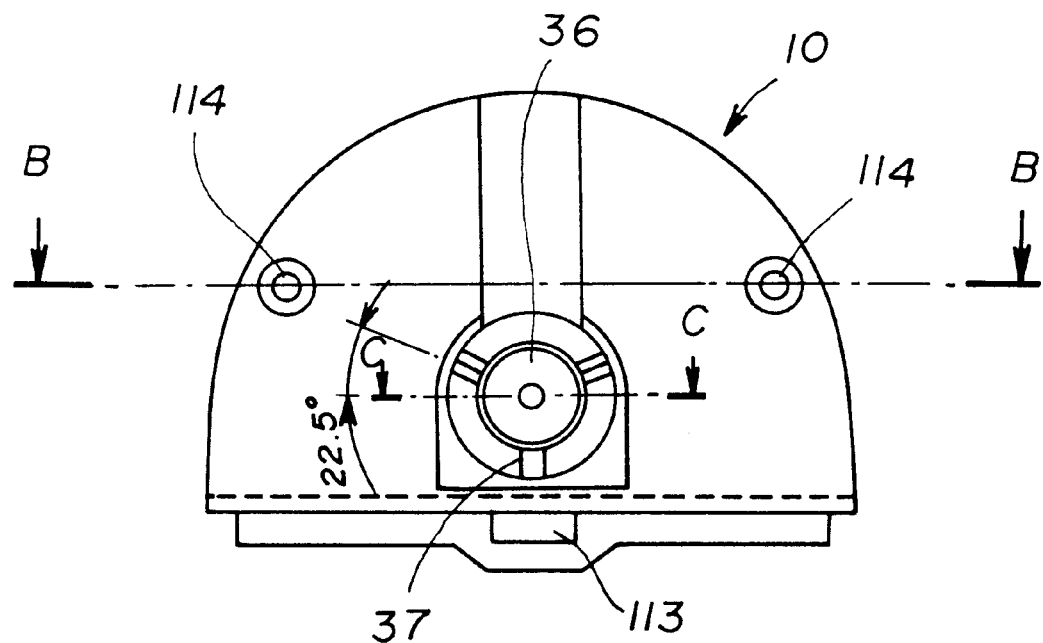
FIGS. 53A and 53B respectively are a front view and a cross sectional view showing the connector cover.
Figure 53B:
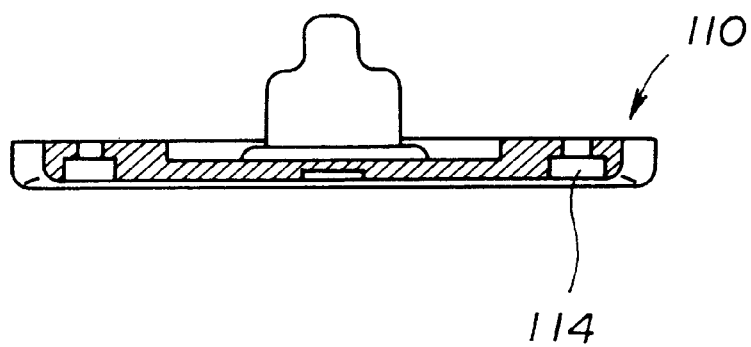
Figure 54A:
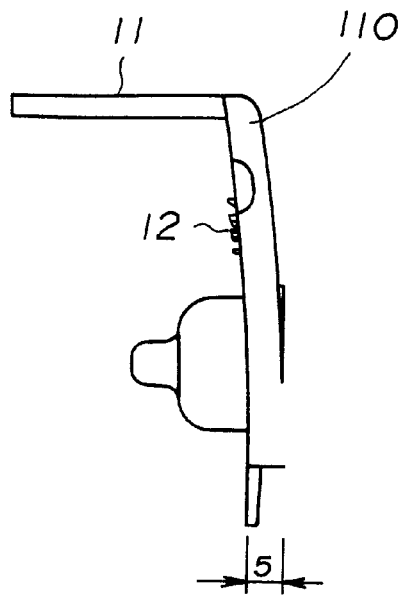
FIGS. 54A and 54B respectively are a side view and a cross sectional view showing the connector cover.
Figure 54B:
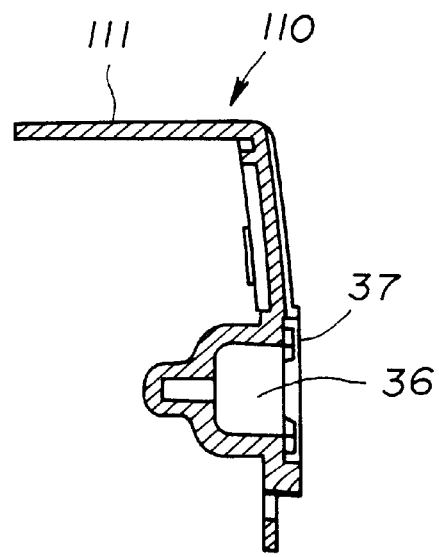

The connector part which connects to the cable is provided at the lower part of the bar code reader 30. FIGS. 52A and 52B respectively are top view and a rear view showing a connector cover 110. FIGS. 53A and 53B respectively are a front view showing the connector cover 110 and a cross sectional view showing the connector cover 110 taken along a line B—B in FIG. 53A. In addition, FIGS. 54A and 54B respectively are a side view showing the connector cover 110 and a cross sectional view showing the connector cover 110 taken along a line A—A in FIG. 52B. The bearing part 36 having the radially formed ribs 37 (only three shown) are formed at the bottom surface of the connector cover 110, similarly to the bearing part 36 formed at the top surface of the lower cover part 100.

A generally trapezoid-shaped tongue 111 is formed on the connector cover 110. This tongue 111 fits into a recess 106 which is provided at the lower part of the lower cover part 100 and has shape identical to that of the tongue 111. As shown in FIGS. 47 and 48, a screw hole 106*a* is formed at the recess 106, and the printed circuit board 85 is secured on the lower cover part 100 by a screw which is screwed into the screw hole 106*a*. The tongue 111 of the connector cover 110 hides the screw hole 106*a*.

Three ribs 112 are provided at each position corresponding to the opening 102 of the connector cover 110, as shown in FIG. 52B. Hence, the cable is held by the ribs 103 and 112.

An engaging member 113 is provided at the lower part of the connector cover 110. This engaging member 113 is engaged by a claw member provided on the bottom surface of the upper cover part 60. A pair of screw holes 114 are provided in the connector cover 110 at positions corresponding to the screw holes 105 in the lower cover part 100. The connector cover 110 is secured to the lower cover part 100 by screws through these screw holes 114 and 105.

Figure 55:
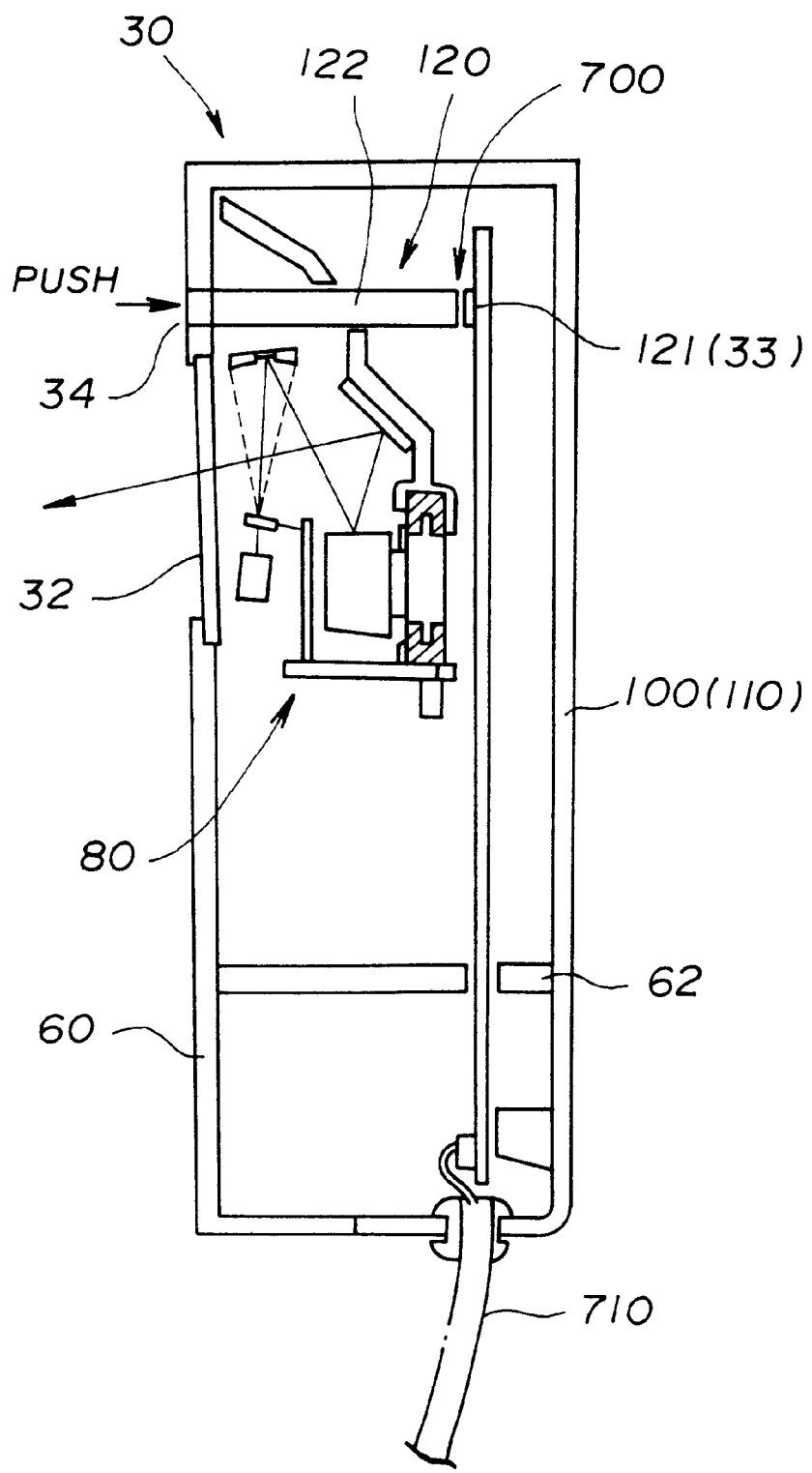
FIG. 55 is a cross sectional view showing the bar code reader mounted with the optical unit.

FIG. 55 is a cross sectional view showing the bar code reader 30 mounted with the optical unit 80. More particularly, FIG. 55 shows a state where the optical unit 80 and the printed circuit board 85 are mounted within the bar code reader 30. In FIG. 55, a reference numeral 710 designates a cable.

This embodiment uses the laser diode 87 as the light source. However, the serviceable life of the laser diode 87 is relatively short, and it is desirable to turn OFF the laser diode 87 when not in use, rather than constantly maintaining the laser diode 87 in an ON state. For this reason, the laser diode 87 is automatically turned OFF or is intermittently turned ON/OFF after a predetermined time elapses from the bar code reading operation, by a known means.

In order to read the bar code, it is necessary to put the laser diode 87 in a continuously ON state from the OFF or intermittently ON/OFF state. As a known means of putting the laser diode 87 in the continuously ON state, there is a first method which operates a start switch, and a second method which uses a so-called proximity light sensor or a sensor which detects the surrounding light.

According to the first method, it is necessary to provide the start switch on the bar code reader. In this embodiment, the bar code reader 30 is provided with the LED display part 33 which is used in common with the switch 34.

Generally, the bar code reader is provided with a display part such as a LED part for notifying whether or not the reading of the bar code was successful. In order to positively notify the operator, such a display part is provided at a position confronting the operator. In the case of the bar code reader of the type provided on the counter, the display part is provided in the vicinity of the reading window, for example.

On the other hand, as is evident from the description given heretofore, when holding the bar code reader 30 on the vertical holder 40, the bar code reader is oriented so that the reading window 32 confronts the operator. In this case, it would be difficult and inconvenient to provide the start switch on the rear part of the bar code reader 30. In addition, when providing the start switch on the front face of the bar code reader 30, the position where the start switch can be provided is very limited because of the arrangements of the optical systems and the like.

In this embodiment, such inconveniences are eliminated by providing the LED display part 33 on the front face of the bar code reader 30, integrally with the switch 34.

In FIG. 55, a part 120 integrally comprises the LED display part 33 and the switch 34. A LED 121 which forms the LED display part 33 is mounted in a vicinity of one end of a guide 122 which is made of a transparent resin and functions as a light guide. The other end of the light guide 122 is located at the tip end of the switch 34. The ON/OFF state of the LED 121 can be checked visually at the front end central part of the switch 34. The rear end of the switch 34 is connected to the actual switching element mounted on the printed circuit board 85, and the switching element is turned ON/OFF by pushing the switch 34.

On the other hand, the sensor for detecting the surrounding light is conventionally provided on the inside of the reading window. The sensor detects a change in the amount of light in the surrounding of the bar code reader. If the detected amount of light decreases, it may be regarded that the operator is near the bar code reader and the amount of surrounding light decreased thereby. Accordingly, when the amount of light detected by the sensor decreases, it is judged that the bar code reading operation is to be carried out, and the laser diode is put into the continuously ON state from the OFF or intermittently ON/OFF state, in response to the light detection made by the sensor.

Conventionally, the sensor detects the change in the amount of light incident through the reading window of the bar code reader. For this reason, the sensor is sensitive even with respect to a slight change in the amount of light, thereby increasing the possibility of putting the laser diode in the continuously ON state even when there is no need to do so.

This embodiment of the bar code reader can also eliminate this problem.

In this embodiment, a sensor 700 is mounted in a vicinity of one end of the light guide 122. For example, the light guide 122 has a cylindrical shape. At the inner surface of the light guide 122, only the light which is incident at a specific angle is undergoes a total reflection, and the light incident at other angles is transmitted as it is through the light guide 122 and will not reach the sensor 700. This embodiment thus uses this characteristic of the light guide 122.

In other words, in this embodiment, the sensor 122 is disposed in order to detect the change in the surrounding light in a specific direction. For this reason, the light guide 122 is provided to limit the incident angle of the light, that is, to limit the range in which the amount of the surrounding light can be detected by the sensor 700.

Therefore, according to the present invention, it is possible to realize an inexpensive polygonal mirror unit which can be made by simple production steps. Hence, the polygonal mirror unit does not require an extremely skilled person to assemble the parts of the polygonal mirror unit.

In addition, according to the present invention, the bar code reader can cope with various forms of bar code reading operations.

Further, the present invention is not limited to these embodiments, but various variations and modifications may be made without departing from the scope of the present invention.

What is claimed is:

1. A polygonal mirror unit having a base with a plurality of reflection surfaces, comprising:
   a plurality of mirrors which have upper ends and lower ends and forms the reflection surfaces;
   a first base part having first grooves which receive the lower ends of the mirrors, and first resilient stoppers which push the lower ends of the mirrors towards an outside of said first base part; and
   a second base part having second grooves which receive the upper ends of the mirrors, and resilient second stoppers which push the upper ends of the mirrors towards an outside of the second base part;
   said first and second base parts being connected to form the base and thereby fix positions of the mirrors.

2. The polygonal mirror unit as claimed in claim 1, wherein said first base part has a first engaging part, said second base part has a second engaging part, and said first and second base parts are connected in a state where the first and second engaging parts engage each other.

3. The polygonal mirror unit as claimed in claim 2, wherein said first engaging part is made up of a number of projections, and said second engaging part is made up of a number of recesses equal to the number of said projections.

4. The polygonal mirror unit as claimed in claim 2, wherein said first engaging part is made up of a number of recesses, and said second engaging part is made up of a number of projections equal to the number of said recesses.

5. The polygonal mirror unit as claimed in claim 1, wherein said mirrors have identical shapes and sizes.

6. The polygonal mirror unit as claimed in claim 1, wherein said first and second base parts are connected directly with each other.

7. A polygon mirror unit having a base with a plurality of reflection surfaces, comprising:
  a plurality of mirrors which have upper ends and lower ends and forms the reflection surfaces;
  a first base part having first grooves which receive the lower ends of the mirrors, and first stoppers which push the mirrors towards an outside of said first base part; and
  a second base part having second grooves which receive the upper ends of the mirrors, and second stoppers which push the mirrors towards an outside of the second base part,
  said first and second base parts being connected to form the base and thereby fix positions of the mirrors,
  wherein said first base part has a first engaging part, said second base part has a second engaging part, and said first and second base parts are connected in a state where the first and second engaging parts engage each other,
  wherein said first engaging part is made up of a number of projections, and said second engaging part is made up of a number of recesses equal to the number of said projections, and
  wherein at least two projections have different sizes, and at least two recesses have different sizes.

8. A polygon mirror unit having a base with a plurality of reflection surfaces, comprising:
  a plurality of mirrors which have upper ends and lower ends and forms the reflection surfaces;
  a first base part having first grooves which receive the lower ends of the mirrors, and first stoppers which push the mirrors towards an outside of said first base part; and
  a second base part having second grooves which receive the upper ends of the mirrors, and second stoppers which push the mirrors towards an outside of the second base part,
  said first and second base parts being connected to form the base and thereby fix positions of the mirrors,
  wherein said first base part has a first engaging part, said second base part has a second engaging part, and said first and second base parts are connected in a state where the first and second engaging parts engage each other,
  wherein said first engaging part is made up of a number of recesses, and said second engaging part is made up of a number of projections equal to the number of said recesses,
  wherein at least two recesses have different sizes, and at least two projections have different sizes.

9. A polygonal mirror unit having a base with a plurality of reflection surfaces, comprising:
  a plurality of mirrors which have tipper ends and lower ends and forms the reflection surfaces;
  a first base part having first grooves which receive the lower ends of the mirrors, and first stoppers which push the mirrors towards an outside of said first base part; and
  a second base part having second grooves which receive the upper ends of the mirrors, and second stoppers which push the mirrors towards an outside of the second base part,
  said first and second base parts being connected to form the base and thereby fix positions of the mirrors,
  wherein said mirrors have identical shapes and sizes, and
  wherein said mirrors have mutually different inclination angles, and sides of two mutually adjacent mirrors partially overlap.

10. An optical scanning apparatus comprising:
  a light source which emits a light beam; and
  a polygonal mirror unit which rotates and has a base with a plurality of reflection surfaces which reflect the light beam from said light source to generate a scanning line beam,
  said polygonal mirror unit comprising:
    a plurality of mirrors which have upper ends and lower ends and forms the reflection surfaces;
    a first base part having first grooves which receive the lower ends of the mirrors, and first resilient stoppers which push the lower ends of the mirrors towards an outside of said first base part; and
    a second base part having second grooves which receive the upper ends of the mirrors, and second resilient stoppers which push the upper ends of the mirrors towards an outside of the second base part,
    said first and second base parts being connected to form the base and thereby fix positions of the mirrors.

11. The optical scanning apparatus as claimed in claim 10, wherein said first base part has a first engaging part, said second base part has a second engaging part, and said first and second base parts are connected in a state where the first and second engaging parts engage each other.

12. The optical scanning apparatus as claimed in claim 11, wherein said first engaging part is made up of a number of projections, and said second engaging part is made up of a number of recesses equal to the number of said projections.

13. The optical scanning apparatus as claimed in claim 11, wherein said first engaging part is made up of a number of recesses, and said second engaging part is made up of a number of projections equal to the number of said recesses.

14. The optical scanning apparatus as claimed in claim 10, wherein said mirrors have identical shapes and sizes.

15. The optical scanning apparatus as claims in claim 10, wherein the first and second base parts are connected directly with each other.

16. An optical scanning apparatus comprising:
  a light source which emits a light beam; and
  a polygonal mirror unit which rotates and has a base with a plurality of reflection surfaces which reflect the light beam from said light source to generate a scanning line beam,
  said polygonal mirror unit comprising:
    a plurality of mirrors which have upper ends and lower ends and forms the reflection surfaces;
    a first base part having first grooves which receive the lower ends of the mirrors, and first stoppers which push the mirrors towards an outside of said first base part; and
    a second base part having second grooves which receive the upper ends of the mirrors, and second stoppers which push the mirrors towards an outside of the second base part,
    said first and second base parts being connected to form the base and thereby fix positions of the mirrors,
  wherein said first base part has a first engaging part, said second base part has a second engaging part, and said first and second base parts are connected in a state where the first and second engaging parts engage each other,
  wherein said first engaging part is made up of a number of projections, and said second engaging part is made up of a number of recesses equal to the number of said projections, and wherein at least two projections have different sizes, and at least two recesses have different sizes.

17. The optical scanning apparatus comprising:

a light source which emits a light bean; and a polygonal mirror unit which rotates and has a base with a plurality of reflection surfaces which reflect the light beam from said light source to generate a scanning line beam, said polygonal mirror unit comprising:

a plurality of mirrors which have upper ends and lower ends and forms die reflection surfaces;

a first base part having first grooves which receive the lower ends of the mirrors, and first stoppers which push the mirrors towards an outside of said first base part; and a second base part having second grooves which receive the upper ends of the mirrors, and second stoppers which push the mirrors towards an outside of the second base part, said first and second base parts being connected to form the base and thereby fix positions of the mirrors, wherein said first base part has a first engaging part, said second base part has a second engaging part, and said first and second base parts are connected in a state where the first and second engaging parts engage each other, wherein said first engaging part is made up of a number of recesses, and said second engaging part is made up of a number of projections equal to the number of said recesses, and wherein at least two recesses have different sizes, and at least two projections have different sizes.

18. An optical scanning apparatus comprising:

a light source which emits a light beam; and a polygonal mirror unit which rotates and has a base with a plurality of reflection surfaces which reflect the light beam from said light source to generate a scanning line beam, said polygonal mirror unit comprising:

a plurality of mirrors which have upper ends and lower ends and forms the reflection surfaces;

a first base part having first grooves which receive the lower ends of the mirrors, and first stoppers which push the mirrors towards an outside of said first base part; and a second base part having second grooves which receive the upper ends of the mirrors, and second stoppers which push the mirrors towards an outside of the second base part, said first and second base parts being connected to form the base and thereby fix positions of the mirrors, wherein said mirrors have identical shapes and sizes, wherein said mirrors have mutually different inclination angles, and sides of two mutually adjacent mirrors partially overlap.

19. A polygonal mirror unit having a base with a plurality of reflection surfaces, comprising:

a plurality of mirrors which have upper ends and lower ends and forms the reflection surfaces;

a first base part having first grooves which receive the lower ends of the mirrors, and first resilient stoppers which push the lower ends of the mirrors against a direction; and a second base part having second grooves which receive the upper ends of the mirrors, and second resilient stoppers which push the upper ends of the mirrors against a direction, said first and second base parts being connected to form the base and thereby fix positions of the mirrors.

20. The polygonal mirror unit as claimed in claim 19, wherein said first and second base parts are connected directly with each other.

* * * * *